US010021569B2

(12) United States Patent
Joo et al.

(10) Patent No.: US 10,021,569 B2
(45) Date of Patent: Jul. 10, 2018

(54) THEME APPLYING METHOD AND ELECTRONIC DEVICE FOR PERFORMING THE SAME

(71) Applicant: Samsung Electronics Co., Ltd., Suwon-si, Gyeonggi-do (KR)

(72) Inventors: Jae Seok Joo, Seongnam-si (KR); Yu Jeong Jeon, Yongin-si (KR); Young Bum Lee, Seoul (KR); Eun Ha Choi, Suwon-si (KR); Ki Tae Lee, Suwon-si (KR); Yo Han Lee, Seongnam-si (KR); In Ji Jin, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/257,684

(22) Filed: Sep. 6, 2016

(65) Prior Publication Data

US 2017/0099602 A1     Apr. 6, 2017

(30) Foreign Application Priority Data

Oct. 6, 2015    (KR) .......................... 10-2015-0140062

(51) Int. Cl.
*H04M 1/66*      (2006.01)
*H04W 12/06*     (2009.01)
(Continued)

(52) U.S. Cl.
CPC ............ *H04W 12/06* (2013.01); *G06F 21/32* (2013.01); *G06F 21/36* (2013.01); *H04L 63/083* (2013.01);
(Continued)

(58) Field of Classification Search
CPC ........ H04W 12/06; G06F 21/32; G06F 21/36; H04L 63/083; H04L 63/0861; H04M 1/66
(Continued)

(56) References Cited

U.S. PATENT DOCUMENTS 6,205,554 B1 * 3/2001 Sasaki ...................... G09G 3/36
                                                                          726/19
6,209,104 B1 * 3/2001 Jalili ....................... G06F 21/36
                                                                         340/5.8
(Continued)

FOREIGN PATENT DOCUMENTS

JP         2002368871 A     12/2002
KR    10-2006-0081819 A     7/2006

OTHER PUBLICATIONS

R. W. Picard et al, "Toward Machine Emotional Intelligence: Analysis of Affective Physiological State," IEEE Trans on pattern analysis and machine intelligence, vol. 23, No. 10, 2001.
(Continued)

*Primary Examiner* — Mong-Thuy Tran
(74) *Attorney, Agent, or Firm* — Jefferson IP Law, LLP

(57) ABSTRACT

An electronic device and theme applying method thereof are provided. The electronic device includes a user authentication module configured to acquire user authentication information, a display configured to output a page, a memory configured to store at least one theme data applicable to the page, and a processor configured to apply theme data, corresponding to the acquired user authentication information, to the output page.

20 Claims, 48 Drawing Sheets

(51) Int. Cl.
*G06F 21/36* (2013.01)
*H04L 29/06* (2006.01)
*H04W 12/08* (2009.01)
*G06F 21/32* (2013.01)

(52) U.S. Cl.
CPC ......... *H04L 63/0861* (2013.01); *H04W 12/08* (2013.01); *G06F 2221/2149* (2013.01); *H04M 1/66* (2013.01)

(58) Field of Classification Search
USPC ....................................................... 455/411
See application file for complete search history.

(56) References Cited

U.S. PATENT DOCUMENTS

| | | | |
|---|---|---|---|
| 8,538,398 | B2 | 9/2013 | Wilson et al. |
| 8,688,093 | B2 | 4/2014 | Bloebaum et al. |
| 2005/0193368 | A1* | 9/2005 | Becker ................. G06F 9/4443 717/106 |
| 2008/0028326 | A1 | 1/2008 | Wilson et al. |
| 2008/0268820 | A1 | 10/2008 | Wilson et al. |
| 2009/0075639 | A1 | 3/2009 | Bloebaum et al. |
| 2009/0284482 | A1* | 11/2009 | Chin ................... G06F 3/04883 345/173 |
| 2010/0105471 | A1* | 4/2010 | Caneva ................. A63F 13/12 463/29 |
| 2010/0151847 | A1 | 6/2010 | Wilson et al. |
| 2011/0066950 | A1 | 3/2011 | Wilson et al. |
| 2011/0283354 | A1* | 11/2011 | Chang .................. G06F 3/0488 726/19 |
| 2013/0139226 | A1* | 5/2013 | Welsch .................. G06F 21/30 726/4 |
| 2013/0174213 | A1* | 7/2013 | Liu ....................... G02B 27/017 726/1 |
| 2013/0332863 | A1 | 12/2013 | Wilson et al. |
| 2014/0092096 | A1* | 4/2014 | Breedvelt-Schouten ................. G06T 11/20 345/441 |
| 2016/0092073 | A1* | 3/2016 | Asai .................... G06F 3/04817 715/838 |

OTHER PUBLICATIONS

M. Pantic and L. Rothkrantz, "Toward an Affect-sensitive Multimodal Human-computer interaction," Proc. of the IEEE, vol. 91, No. 9, pp. 1370-1390, 2003.

C.-J. Kim, et al., A Study on Evaluation of Human Arousal Level using PPG Analysis, Journal of the Ergonomics Society of Korea, vol. 29, Iss. 1, 2010,pp. 113-120.

Cardiovascular response to surprise stimulus, Eom, et al., Korean Journal of the Science of Emotion and Sensibility, vol. 14, Iss. 1, 2011, pp. 147-156.

* cited by examiner

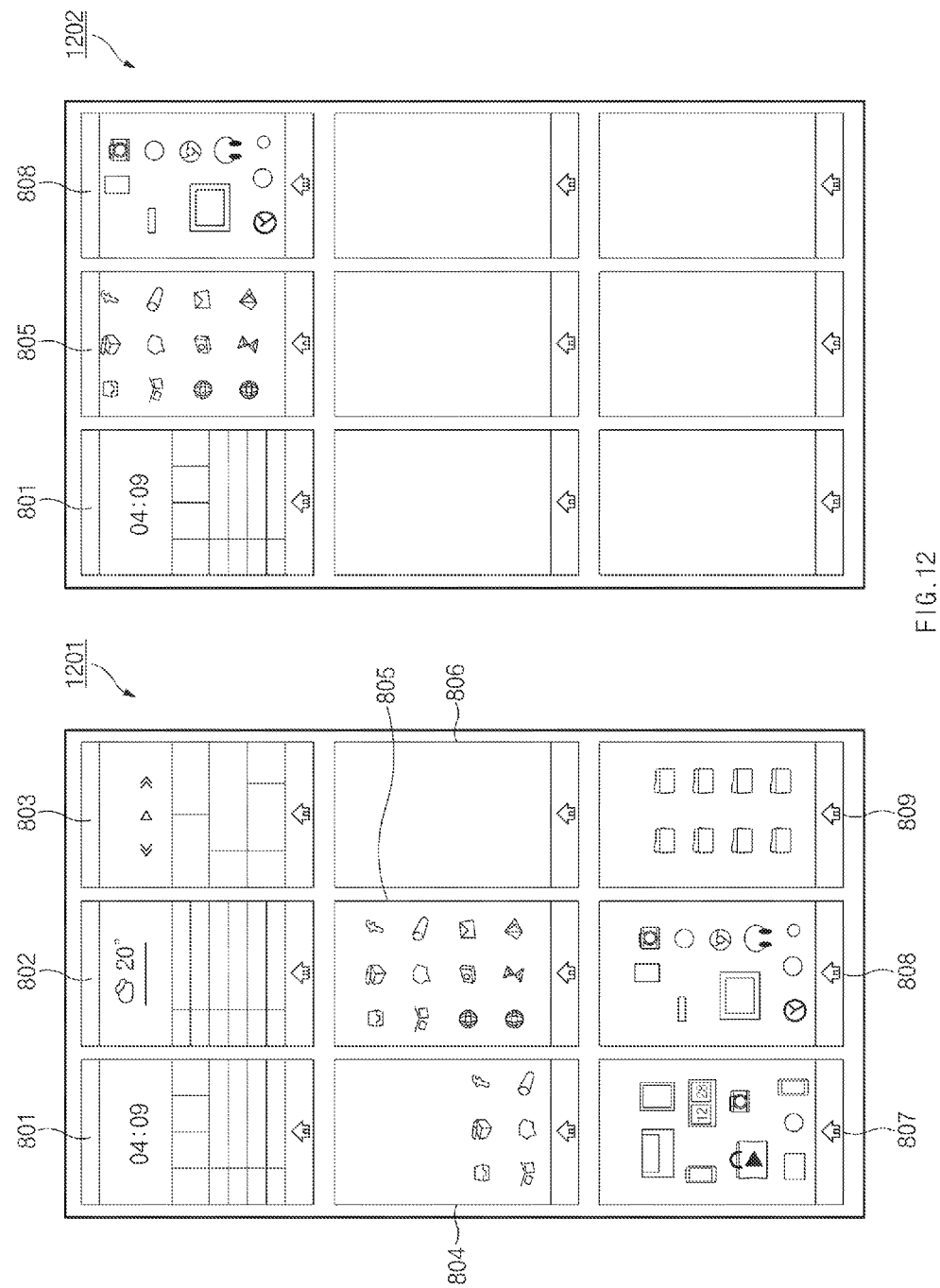

| THEME SETTING INFORMATION | SETTING FACTOR |
|---|---|
| THEME LAYOUT | - THEME PAGE CONFIGURATION(NUMBER OF PAGES, MAIN PAGE, AND SO ON)<br>- POSITION OF OBJECT (ICON/WIDGET) INCLUDED IN EACH PAGE |
| THEME RESOURCE | - FORMAT (SHAPE, COLOR, SIZE) OF EACH OBJECT<br>- BACKGROUND IMAGE (INCLUDING VIDEO) OF PAGES (LOCK SCREEN AND HOME SCREEN)<br>- BACKGROUND SOUND OF EACH PAGE |

FIG.33

THEME APPLYING METHOD AND ELECTRONIC DEVICE FOR PERFORMING THE SAME

CROSS-REFERENCE TO RELATED APPLICATION(S)

This application claims the benefit under 35 U.S.C. § 119(a) of a Korean patent application filed on Oct. 6, 2015 in the Korean Intellectual Property Office and assigned Serial number 10-2015-0140062, the entire disclosure of which is hereby incorporated by reference.

TECHNICAL FIELD

The present disclosure relates to a theme applying method and an electronic device for performing the same.

BACKGROUND

Recently, electronic devices, for example, may be implemented in forms of smartphones or wearable devices attached to a user's body part. Electronic devices implemented in various forms may provide various functions according to application programs (hereinafter referred to as applications) installed. The utilizations of the electronic devices may be maximized through various functions provided from the applications.

The application program, for example, may be downloaded from a mobile market connected via network, and may be freely installed to or deleted from an electronic device according to user's needs. The application, for example, may be generated by a manufacturer of the electronic device, a publisher of an operating system (OS) mounted on the electronic devices, mobile communication carriers, and other application publishers.

Since applications downloaded from the mobile market are generated by the various manufacturers, icons (or widgets) of the applications may be generated with different concepts. Furthermore, the icon concepts of the downloaded applications may be different from the overall concept of the OS of the electronic devices.

For example, in relation to the electronic devices, the icons of the applications may be outputted to a home screen. However, since the icons of the applications, as mentioned above, are generated with an independent design concept, they may not be matched with an overall user interface (UI) (for example, application icons, widgets, a home screen, a lock screen, fonts, representative colors, and so on) of an electronic device through the same design language.

Furthermore, a user of the electronic device may want to configure an overall UI of the electronic device with a theme that the user wants, instead of a concept predefined by the manufacturer.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of applying various themes and an electronic device for performing the same.

In accordance with an aspect of the present disclosure, an electronic device is provided. The electronic device includes a user authentication module configured to acquire user authentication information, a display configured to output a page, a memory configured to store at least one theme data applicable to the page, and a processor configured to apply theme data, corresponding to the acquired user authentication information, to the output page.

In accordance with another aspect of the present disclosure, a theme applying method of an electronic device is provided. The method includes acquiring user authentication information, applying theme data, corresponding to the acquired user authentication information, to a page, and outputting the page where the theme data is applied to a display.

In accordance with another aspect of the present disclosure, a storage medium is a computer recording medium where a computer readable instruction, executed by at least one processor, is stored. The instruction may include acquiring user authentication information, applying theme data, corresponding to the acquired user authentication information, to a page, and outputting the page where the theme data is applied to a display.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 12 is a view illustrating a screen of an electronic device for describing a theme applying method according to an embodiment of the present disclosure;

FIG. 33 is a view illustrating a theme recommendation list setting factor according to an embodiment of the present disclosure.

Throughout the drawings, like reference numerals will be understood to refer to like parts, components, and structures.

DETAILED DESCRIPTION

Figure 1:
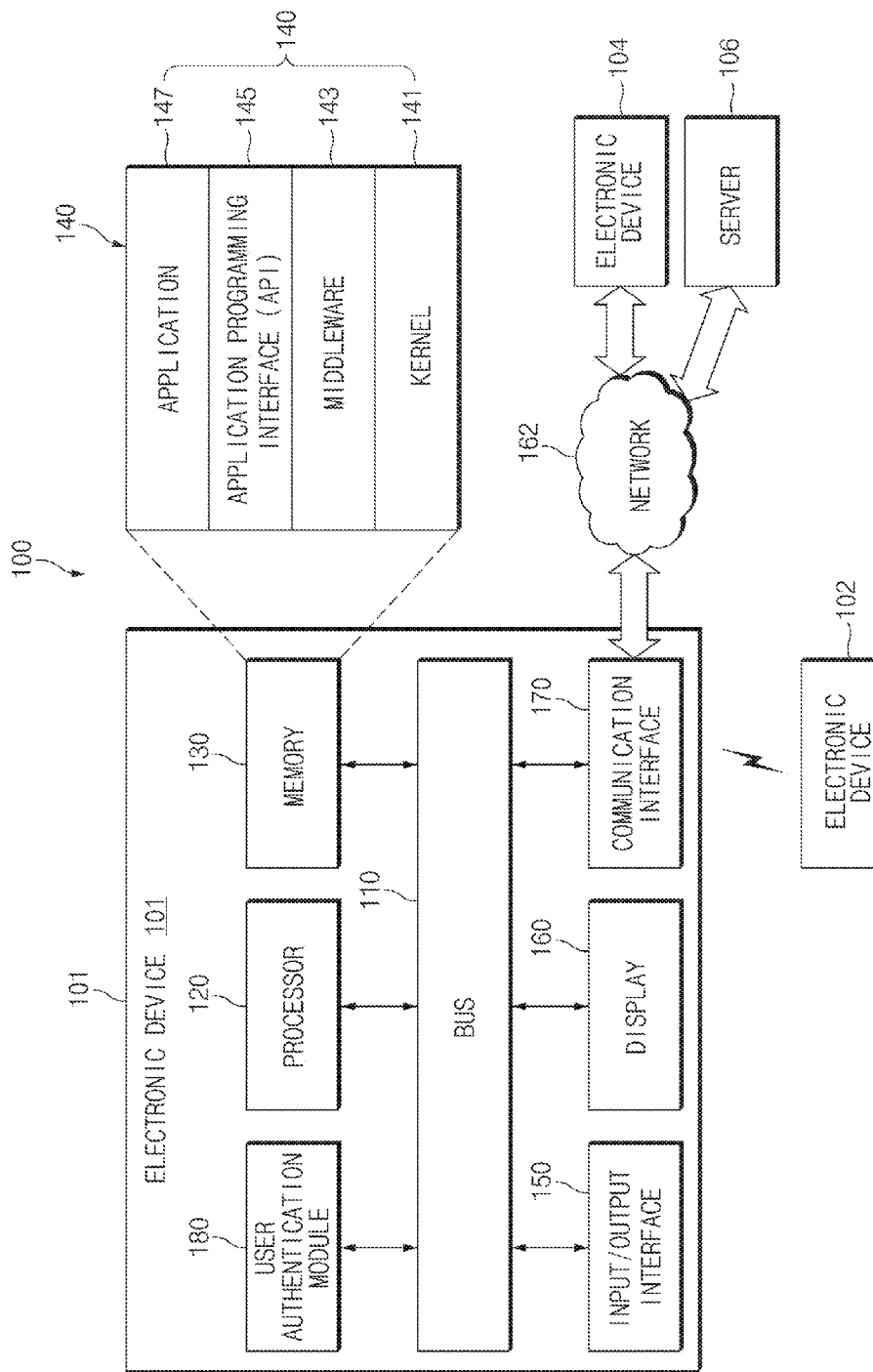
FIG. 1 is a view illustrating an electronic device in a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may mean a dedicated processor (for example, an embedded processor) for performing a corresponding operation or a generic-purpose processor (for example, a central processing unit (CPU) or application processor) for performing corresponding operations by executing at least one software program stored in a memory device.

Terms used in various embodiments of the present disclosure are used to describe specific embodiments of the present disclosure, and are not intended to limit the scope of other embodiments. The terms of a singular form may include plural forms unless they have a clearly different meaning in the context. Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any cases, even the terms defined in this specification cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop PCs, laptop PCs, netbook computers, workstation server, personal digital assistants (PDAs), portable multimedia player (PMPs), MP3 players, mobile medical devices, cameras, and wearable devices. According to various embodiments of the present disclosure, the wearable devices may include at least one of accessory types (e.g., watches, rings, bracelets, anklets, necklaces, glasses, contact lenses, or head-mounted-devices (HMDs)), fabric or garment integrated types (for example, e-apparel), body-mounted types (for example, skin pads or tattoos), or bio-implantation types (for example, implantable circuits).

According to some embodiments of the present disclosure, an electronic device may be home appliance. The smart home appliances may include at least one of, for example, televisions, digital video disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™ or Google TV™), game consoles (for example, Xbox™ and PlayStation™), electronic dictionaries, electronic keys, camcorders, and electronic picture frames.

According to some embodiments of the present disclosure, an electronic device may include at least one of various medical devices supporting call forwarding service (for example, various portable measurement devices (for example, glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc.), navigation devices, global navigation satellite system (GNSS), event data recorders (EDRs), flight data recorders (FDRs), vehicle infotainment devices, marine electronic equipment (for example, marine navigation systems, gyro compasses, etc.), avionics, security equipment, vehicle head units, industrial or household robots, financial institutions' automatic teller's machines (ATMs), or stores' point of sales (POS) or internet of things (for example, bulbs, various sensors, electric or gas meters, sprinkler systems, fire alarms, thermostats, street lights, toasters, exercise equipment, hot water tanks, heaters, boilers, etc.).

In various embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to the technology development.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

FIG. 1 is a view illustrating an electronic device in a network environment according to an embodiment of the present disclosure.

Referring to FIG. 1, an electronic device 101 in a network environment 100 is described according to various embodiments of the present disclosure. The electronic device 101 may include a bus 110, a processor 120, a memory 130, an input/output interface 150, a display 160, a communication interface 170, and a user authentication module 180. According to an embodiment of the present disclosure, the electronic device 101 may omit at least one of the components or may additionally include a different component.

The bus 110, for example, may include a circuit for connecting the components 110 to 170 to each other and delivering a communication (for example, control message and/or data) between the components 110 to 170.

The processor 120 may include at least one of a CPU, an application processor (AP), and a communication processor (CP). The processor 120, for example, may execute calculation or data processing for control and/or communication of at least one another component of the electronic device 101.

The memory 130 may include volatile and/or nonvolatile memory. The memory 130, for example, may store instructions or data relating to at least one another component of the electronic device 101. According to an embodiment of the present disclosure, the memory 130 may store software and/or program 140. The program 140 may include a kernel 141, a middleware 143, an application programming interface (API) 145, and/or an application program (or an application) 147. At least part of the kernel 141, the middleware 143, and the API 145 may be called an operating system (OS).

The kernel 141, for example, may control or manage system resources (for example, the bus 110, the processor 120, the memory 130, and so on) used for performing operations or functions implemented in other programs (for example, the middleware 143, the API 145, or the application program 147). Additionally, the kernel 141 may provide an interface for controlling or managing system resources by accessing an individual component of the electronic device 101 from the middleware 143, the API 145, or the application program 147.

The middleware 143, for example, may serve as an intermediary role for exchanging data as the API 145 or the application program 147 communicates with the kernel 141.

Additionally, the middleware 143 may process at least one job request received from the application program 147 according to a priority. For example, the middleware 143 may assign to at least one application program 147 a priority for using a system resource (for example, the bus 110, the processor 120, or the memory 130) of the electronic device 101. For example, the middleware 143 may perform scheduling or load balancing on at least one job request by processing the at least one job request according to the priority assigned to the at least one job request.

The API 145, as an interface for allowing the application program 147 to control a function provided from the kernel 141 or the middleware 143, may include at least one interface or function (for example, an instruction) for file control, window control, image processing, or character control.

The input/output interface 150, for example, may serve as an interface for delivering instructions or data inputted from a user or another external device to another component(s) of the electronic device 101. Additionally, the input/output interface 150 may output instructions or data received from another component(s) of the electronic device 101 to a user or another external device.

The display 160, for example, may include a liquid crystal display (LCD), a light emitting diode (LED) display, an organic LED (OLED) display, a microelectromechanical systems (MEMS) display, or an electronic paper display. The display 160 may display various contents (for example, text, image, video, icon, symbol, and so on) to a user. The display 160 may include a touch screen, and for example, may receive a touch, gesture, proximity, or hovering input by using an electronic pen or a user's body part.

The communication interface 170, for example, may set a communication between the electronic device 101 and an external device (for example, the first external electronic device 102, the second external electronic device 104, or the server 106). For example, the communication interface 170 may communicate with an external device (for example, the second external electronic device 104 or the server 106) in connection to the network 162 through wireless communication or wired communication.

The wireless communication, as a cellular communication protocol, may use at least one of long-term evolution (LTE), LTE Advance (LTE-A), code division multiple access (CDMA), wideband CDMA (WCDMA), universal mobile telecommunications system (UMTS), Wireless Broadband (WiBro), Global System for Mobile Communications (GSM), and so on. Additionally, the wireless communication, for example, may include the short-range communication 164. The short-range communication 164, for example, may include at least one of Wireless Fidelity (Wi-Fi), Bluetooth (BT), near field communication (NFC), GNSS, and MST.

The GNSS may include at least one of GPS, Glonass, Beidou Navigation Satellite System (Beidou), and Galileo, that is, the European global satellite-based navigation system. Hereinafter, GPS and GNSS may be interchangeably used. The MST may generate a pulse in response to transmission data using an electromagnetic signal, and the pulse may generate a magnetic field signal. The electronic device 1401 may transfer the magnetic field signal to point of sale (POS), the POS may detect the magnetic field signal using a MST reader. The electronic device 1401 may restore the data by converting the detected magnetic field signal to an electrical signal.

The wired communication, for example, may include at least one of universal serial bus (USB), high definition multimedia interface (HDMI), recommended standard 232 (RS-232), and plain old telephone service (POTS). The network 162 may include telecommunications network, for example, at least one of computer network (for example, local area network (LAN) or wide area network (WAN)), internet, and telephone network.

The user authentication module 180, for example, may obtain user authentication information from a user. The user authentication information may include various personal authentication information such as face recognition authentication information, touch pattern authentication information, biometric authentication information (for example, fingerprint, iris, and vein information), and so on. According to various embodiments of the present disclosure, the user authentication module 180 may determine whether a user is legitimate by comparing user authentication information from the user and authentication information stored in the memory 130 in advance.

Each of the first and second external electronic devices 102 and 104 may have the same type as or a different type from the electronic device 101. According to an embodiment of the present disclosure, the server 106 may include a group of one or more servers. According to various embodiments of the present disclosure, all or part of operations executed on the electronic device 101 may be executed on another one or more electronic devices (for example, the electronic device 102 or 104 or the server 106). According to an embodiment of the present disclosure, when the electronic device 101 performs a certain function or service automatically or by a request, it may request at least part of a function relating thereto from another device (for example, the electronic device 102 or 104 or the server 106) instead of or in addition to executing the function or service by itself. The other electronic device (for example, the external electronic device 102 or 104 or the server 106) may execute a requested function or an additional function and may deliver an execution result to the electronic device 101. The electronic device 101 may provide the requested function or service as it is or by processing the received result additionally. For this, for example, cloud computing, distributed computing, or client-server computing technology may be used.

Figure 2:
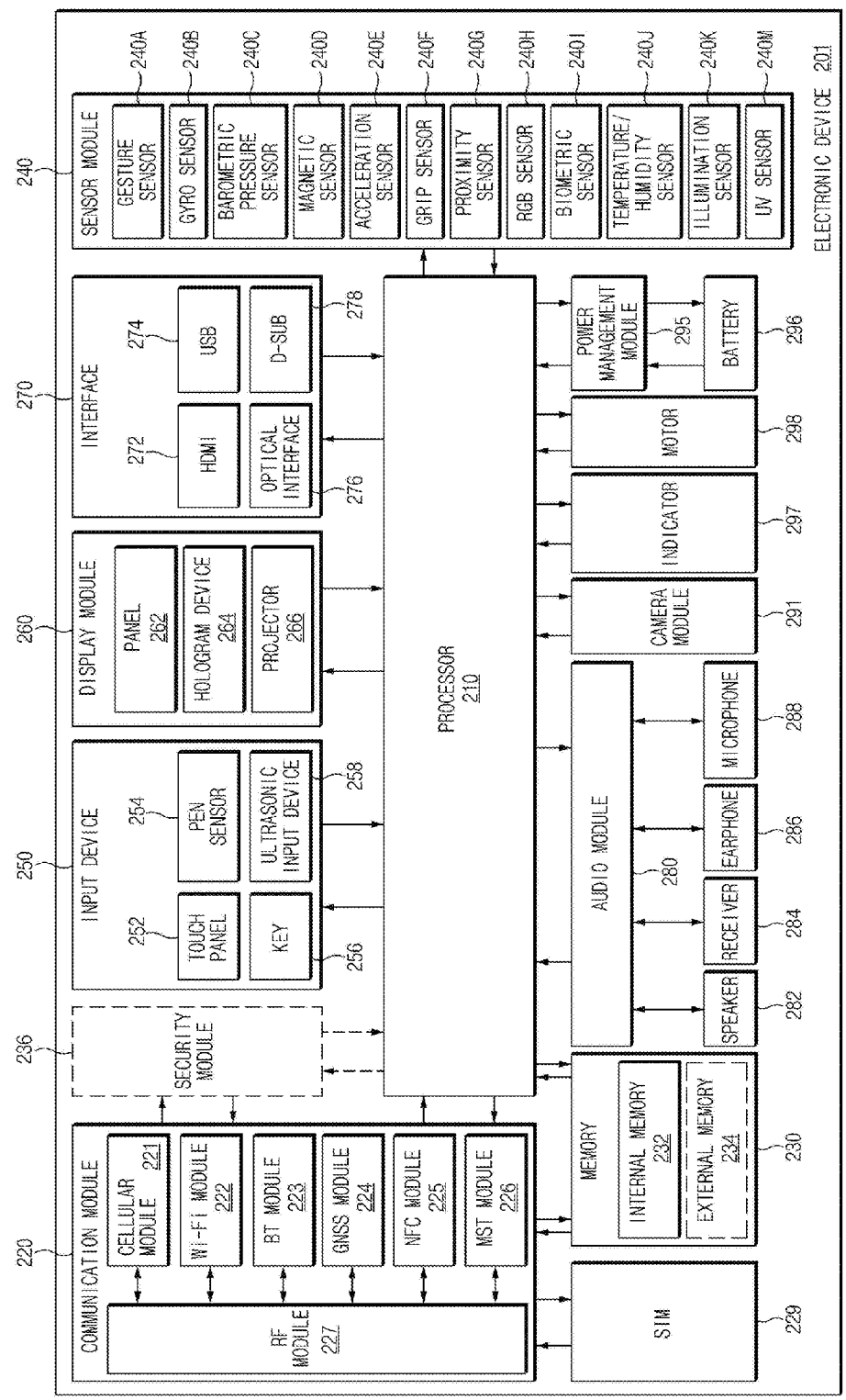
FIG. 2 is a block diagram illustrating an electronic device according to an embodiment of the present disclosure.

FIG. 2 is a block diagram of an electronic device according to an embodiment of the present disclosure.

Referring to FIG. 2, an electronic device 201, for example, may include all or part of the above-mentioned electronic device 101 shown in FIG. 1. The electronic device 201 may include at least one processor (for example, an application processor (AP) 210), a communication module 220, a subscriber identification module (SIM) 229, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected thereto and also may perform various data processing and operations by executing an operating system or an application program. The processor 210 may be implemented with a system on chip (SoC), for example. According to an embodiment of the present disclosure, the processor 210 may further include a graphic processing unit (GPU) (not shown) and/or an image signal processor. The processor 210 may include at least part (for example, the cellular module 221) of components shown in FIG. 2. The processor 210 may load commands or data received from at least one of other components (for example, nonvolatile memory) and process them and may store various data in a nonvolatile memory.

The communication module 220 may have the same or similar configuration to the communication interface 170 of FIG. 1. The communication module 220, for example, may include a cellular module 221, a Wi-Fi module 222, a BT module 223, a GNSS module 224 (for example, a GPS module, a Glonass module, a Beidou module, or a Galileo module), an NFC module 225, a MST module 226, and a radio frequency (RF) module 227. The communication module 220 may communicate directly with the processor 210, or may communicate with the processor 210 via a security module 236.

The cellular module 221, for example, may provide voice call, video call, text service, or internet service through communication network. According to an embodiment of the present disclosure, the cellular module 221 may perform a distinction and authentication operation on the electronic device 201 in a communication network by using a SIM (for example, a SIM card) 229. According to an embodiment of the present disclosure, the cellular module 221 may perform at least part of a function that the processor 210 provides. According to an embodiment of the present disclosure, the cellular module 221 may further include a CP.

Each of the Wi-Fi module 222, the BT module 223, the GNSS module 224, the NFC module 225, or the MST module 226 may include a processor for processing data transmitted/received through a corresponding module. According to an embodiment of the present disclosure, at least part (for example, at least one) of the cellular module 221, the Wi-Fi module 222, the BT module 223, the GNSS module 224, the NFC module 225, the MST module 226 may be included in one integrated chip (IC) or IC package.

The RF module 227, for example, may transmit/receive communication signals (for example, RF signals). The RF module 227, for example, may include a transceiver, a power amp module (PAM), a frequency filter, a low noise amplifier (LNA), or an antenna. According to another embodiment of the present disclosure, at least one of the cellular module 221, the Wi-Fi module 222, the BT module 223, the GNSS module 224, the NFC module 225, and the MST module 226 may transmit/receive RF signals through a separate RF module.

The SIM 229, for example, may include a card including a SIM and/or an embedded SIM and also may include unique identification information (for example, an integrated circuit card identifier (ICCID)) or subscriber information (for example, an international mobile subscriber identity (IMSI)).

The memory 230 (for example, the memory 130) may include an internal memory 232 or an external memory 234. The internal memory 232 may include at least one of a volatile memory (for example, dynamic random access memory (DRAM), static RAM (SRAM), synchronous dynamic RAM (SDRAM)) and a non-volatile memory (for example, one time programmable read only memory (OTPROM), programmable ROM (PROM), erasable and programmable ROM (EPROM), electrically erasable and programmable ROM (EEPROM), mask ROM, flash ROM, flash memory (for example, NAND flash memory or NOR flash memory), hard drive, or solid state drive (SSD)).

The external memory 234 may further include flash drive, for example, compact flash (CF), secure digital (SD), micro Micro-SD, Mini-SD, extreme digital (xD), (multi-media card (MMC), or a memory stick. The external memory 234 may be functionally and/or physically connected to the electronic device 201 through various interfaces.

The sensor module 240 measures physical quantities or detects an operating state of the electronic device 201, thereby converting the measured or detected information into electrical signals. The sensor module 240 may include at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and an ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 240 may further include a control circuit for controlling at least one sensor therein. According to an embodiment of the present disclosure, the electronic device 201 may further include a processor configured to control the sensor module 240 as part of or separately from the processor 210 and thus may control the sensor module 240 while the processor 210 is in a sleep state.

The input device 250 may include a touch panel 252, a (digital) pen sensor 254, a key 256, or an ultrasonic input device 258. The touch panel 252 may use at least one of capacitive, resistive, infrared, or ultrasonic methods, for example. Additionally, the touch panel 252 may further include a control circuit. The touch panel 252 may further include a tactile layer to provide tactile response to a user.

The (digital) pen sensor 254, for example, may include a sheet for recognition as part of a touch panel or a separate sheet for recognition. The key 256 may include a physical button, an optical key, or a keypad, for example. The ultrasonic input device 258 may detect ultrasonic waves generated from an input tool through a microphone (for example, the microphone 288) in order to check data corresponding to the detected ultrasonic waves.

The display 260 (for example, the display 160) may include a panel 262, a hologram device 264, or a projector 266. The panel 262 may have the same or similar configuration to the display 160 of FIG. 1. The panel 262 may be implemented to be flexible, transparent, or wearable, for example. The panel 262 and the touch panel 252 may be configured with one module. The hologram device 264 may show three-dimensional images in the air by using the interference of light. The projector 266 may display an image by projecting light on a screen. The screen, for example, may be placed inside or outside the electronic device 201. According to an embodiment of the present disclosure, the display 260 may further include a control circuit for controlling the panel 262, the hologram device 264, or the projector 266.

The interface 270 may include a high-definition multimedia interface (HDMI) 272, a USB 274, an optical interface 276, or a D-subminiature (sub) 278, for example. The interface 270, for example, may be included in the communication interface 170 shown in FIG. 1. Additionally or alternatively, the interface 270 may include a mobile high-definition link (MHL) interface, a SD) card/MMC interface, or an IR data association (IrDA) standard interface.

The audio module 280 may convert sound into electrical signals and convert electrical signals into sounds. At least some components of the audio module 280, for example, may be included in the input/output interface 150 shown in FIG. 1. The audio module 280 may process sound information inputted/outputted through a speaker 282, a receiver 284, an earphone 286, or a microphone 288.

The camera module 291, as a device for capturing a still image and a video, may include at least one image sensor (for example, a front sensor or a rear sensor), a lens (not shown), an image signal processor (ISP) (not shown), or a flash (not shown) (for example, an LED or a xenon lamp).

The power management module 295 may manage the power of the electronic device 201. According to an embodiment of the present disclosure, the power management module 295 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 296, or a voltage, current, or temperature thereof during charging. The battery 296, for example, may include a rechargeable battery and/or a solar battery.

The indicator 297 may display a specific state of the electronic device 201 or part thereof (for example, the processor 210), for example, a booting state, a message state, or a charging state. The motor 298 may convert electrical signals into mechanical vibration and may generate vibration or haptic effect. Although not shown in the drawings, the electronic device 201 may include a processing device (for example, a GPU) for mobile TV support. A processing device for mobile TV support may process media data according to the standards such as digital multimedia broadcasting (DMB), digital video broadcasting (DVB), or mediaFLO™.

Each of the above-mentioned components of the electronic device according to various embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

Figure 3:
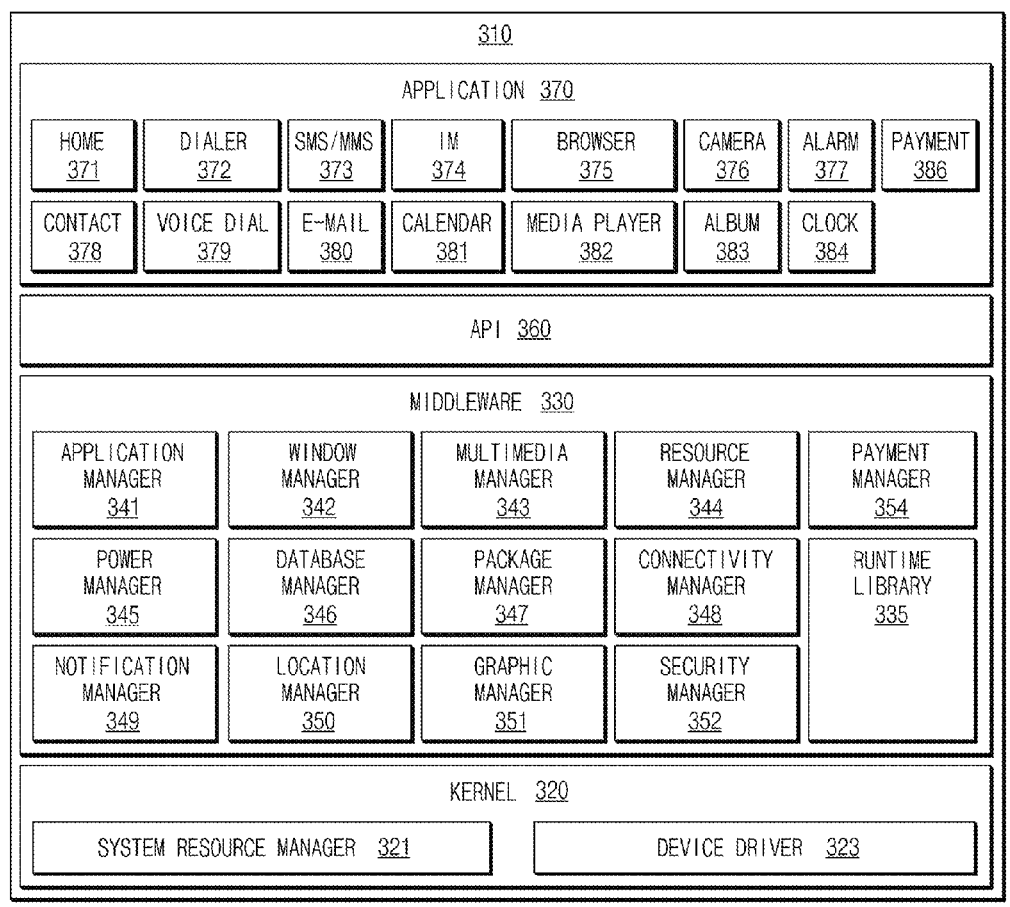
FIG. 3 is a block diagram illustrating a program module according to an embodiment of the present disclosure.

FIG. 3 is a block diagram illustrating a program module according to an embodiment of the present disclosure.

Referring to FIG. 3, according to an embodiment of the present disclosure, a program module 310 (for example, the program 140) may include an OS for controlling a resource relating to an electronic device (for example, the electronic device 101) and/or various applications (for example, the application program 147) running on the OS. The OS, for example, may include android, iOS, windows, symbian, tizen, or bada.

The program module 310 may include a kernel 320, a middleware 330, an API 360, and/or an application 370. At least part of the program module 310 may be preloaded on an electronic device or may be downloaded from an external electronic device (for example, the electronic device 102 or 104 or the server device 106).

The kernel 320 (for example, the kernel 141), for example, may include a system resource manager 321, or a device driver 323. The system resource manager 321 may perform the control, allocation, or retrieval of a system resource. According to an embodiment of the disclosure, the system resource manager 321 may include a process management unit, a memory management unit, or a file system management unit. The device driver 323, for example, may include a display driver, a camera driver, a BT driver, a sharing memory driver, a USB driver, a keypad driver, a Wi-Fi driver, an audio driver, or an inter-process communication (IPC) driver.

The middleware 330, for example, may provide a function that the application 370 requires commonly, or may provide various functions to the application 370 through the API 360 in order to allow the application 370 to efficiently use a limited system resource inside the electronic device. According to an embodiment of the disclosure, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and payment manager 354.

The runtime library 335, for example, may include a library module that a complier uses to add a new function through a programming language while the application 370 is running. The runtime library 335 may perform a function on input/output management, memory management, or an arithmetic function.

The application manager 341, for example, may mange the life cycle of at least one application among the applications 370. The window manager 342 may manage a GUI resource used in a screen. The multimedia manager 343 may recognize a format for playing various media files and may encode or decode a media file by using the codec corresponding to a corresponding format. The resource manager 344 may manage a resource such as a source code, a memory, or a storage space of at least any one of the applications 370.

The power manager 345, for example, may operate together with a basic input/output system (BIOS) to manage the battery or power and may provide power information necessary for an operation of the electronic device. The database manager 346 may generate, search, or modify a database used in at least one application among the applications 370. The package manager 347 may manage the installation or update of an application distributed in a package file format.

The connectivity manger 348 may manage a wireless connection such as WiFi or BT. The notification manager 349 may display or notify an event such as arrival messages, appointments, and proximity alerts to a user in a manner of not interrupting the user. The location manager 350 may manage location information on an electronic device. The graphic manager 351 may manage a graphic effect to be provided to a user or a user interface relating thereto. The security manager 352 may provide various security functions necessary for system security or user authentication. According to an embodiment, when an electronic device (for example, the electronic device 101) includes a phone function, the middleware 330 may further include a telephony manager for managing a voice or video call function of the electronic device.

The middleware 330 may include a middleware module for forming a combination of various functions of the above-mentioned components. The middleware 330 may provide a module specialized for each type of OS to provide differentiated functions. Additionally, the middleware 330 may delete part of existing components or add new components dynamically.

The API 360 (for example, the API 145), for example, as a set of API programming functions, may be provided as another configuration according to OS. For example, in the case of android or iOS, one API set may be provided for each platform and in the case Tizen, at least two API sets may be provided for each platform.

The application 370 (for example, the application program 147) may include at least one application for providing functions such as a home 371, a dialer 372, a short message service (SMS)/multi-media message service (MMS) 373, an instant message 374, a browser 375, a camera 376, an alarm 377, a contact 378, a voice dial 379, an e-mail 380, a calendar 381, a media player 382, an album 383, a clock 384, a payment 386, health care (for example, measure an exercise amount or blood sugar), or environmental information provision (for example, provide air pressure, humidity, or temperature information).

According to an embodiment, the application 370 may include an application (hereinafter referred to as "information exchange application") for supporting information exchange between the electronic device (for example, the electronic device 101) and an external electronic device (for example, the electronic devices 102 and 104). The information exchange application, for example, may include a notification relay application for relaying specific information to the external device or a device management application for managing the external electronic device.

For example, the notification relay application may have a function for relaying to an external electronic device (for example, electronic device 102 or 104) notification information occurring from another application (for example, an SMS/MMS application, an e-mail application, a health care application, or an environmental information application) of the electronic device. Additionally, the notification relay application may receive notification information from an external electronic device and may then provide the received notification information to a user.

The device management application, for example, may manage (for example, install, delete, or update) at least one function (turn-on/turn off of the external electronic device itself (or some components) or the brightness (or resolution) adjustment of a display) of an external electronic device (for example, the electronic devices 102 and 104) communicating with the electronic device, an application operating in the external electronic device, or a service (for example, call service or message service) provided from the external device.

According to an embodiment of the disclosure, the application 370 may include a specified application (for example, a health care application of a mobile metical device) according to the property of an external electronic device (for example, the electronic device 102 or 104). According to an embodiment, the application 370 may include an application received from an external electronic device (for example, the server 106 or the electronic device 102 or 104). According to an embodiment of the disclosure, the application 370 may include a preloaded application or a third party application downloadable from a server. The names of components in the program module 310 according to the shown embodiment may vary depending on the type of OS.

According to various embodiments of the present disclosure, at least part of the program module 310 may be implemented with software, firmware, hardware, or a combination thereof. At least part of the program module 310, for example, may be implemented (for example, executed) by a processor (for example, the processor 210). At least part of the program module 310 may include a module, a program, a routine, sets of instructions, or a process to perform at least one function, for example.

Figure 4:
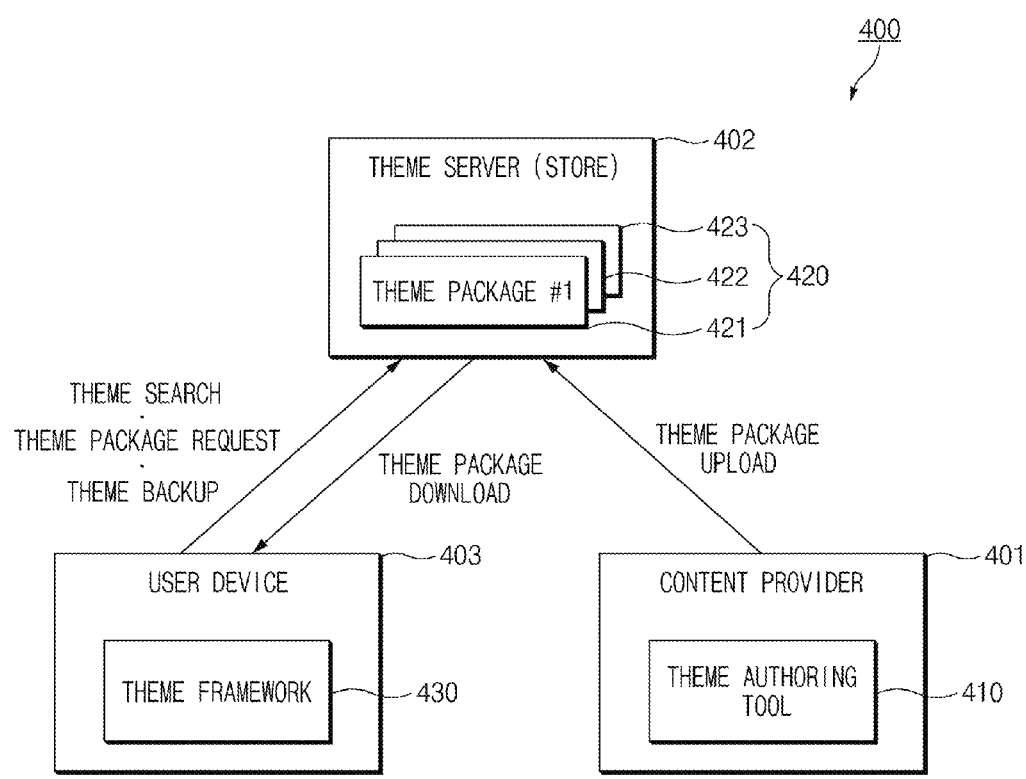
FIG. 4 is a view illustrating a system environment according to an embodiment of the present disclosure.

FIG. 4 is a view illustrating a system environment according to an embodiment of the present disclosure.

Referring to FIG. 4, a system environment 400 where various embodiments of the present disclosure are applicable may include a contents provider 401, a theme server 402, and a user device 403. The contents provider 401 may generate a theme package 420 by using a theme authoring tool 410 and upload the generated theme package 420 to the theme server 402. The theme server 402 may store various theme packages 421 to 423 uploaded by at least one content provider 401. The theme server 402, for example, may provide a theme package for a fee or for free in response to a request of the user device 403. The user device 403 may download a theme package from the theme server 402, and install the downloaded theme package.

In general, "theme data" according to various embodiments disclosed in this specification may include data (for example, theme resource data) on a consistent format of the background image, color, and sound of a home screen of an electronic device, a lock screen, or an execution screen of application. In addition, "theme data" may include data (for example, theme layout data) on the arrangement position of an object (for example, an icon/widget of application) corresponding to the consistent format.

According to various embodiments of the present disclosure, "theme data" may include data on a theme layout, a theme GUI, and/or a theme function. For example, the theme layout may include a layout of the background images of a home screen and/or a lock screen and a layout of an application and a widget. Additionally, for example, the theme GUI may include the background image of a home screen and/or a lock screen, the execution screen of an application (for example, messenger application, schedule management application, and so on), and the graphic of an icon. Additionally, a theme specific function, for example, may include a cover screen theme, a ring tone change, schedule linkage, and installation of other specific applications.

"Theme data" may be packaged in terms of software, and may be transmitted and shared in the form of "theme package" via various networks. For example, "theme package" may be implemented with APK file in the Android™ OS system.

The contents provider 401 (for example, the electronic device 104 of FIG. 1) may generate a theme package by using the theme authoring tool 410. The contents provider 401 may upload the generated theme package to the theme server 402 or a contents provider's server (not shown). According to various embodiments of the present disclosure, the contents provider 401 may provide theme related various update information to the user device 403 and/or the theme server 402.

The theme authoring tool 410 may provide a function for allowing the contents provider 401 to generate and distribute a theme appropriate for the theme framework 430 of the user device 403. The theme authoring tool 410, for example, may support a drag & drop function and a preview function, and in generating a theme, apply an animating image in addition to a still image to a background screen or an object (for example, an icon, a widget, and so on). Additionally, the theme authoring tool 410, for example, may support a layout setting to be available according to a user's preference. A user may directly develop a function not supported by the theme authoring tool 410, through XML. According to various embodiments of the present disclosure, the theme authoring tool 410 may be implemented in various types. For example, the theme authoring tool 410 may have a type appropriate for a mobile device.

The theme server 402 (for example, the server 106 of FIG. 1) may store the theme package 420 that the contents provider 401 generates and uploads. The theme server 402 may provide a corresponding theme package in response to a request of the user device 403. According to various embodiments of the present disclosure, the user device 403 may back up a theme package, which is applied to the user device 403, to the theme server 402. The theme server 402, for example, may correspond to a market (or store) server where a theme package is transacted for a fee or for free.

The user device 403 may search from a theme package from the theme server 402, and request a specific theme package. The user device 403, for example, may correspond to the electronic device 101 of FIG. 1 and the electronic device 201 of FIG. 2. In the first half of the specification, "user device" may be referred to as "electronic device".

The user device 403 may download a theme package corresponding to a request of the theme package. The user device 403, for example, may receive update information from the theme server 402 or a contents provider's server (not shown) by using URL information extracted from a theme package and then, reflect the update information to the setting of a user device. The user device 403 may manage a theme package based on the embedded theme framework 430. The theme framework 430 of the user device 403 is described in more detail with reference to FIGS. 5 and 6.

Figure 5:
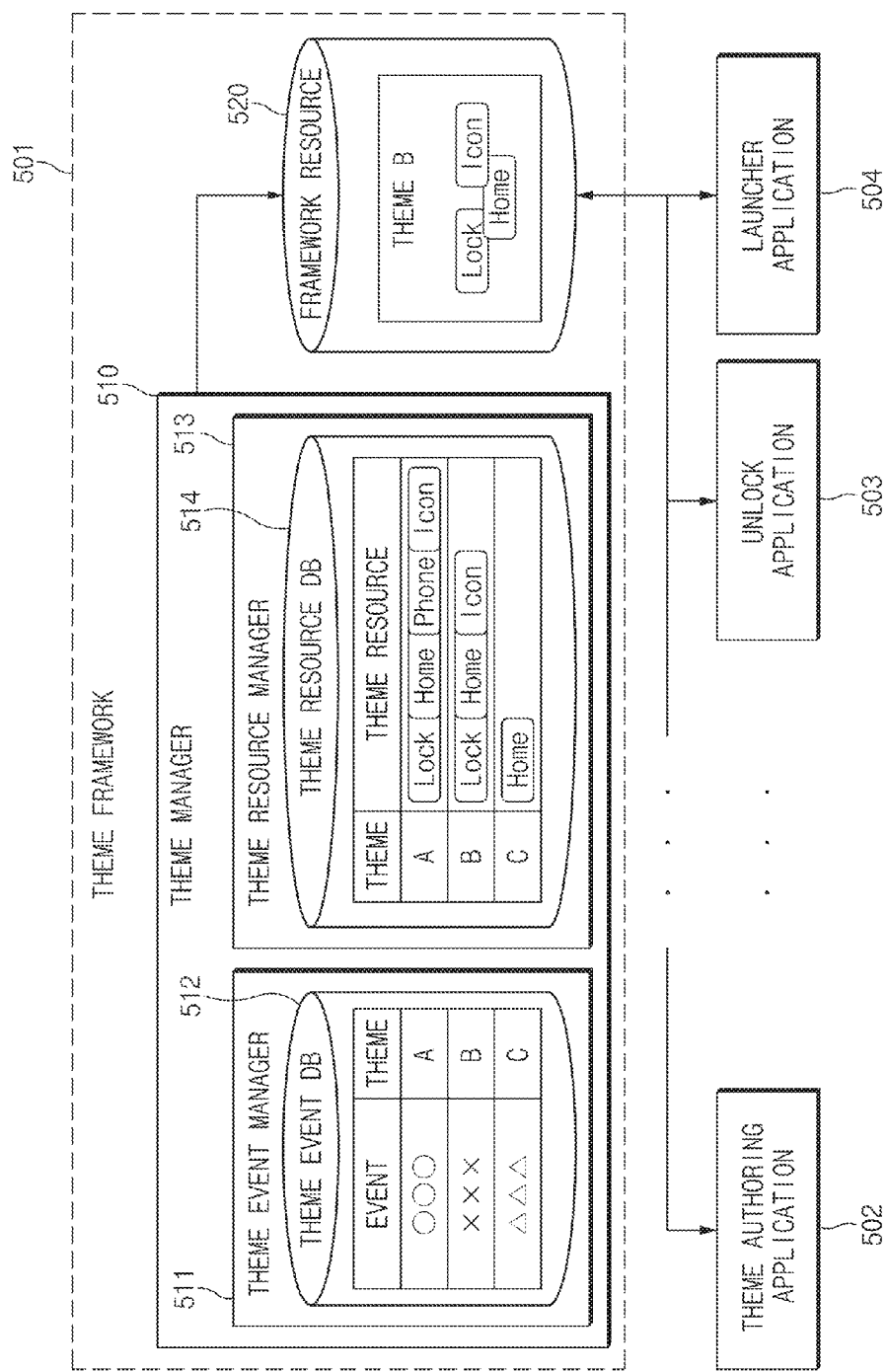
FIG. 5 is a view illustrating a theme framework of a user device according to an embodiment of the present disclosure.

FIG. 5 is a view illustrating a theme framework of a user device according to an embodiment of the present disclosure.

Referring to FIG. 5, a user device according to various embodiments of the present disclosure may include a theme framework 501, a theme authoring application 502, an unlock application 503, and a launcher application 504.

The user device may correspond to the electronic device 101 of FIG. 1 (or the electronic device 201 of FIG. 2) A theme framework 501, a theme authoring application 502, an unlock application 503, and a launcher application 504 shown in FIG. 5 are executed by the processor 120 (or the processor 210) and loaded into the memory 130 (or the memory 230), so that they may be implemented in terms of software. Additionally, various types of databases included in the theme framework 501 may be established in the memory 130 (or the memory 230).

The theme framework 501 may include a theme manager 510 and a framework resource 520. Although it is shown in FIG. 5 that the theme framework 501 includes the theme manager 510, the theme manager 510 may be separated as an independent function module (for example, application).

The theme manager 510 may manage the installation of a theme package downloaded to a user device and functions by the theme package. For example, the theme manager 510 may download a theme package from a theme server and install it, and perform overall management on a theme such as theme setting change and update. The theme package file may include resource and parameter information for graphic user interface (GUI) implementation.

The theme manager 510 may extract a plurality of sub installation files (for example, sub-APK files) based on the installation files (for example, APK files, EXE files, and so on) of a theme package. The plurality of sub installation files may be installed by a theme installer (not shown) to be used as resources in each application (for example, the theme authoring application 502, the unlock application 503, and the launcher application 504). In order to install the theme package, an XML file that describes a structure of a theme package may be included in an installation file of a theme package. After the installation of a theme package by a theme installer (not shown), a theme may be installed as each application specific setting related file in the theme package is read.

According to an embodiment of the present disclosure, the theme manager 510 may include a theme event manager 511 and a theme resource manager 513 in order for management such as theme's installation and change. The theme event manager 511 and the theme resource manager 513 may include a theme event database 512 and a theme resource database 514, respectively. The theme event database 512 and the theme resource database 514 in the theme manager 510 may be established separately as shown in FIG. 5 but may be established in one database.

The theme event manager 511 may perform a read/write operation of the theme event database 512. The theme event database 512 may include theme event data for providing a theme related service. For example, when "xxx" event occurs, the theme event manager 511 may select "theme B", and resource data (stored in the theme resource database 514) of the selected "theme B" may be reflected on the framework resource 520. Various applications (for example, the theme authoring application 502, the unlock application 503, and the launcher application 504) may be used with reference to resource data of "theme B" reflected on the framework resource 520.

The theme resource manager 513 may perform a read/write operation of the theme resource database 514. The theme resource database 514 may include theme resource data corresponding to each theme. Theme resource data may be stored in the theme resource database 514 in correspondence to theme event data of the theme event database 512. The theme resource data, for example, may include lock screen theme data ("Lock" shown in FIG. 5), home screen theme data ("Home" shown in FIG. 5), a voice call theme ("Phone" shown in FIG. 5), and an application icon theme ("Icon" shown in FIG. 5).

Theme resource data may be loaded to the framework resource 520 by the theme manager 510. The theme resource data, as data corresponding to an event occurring from the outside or inside, may be one of data stored in the theme resource database 514. Theme resource data loaded to the framework resource 520 may be referenced by various applications (for example, the theme authoring application 502, the unlock application 503, and the launcher application 504).

Figure 6:
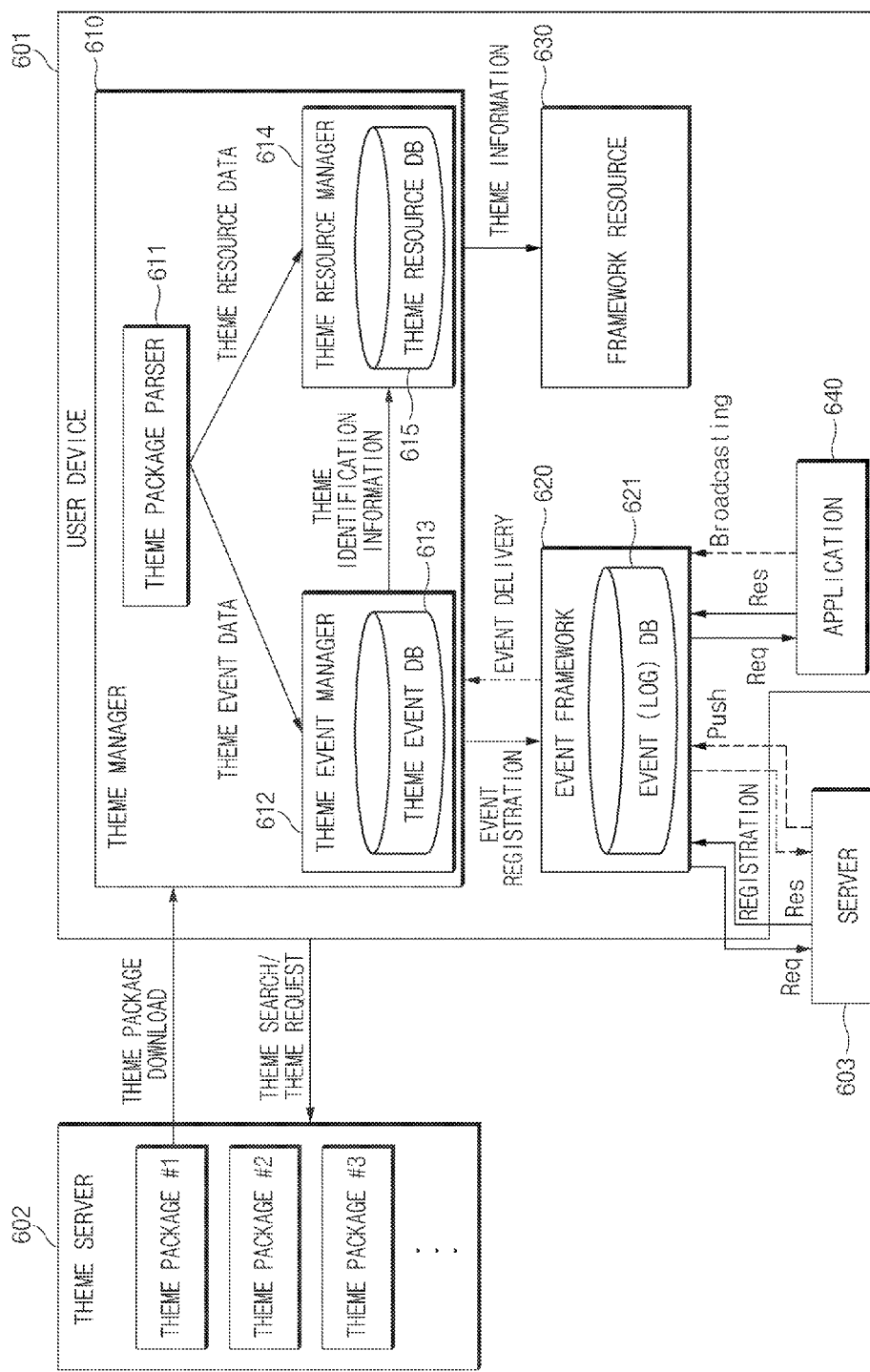
FIG. 6 is a view illustrating a user device according to an embodiment of the present disclosure.

FIG. 6 is a view illustrating a user device according to an embodiment of the present disclosure.

Referring to FIG. 6, a user device 601 according to various embodiments of the present disclosure may include a theme server 602 and a server 603. In relation to various devices and configurations described with the same name, overlapping description may be omitted. Additionally, as in the case of FIG. 5, an internal configuration of each device shown in FIG. 6 is executed by a processor and loaded to a memory, so that it may be implemented in terms of software. Additionally, various types of databases shown in FIG. 6 may be established in a memory.

The user device 601 may include a theme manager 610, an event framework 620, a framework resource 630, and an application 640.

The theme manager 610 may be included in a theme framework (not shown) (for example, corresponding to the theme framework 501 of FIG. 5). According to an embodiment of the present disclosure, the theme manager 610 may include a theme package parser 611, a theme event manager 612, and a theme resource manager 614.

The theme manager 610 of the user device 601 may download a theme package from the theme server 602. The theme package may be divided into theme event data and theme resource data by the theme package parser 611, which are delivered to the theme event manager 612 and the theme resource manager 614, respectively.

The theme event manager 612 may store theme event data and identification information of a theme corresponding to the theme event data in a theme event database 613. The theme resource manager 614 may store theme resource data and identification information of a theme corresponding to the theme resource data in a theme resource database 615.

When a predetermined event occurs, the event framework 620 may recognize the event and write the event occurrence in the event (log) database 621. Additionally, the event framework 620 may deliver or broadcast the recognized event to the theme event manager 612. Although it is shown in FIG. 6 that the event framework 620 and the theme event manager 612 are configured separately, according to various embodiments of the present disclosure, the event framework 620 and the theme event manager 612 may be integrated as one configuration and implemented.

The theme event manager 612 may check where there is event and theme identification information corresponding to the delivered event by referring to the theme event database 613. If there is theme identification information corresponding to the delivered event, the theme event manager 612 may deliver the theme identification information to the theme resource manager 614.

The theme resource manager 614 may extract theme resource data corresponding to theme identification information delivered from the theme event manager 612, from the theme resource database 615. The theme resource manager 614 may apply the extracted theme resource data to the framework resource 630. According to various embodiments of the present disclosure, the theme resource data may include layout information in addition to a theme resource.

Moreover, the theme event database 613 of the theme event manager 612 may be updated. For example, when a predetermined event is provided through the server 603 (for example, a server of a contents provider), it may be updated periodically by the server 603. For example, as property information of the user device 601 is registered to the server 603, when the predetermined event is updated, the theme event manager 612 may receive push notification.

Additionally, when the predetermined event is provided from the application 640 in the user device 601, it may be updated periodically by the application 640. Each time the predetermined event is updated by the application 640, a corresponding event may be delivered or broadcasted to the theme event framework 620.

Furthermore, if an event provided from the application 640 does not exist in the theme event database 613, the theme event manager 612 may search for a corresponding theme package from the theme server 602 based on the event delivered from the application 640.

After extracting a corresponding theme package through the search, the theme server 602 may the found theme package to the user device 601. The found theme package may be divided into theme event data and theme resource data by the theme package parser 611, which are delivered to the theme event manager 612 and the theme resource manager 614, respectively. Therefore, the theme resource data (this may include theme layout data) may be configured to be reflected on the framework resource 630 in correspondence to the event.

Figure 7:
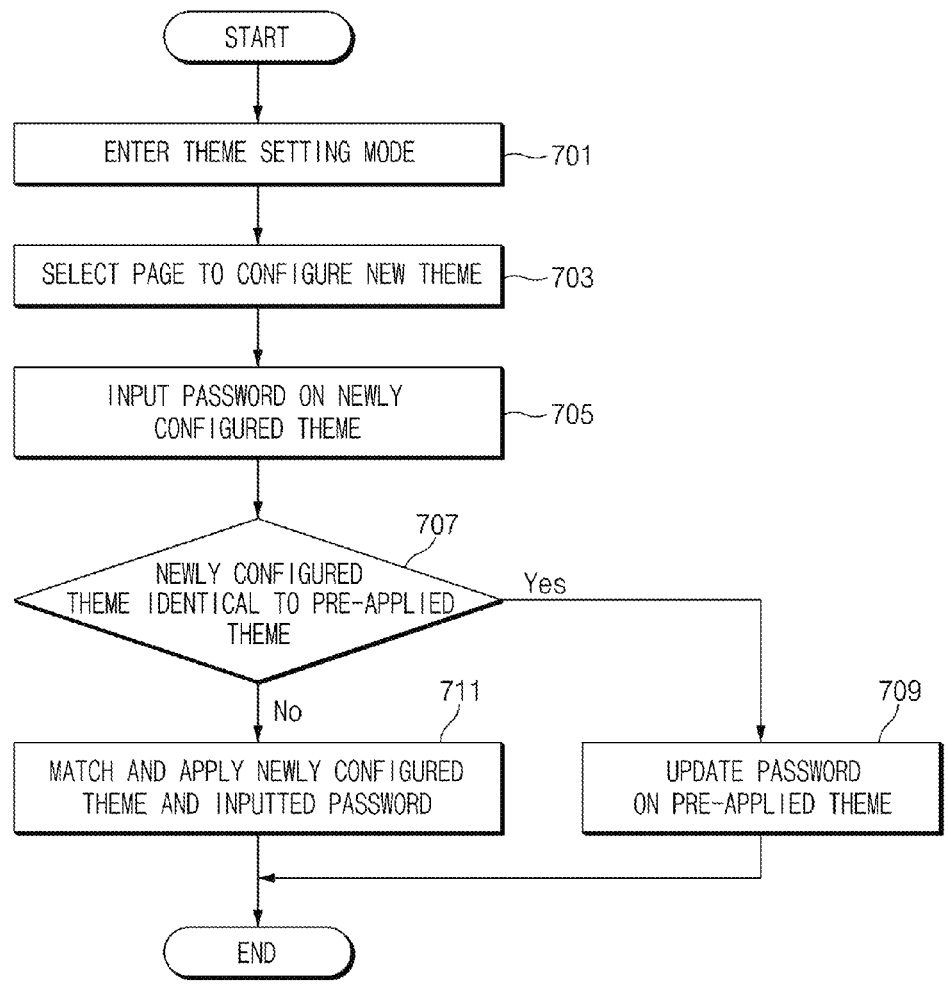
FIG. 7 is a flowchart illustrating a theme setting method of a user device according to an embodiment of the present disclosure.

FIG. 7 is a flowchart illustrating a theme setting method of a user device according to an embodiment of the present disclosure.

Referring to FIG. 7, a theme setting method of a user device (or an electronic device) according to an embodiment of the present disclosure may include operation 701 to operation 711. The theme setting method, for example, may be performed by the electronic device 101 of FIG. 1. In more detail, each operation of FIG. 7 may be performed mainly through the interaction between the processor 120 and the memory 130 of the electronic device 101, and a result of the interaction may be outputted to the display 160. Operation 701 to operation 711 are described below using the reference numerals of FIG. 1.

In operation 701, the processor 120 of the electronic device 101 (or a user device) may enter a theme setting mode to generate a user theme based on a set password. For example, the processor 120 may output a plurality or pages having applied various themes to the display 160 in the theme setting mode of a theme authoring application.

Figure 8A:
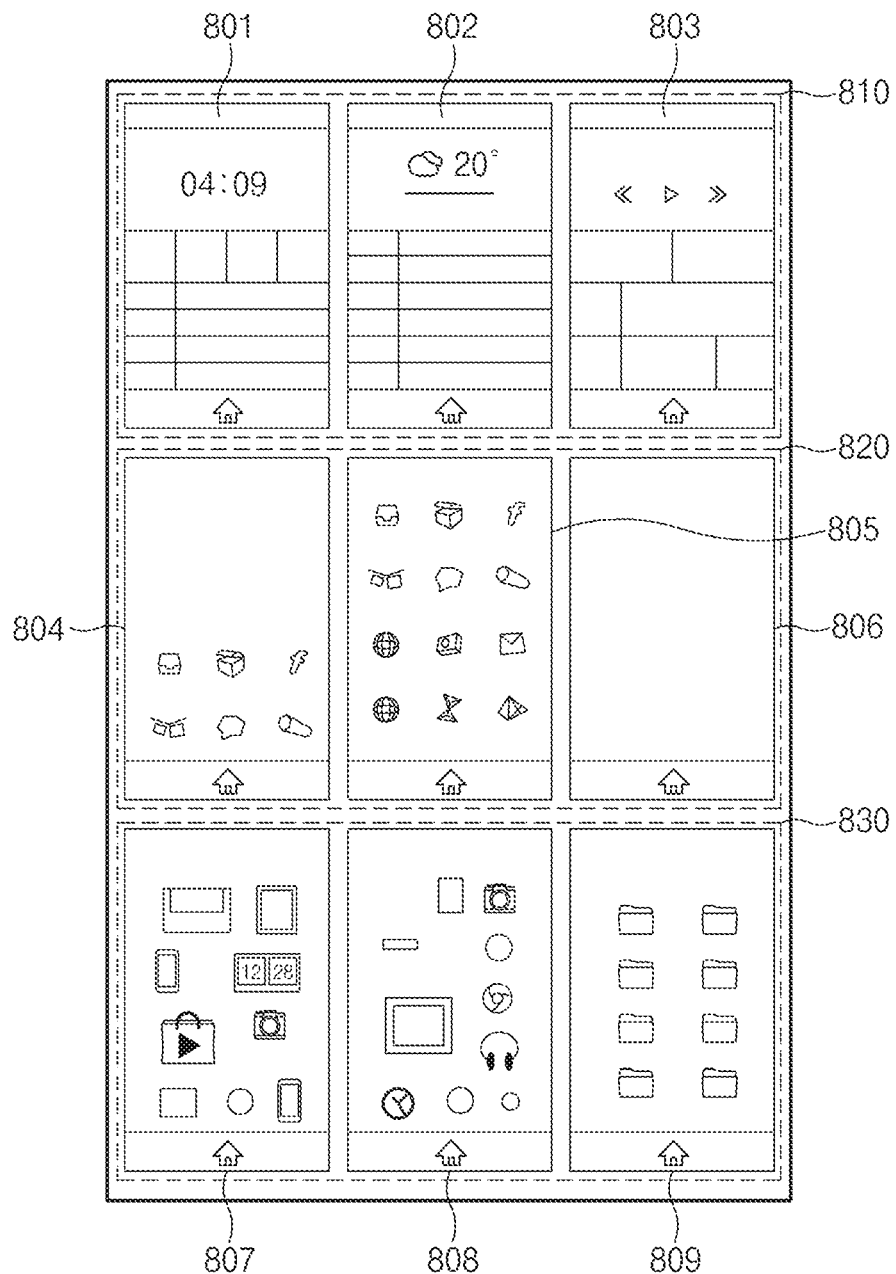
FIG. 8A is a view illustrating a home screen page of an electronic device according to an embodiment of the present disclosure.

FIG. 8A is a view illustrating a home screen page of an electronic device according to an embodiment of the present disclosure.

Referring to FIG. 8A, three themes 810 to 830, each configured with three home screen pages, are shown on the display 160 of the electronic device 101. The theme 810 may include home screen pages 801 to 803; the theme 820 may include home screen pages 804 to 806; and the theme 830 may include home screen pages 807 to 809. A consistent background image and color may be applied to pages according to each theme.

In operation 703, the electronic device 101 may receive a selection on at least one among a plurality of pages outputted to the display 160, from a user. A combination of the at least one selected one page may configure one (new) theme independently.

In operation 705, the electronic device 101 may receive a password on the newly configured theme and set the received password. The password may be configured with a confidential access number including numbers and/or letters but is not limited thereto. For example, the password may include various personal authentication means used in the electronic device 101, for example, face recognition authentication information, touch pattern authentication information, biometric authentication information (for example, fingerprint, iris, and vein information), and so on.

Figure 8B:
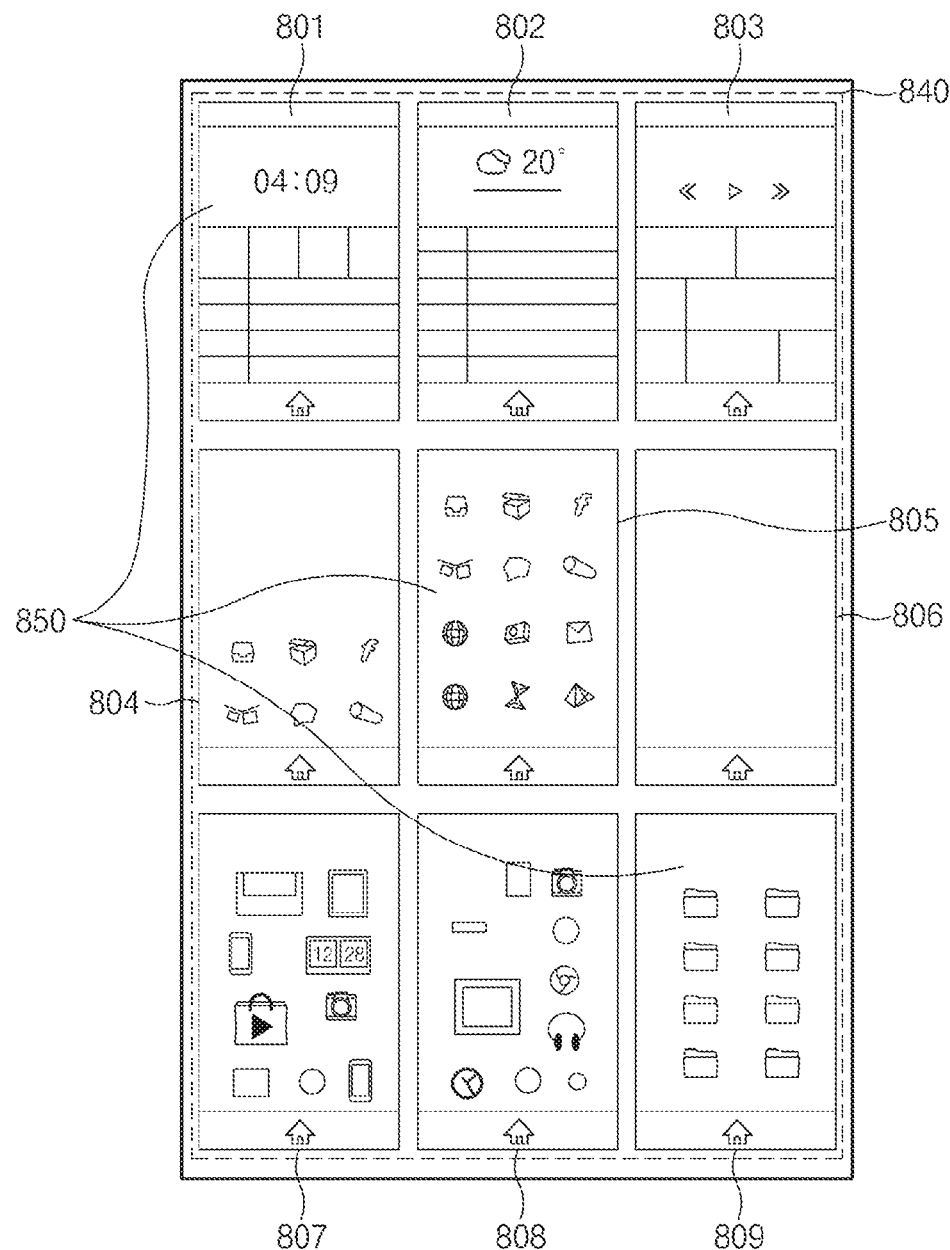
FIG. 8B is a view illustrating a home screen page of an electronic device according to an embodiment of the present disclosure.

FIG. 8B is a view illustrating a home screen page of an electronic device according to an embodiment of the present disclosure.

Referring to FIG. 8B, when a user selects the home screen pages 801 to 809, the processor 120 of the electronic device 101 may generate the selected home screen pages 801 to 809 as one theme 840. As a password relating to the generated theme 840, "1234" may be inputted and set to a corresponding theme. Additionally, when a user selects the home screen pages 801, 805, and 808, the processor 120 may generate the selected home screen pages 801, 805, and 808 as one theme 850. "5678" may be inputted to the generated theme 850 as a password and set to a corresponding theme.

In operation 707, the processor 120 of the electronic device 101 may determine whether the newly configured theme is identical to a pre-applied theme. For example, the processor 120 may determine whether the newly configured theme has the same home screen page as the pre-applied theme. According to various embodiments of the present disclosure, the processor 120 may determine whether the home screen pages of the theme generated in operation 705 are included identically among the home screen pages of the pre-applied theme. If the home screen pages of the theme generated in operation 705 are identical to or included in the home screen pages of the pre-applied theme, the method may proceed to operation 709 or if not, proceed to operation 711.

In operation 709, since the home screen pages of the theme generated in operation 705 are identical to or included in the home screen pages of the pre-applied theme ('Yes' in operation 707), a password for the pre-applied theme is updated with the password inputted in operation 705. At this point, the comparison of the theme for the home screen pages may be understood as the comparison of theme data.

In operation 711, since the home screen pages of the theme generated in operation 705 are not identical to or not included in the home screen pages of the pre-applied theme (No' in operation 707), by matching the newly configured theme in operation 703 to the password inputted in operation 705, the matching result may be applied to the electronic device 101.

Figure 9A:
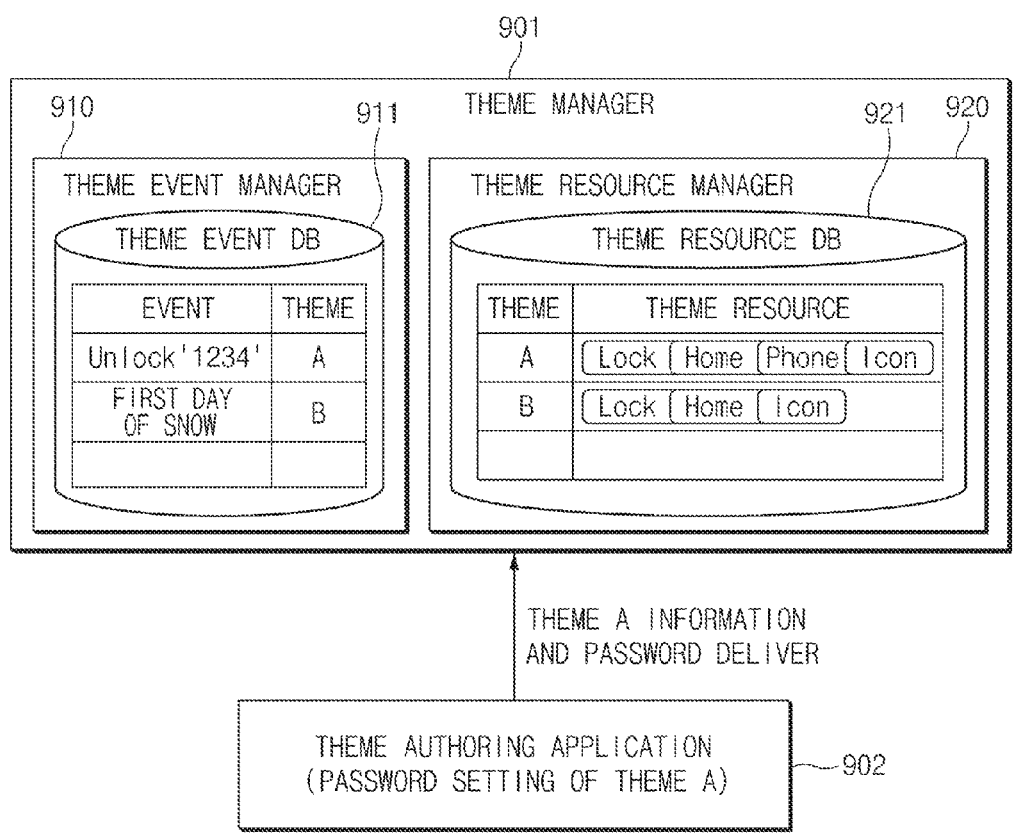
FIG. 9A is a view illustrating a software structure of an electronic device for describing a theme setting method according to an embodiment of the present disclosure.

FIG. 9A is a view illustrating a software structure of an electronic device for describing a theme setting method according to an embodiment of the present disclosure.

It is understood that a theme setting method according to various embodiments of the present disclosure is performed by various software modules (for example, configurations included in the theme framework 501 shown in FIG. 5), which are implemented through the interaction between the processor 120 and the memory 130 in FIG. 1. For example, referring to FIG. 9A, a software structure of an electronic device according to various embodiments of the present disclosure may include a theme manager 901 and a theme authoring application 902. For example, FIG. 9A may represent the case that a newly configured theme is identical to a pre-applied theme. In relation to the configurations shown in FIG. 9A, overlapping descriptions relating to FIG. 5 and/or FIG. 6 may be omitted.

For example, a user may select the home screen pages 801 to 809 of FIG. 8B by using the theme authoring application 902 to generate a theme A configured with the home screen pages 801 to 809. Additionally, a user may input an unlock password '1234' to call the theme A through the theme authoring application 902 (refer to operation 701 to operation 705 of FIG. 7 and the theme 840 of FIG. 8B).

A user may configure the theme A to be shown only when it is unlocked with '1234'. A user may select the theme A (including the home screen pages 801 to 809 of FIG. 8B) by using the theme authoring application 902 and set a password for the theme A.

The theme authoring application 902 (for example, configured with the home screen pages 801 to 809 of FIG. 8B) may deliver identification information of the theme A and the unlock password '1234' to the theme manager 901.

The theme resource manager 920 of the theme manager 901 may search for the theme A from the theme resource database 921. Since the theme A exists already in the theme resource database 921, the theme resource manager 920 may not update resource data of the theme A stored in the theme resource database 921.

Moreover, the theme event manager 910 of the theme manager 901 may search for the unlock password '1234' in an event corresponding to the theme A from the theme event database 911. If the unlock password '1234' exists as an event corresponding to the theme A in the theme event database 911, a corresponding unlock password may not be updated. On the other hand, if an unlock password for the theme A does not exist as an event in the theme event database 911, or an unlock password different from '1234' exists as an event, the unlock password '1234' may be stored in the theme event database 911 or updated as an event for the theme A.

Figure 9B:
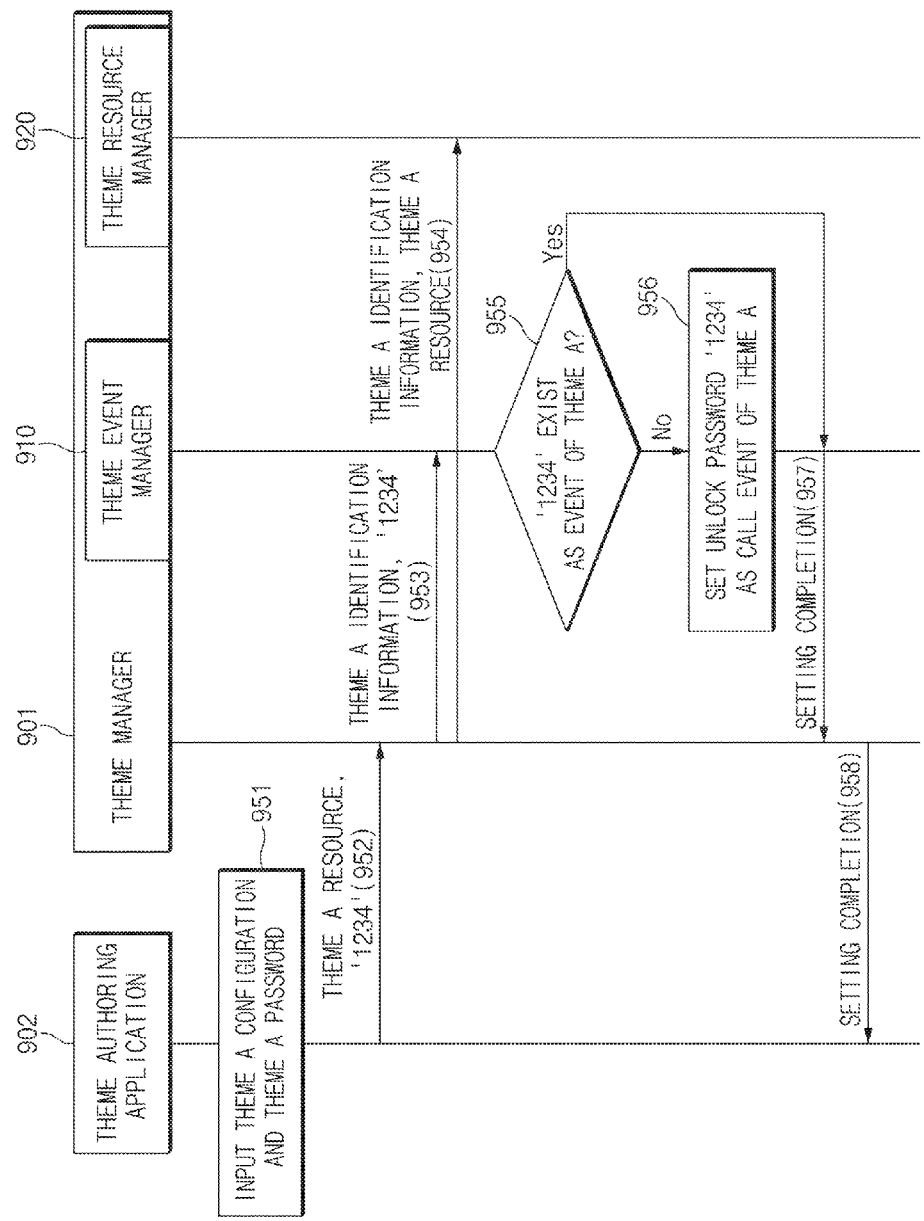
FIG. 9B is a flowchart illustrating a theme setting method according to an embodiment of the present disclosure.

FIG. 9B is a flowchart illustrating a theme setting method according to an embodiment of the present disclosure.

Referring to FIG. 9B, a theme setting method according to various embodiments of the present disclosure may include operation 951 to operation 958.

In operation 951, the theme authoring application 902 may configure the theme A (for example, configured with the home screen pages 801 to 809 of FIG. 8B) according to a user's operation and receive the password of the theme A. In operation 952, the theme authoring application 902 may deliver the resource of the theme A and the unlock password '1234' to the theme manager 901. In operation 953, the theme manager 901 may deliver identification information of the theme A and the unlock password '1234' to the theme event manager 910 and in operation 954, deliver the identification information of the theme A and the resource of the theme A to the theme resource manager 920.

In operation 955, the theme event manager 910 may determine whether the unlock password '1234' exits as an event of the theme A in the theme event database 911. If the unlock password '1234' exists as an event of the theme A in the theme event database 911, the theme event manager 910 may notify a response that setting is completed to the theme authoring application 902 through the theme manager 901 (in operation 957 and operation 958). On the other hand, in operation 955, if the unlock password '1234' does not exist as an event of the theme A in the theme event database 911, the theme event manager 910 may set the unlock password '1234' as a call event of the theme A (in operation 956).

Then, the theme event manager 910 may notify a response that setting is completed to the theme authoring application 902 through the theme manager 901 (in operation 957 and operation 958).

Figure 10A:
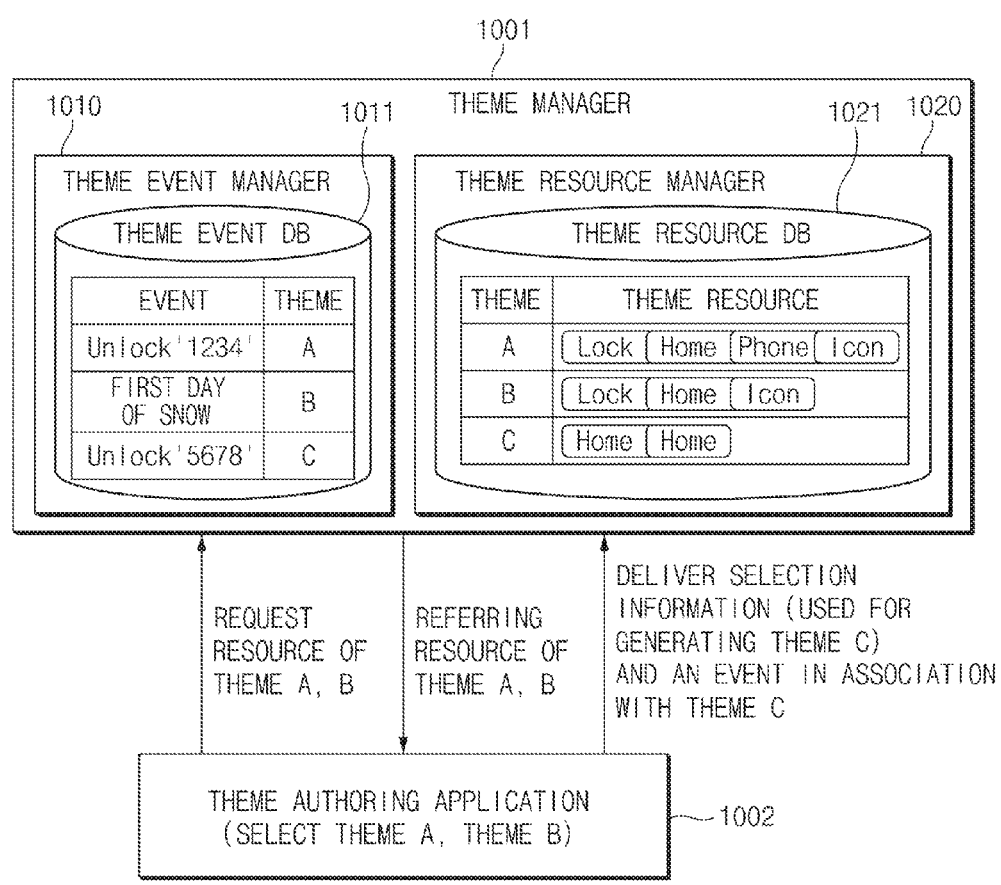
FIG. 10A is a view illustrating a software structure of an electronic device according to an embodiment of the present disclosure.

FIG. 10A is a view illustrating a software structure of an electronic device according to an embodiment of the present disclosure.

Referring to FIG. 10A, a software structure of an electronic device according to various embodiments of the present disclosure may include a theme manager 1001 and a theme authoring application 1002. Since it is possible that each configuration of FIG. 10A corresponds to a configuration of FIG. 9A, overlapping description may be omitted.

For example, the theme authoring application 1002 may select the home screen pages 801, 805, and 808 of FIG. 8B in a theme setting mode to generate a theme C configured with the home screen pages 801, 805, and 808. For example, the home screen pages 801 and 805 may be pages in the theme A and the home screen page 808 may be a page in the theme B.

In this case, the theme authoring application 1002 may request resources of the themes A and B from the theme manager 1001. The theme manager 1001 that receives the resource request may search for the resources of the theme A and the theme B from the theme resource database 1021 through the theme resource manager 1020 and load the found resources to a framework resource (not shown). The theme authoring application 1002 may provide a preview screen to a user by referring to the theme resource data (for example, a thumbnail, an index, and so on) of the theme A and the theme B loaded to the framework resource (not shown). The theme authoring application 1002 may refer to and select the theme home screen pages 801, 805, and 808 outputted to the preview screen and generate a theme C. A user may input an unlock password '5678' to call the theme C through the theme authoring application 1002 (refer to operation 701 to operation 705 of FIG. 7 and the theme 850 of FIG. 8B).

The theme authoring application 1002 (for example, configured with the home screen pages 801, 805, and 808 of FIG. 8B) may deliver identification information of the theme C and the unlock password '5678' to the theme manager 1001.

The theme resource manager 1020 of the theme manager 1001 may search for the theme C from the theme resource database 1021. Since the theme C does not exist in the theme resource database 1021, the theme resource manager 1020 may generate the theme C based on resource data of the theme A and the theme B stored in the theme resource database 1021 and register the generated theme C to the theme resource database 1021.

Moreover, the theme event manager 1010 of the theme manager 1001 may search for the unlock password '5678' in an event corresponding to the theme C from the theme event database 1011. Since the unlock password '5678' does not exist as an event in the theme event database 1011, the unlock password '5678' for the theme C may be stored/registered in the theme event database 1011, as shown FIG. 10A.

Figure 10B:
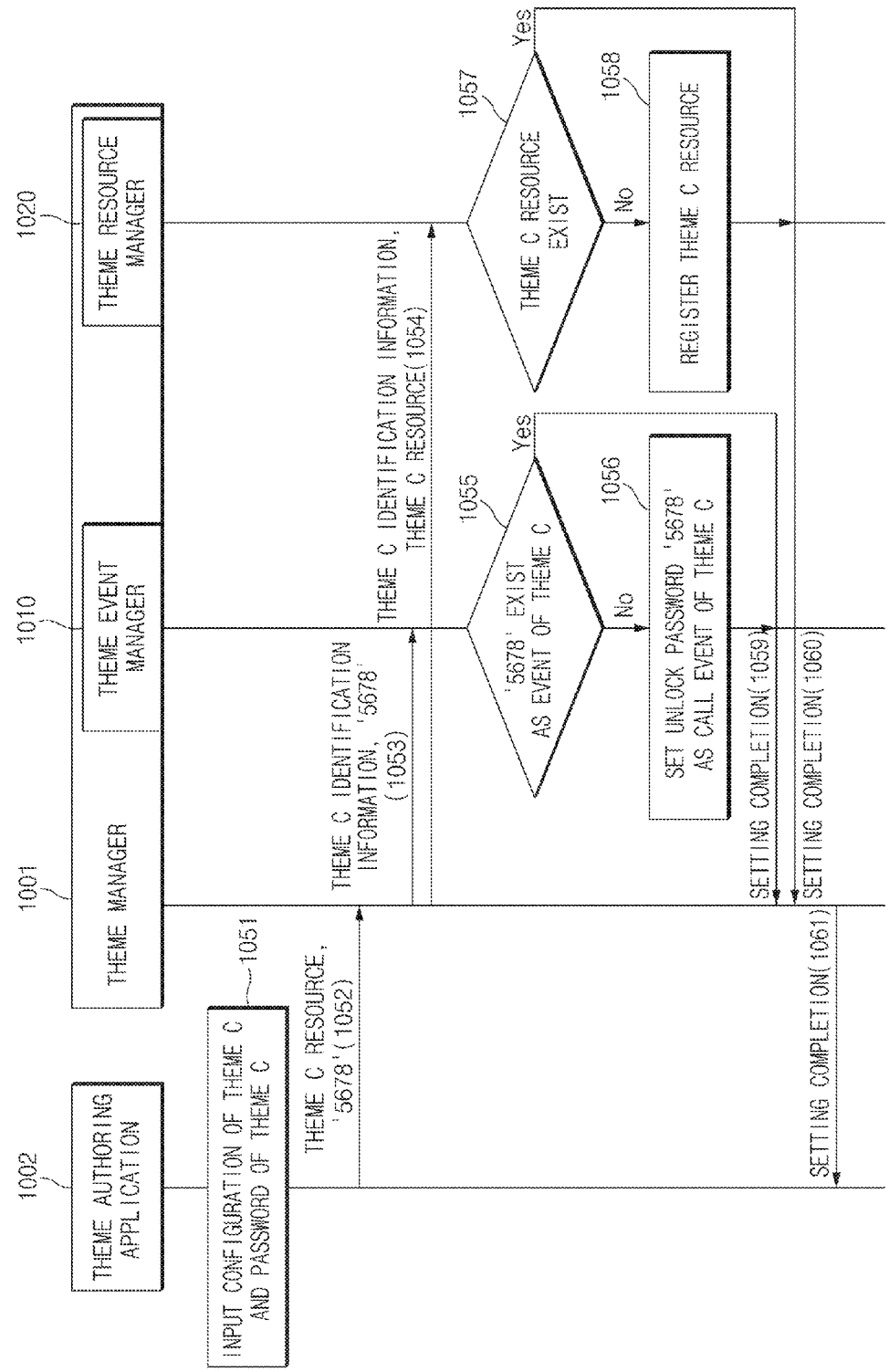
FIG. 10B is a flowchart illustrating a theme setting method according to an embodiment of the present disclosure.

FIG. 10B is a flowchart illustrating a theme setting method according to an embodiment of the present disclosure.

Referring to FIG. 10B, a theme setting method according to various embodiments of the present disclosure may include operation 1051 to operation 1061.

In operation 1051, the theme authoring application 1002 may configure the theme C (for example, configured with the home screen pages 801, 805, and 808 of FIG. 8B) according to a user's operation and receive the password of the theme C. In operation 1052, the theme authoring application 1002 may deliver the resource of the theme C and the unlock password '5678' to the theme manager 1001. In operation 1053, the theme manager 1001 may deliver identification information of the theme C and the unlock password '5678' to the theme event manager 1010 and in operation 1054, deliver the identification information of the theme C and the resource of the theme C to the theme resource manager 1020.

In operation 1055, the theme event manager 1010 may determine whether the unlock password '5678' exits as an event of the theme C in the theme event database 1011. If the unlock password '5678' exists as an event of the theme C in the theme event database 1011, the theme event manager 1010 may notify a response that setting is completed to the theme authoring application 1002 through the theme manager 1001 (in operation 1059 and operation 1061).

On the other hand, in operation 1055, if the unlock password '5678' does not exist as an event of the theme C in the theme event database 1011, the theme event manager 1010 may set the unlock password '5678' as a call event of the theme C (in operation 1056). Then, the theme event manager 1010 may notify a response that setting is completed to the theme authoring application 1002 through the theme manager 1001 (in operation 1059 and operation 1061).

In operation 1057, the theme resource manager 1020 may determine whether resource data of the theme C (for example, image and layout relating to each home screen page of the theme C) in the theme resource database 1021. If the resource data of the theme C exists already in the theme resource database 1021, the theme resource manager 1020 may notify a response that setting is completed to the theme authoring application 1002 through the theme manager 1001 (in operation 1060 and operation 1061).

On the other hand, in operation 1057, if the resource data of the theme C does not exist in the theme resource database 1021, the theme resource manager 1020 may register and store the resource data of the theme C in the theme resource database 1021 (in operation 1058). Then, the theme resource manager 1020 may notify a response that setting is completed to the theme authoring application 1002 through the theme manager 1001 (in operation 1060 and operation 1061).

The theme setting methods according to various embodiments of the present disclosure in FIGS. 7, 8A, 8B, 9A, 9B, 10A, and 10B are described based on the passwords configured with numbers (for example, "1234" and "5678"). However, a password set to a theme, that is, user authentication information, is not limited to the passwords configured with numbers. For example, the user authentication information may include password information configured with a combination of letters, numbers, and symbols, face recognition information, touch pattern information, and biometric authentication information (for example, fingerprint information, iris recognition information, and so on).

Figure 11:
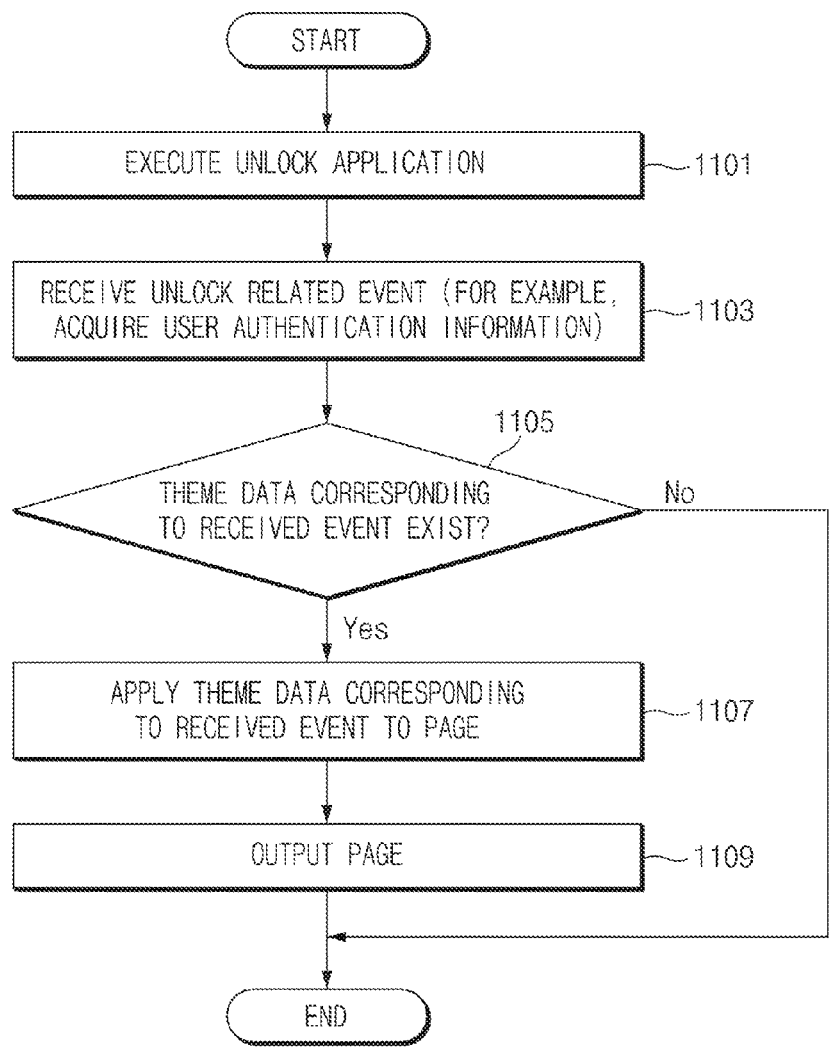
FIG. 11 is a flowchart illustrating a theme applying method of an electronic device according to an embodiment of the present disclosure.

FIG. 11 is a flowchart illustrating a theme applying method of an electronic device according to an embodiment of the present disclosure.

Referring to FIG. 11, a theme applying method of an electronic device (or a user device) according to an embodiment of the present disclosure may include operation 1101 to operation 1109. The theme applying method, for example, may be performed by the electronic device 101 of FIG. 1 after each operation of FIG. 7 is performed. In more detail, each operation of FIG. 11 may be performed mainly through the interaction between the processor 120 and the memory 130 of the electronic device 101, and a result of the interaction may be outputted to the display 160. Operation 1101 to operation 1109 are described below using the reference numerals of FIG. 1.

In operation 1101, the processor 120 of the electronic device 101 (or a user device) may execute an unlock application (for example, the unlock application 503 of FIG. 5). The user authentication module 180 may be activated by the execution of the unlock application.

In operation 1103, the processor 120 may receive an unlock related event. For example, the processor 120 may obtain user authentication information through the user authentication module 180. The user authentication information may include at least one of face recognition information, password information, touch pattern information, and biometric authentication information. According to various embodiments of the present disclosure, the user authentication information may be linked with a user account. For example, passwords "1234" and "5678" may be linked with the account of a user A and the account of a user B, respectively.

In operation 1105, the processor 120 may determine whether theme data corresponding to the user authentication information obtained in operation 1103 exists in the memory 130. For example, when it is determined that corresponding theme data exists in the memory 130, the processor 120 may proceed to operation 1107 and if not, terminate the theme applying method.

In operation 1107, the processor 120 may apply theme data corresponding to the user authentication information obtained in operation 1103 to a page. For example, the page may include pages relating to a home screen, a lock screen, or a cover screen, which is outputted to the display 160 of the electronic device 101. An application related object (for example, an icon/widget) may be outputted on a predetermined background image in the page. Additionally, for example, various objects (for example, an execution window) according to the execution of application may be outputted to the page.

According to various embodiments of the present disclosure, the theme data may include at least one of theme resource data and theme layout data. For example, the theme resource data may include background image data of a page outputted to the display 160 or image data of an object included in the page. Additionally, for example, the theme layout data may include data on the arrangement order or number of pages outputted to the display 160 or the arrangement position, size, or number of objects included in the page.

Additionally, according to various embodiments of the present disclosure, a page where the theme data is applied may include a plurality of pages. At this point, theme data applied to the plurality of pages may correspond to data obtained by combining different theme data.

In operation 1109, the processor 120 may output a page having applied theme data to the display 160.

FIG. 12 is a view illustrating a screen of an electronic device for describing a theme applying method according to an embodiment of the present disclosure.

The theme applying method may be performed after the theme setting method described with reference to FIGS. 7, 8A, 8B, 9A, 9B, 10A, and 10B is performed. FIG. 12 is described using the reference numerals of FIGS. 8B and 11.

Referring to FIG. 12, a screen 1201 may include home screen pages 801 to 809. When a user inputs "1234" as a password in operation 1103 of FIG. 11, the home screen pages, for example, may correspond to pages outputted in operation 1109. That is, the home screen pages 801 to 809 included in the screen 1201 may correspond to pages where theme data corresponding to the password "1234" is applied. As shown in the drawing, three theme data may be applied to the nine home screen pages 801 to 809.

The screen 1202 may include the home screen pages 801, 805, and 808. When a user inputs "5678" as a password in operation 1103 of FIG. 11, the home screen pages, for example, may correspond to pages outputted in operation 1109. That is, the home screen pages 801, 805, and 808 included in the screen 1202 may correspond to pages where theme data corresponding to the password "5678" is applied. One theme data corresponding to the password "5678" may be applied to the three home screen pages 801, 805, and 808, and correspond to theme data obtained by combining different three theme data.

Figure 13A:
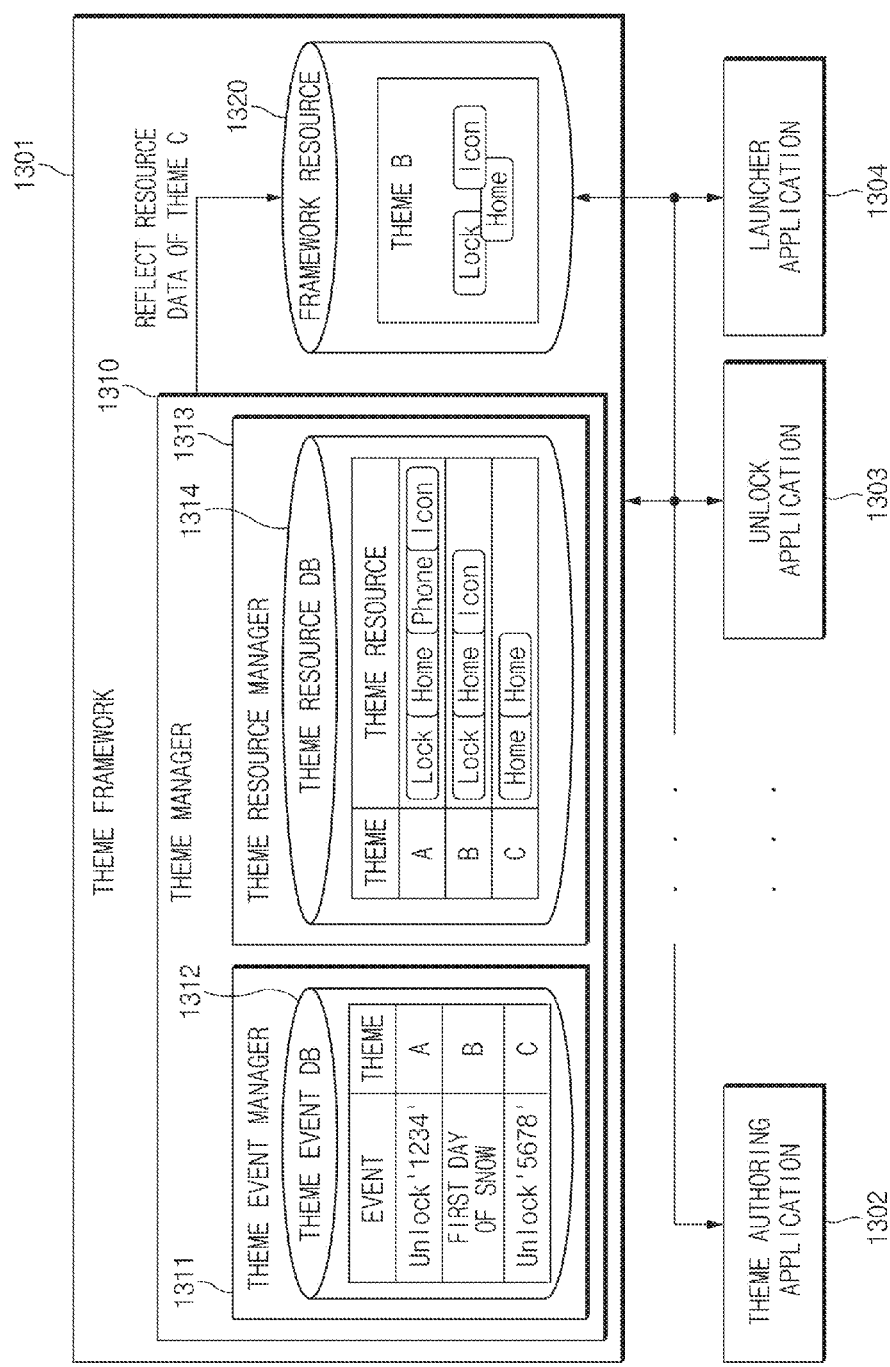
FIG. 13A is a view illustrating a software structure for describing a theme applying method according to an embodiment of the present disclosure.

FIG. 13A is a view illustrating a software structure for describing a theme applying method according to an embodiment of the present disclosure.

Referring to FIG. 13A, a software structure according to various embodiments of the present disclosure may include a theme framework 1301, a theme authoring application 1302, an unlock application 1303, and a launcher application 1304. The theme framework 1301 may include a theme manager 1310 and a framework resource 1320. The theme manager 1310 may include a theme event manager 1311, a theme event database 1312, a theme resource manager 1313, and a theme resource database 1314. The theme event database 1312 and the theme resource database 1314 are shown as a separate configuration but may be configured with one database. Events stored in the theme event manager 1311 may be part of a database structure regardless of database separation.

The configurations, for example, may be understood as various software modules implemented through the interaction between the processor 120 and the memory 130 of FIG. 1. Each configuration shown in FIG. 13A may correspond to each configuration shown in FIG. 5, and thus, overlapping description may be omitted.

The unlock application 1303 may deliver an unlock password (for example, user authentication information; one example of an event) inputted from a user to the theme manager 1310. For example, when the unlock password "5678" is received from a user, it may be delivered to the theme manager 1310. The theme event manager 1311 of the theme manager 1310 may search that a theme corresponding to the unlock password is stored in the theme event database 1312.

When it is determined that the theme corresponding to the unlock password is stored in the theme event database 1312, the theme event manager 1311 may deliver identification information of the corresponding theme to the theme resource manager 1313. For example, the theme event manager 1311 may determine that the theme C corresponding to the unlock password "5678" is stored, and thus, may deliver identification information of the theme C to the theme resource manager 1313.

The theme resource manager 1313 may load the corresponding theme, for example, resource data of the theme C, from the theme resource database 1314 to the framework resource 1320. Through this, the existing resource data of the theme B loaded to the theme resource manager 1313 may be updated with resource data of the theme C.

When the resource data of the theme C is loaded to the framework resource 1320, the resource data of the theme C may be referenced by various applications. For example, the launcher application 1304 may apply a corresponding theme C to a page of a home screen, a lock screen, or a cover screen by using the resource data of the theme C loaded to the framework resource 1320.

Figure 13B:
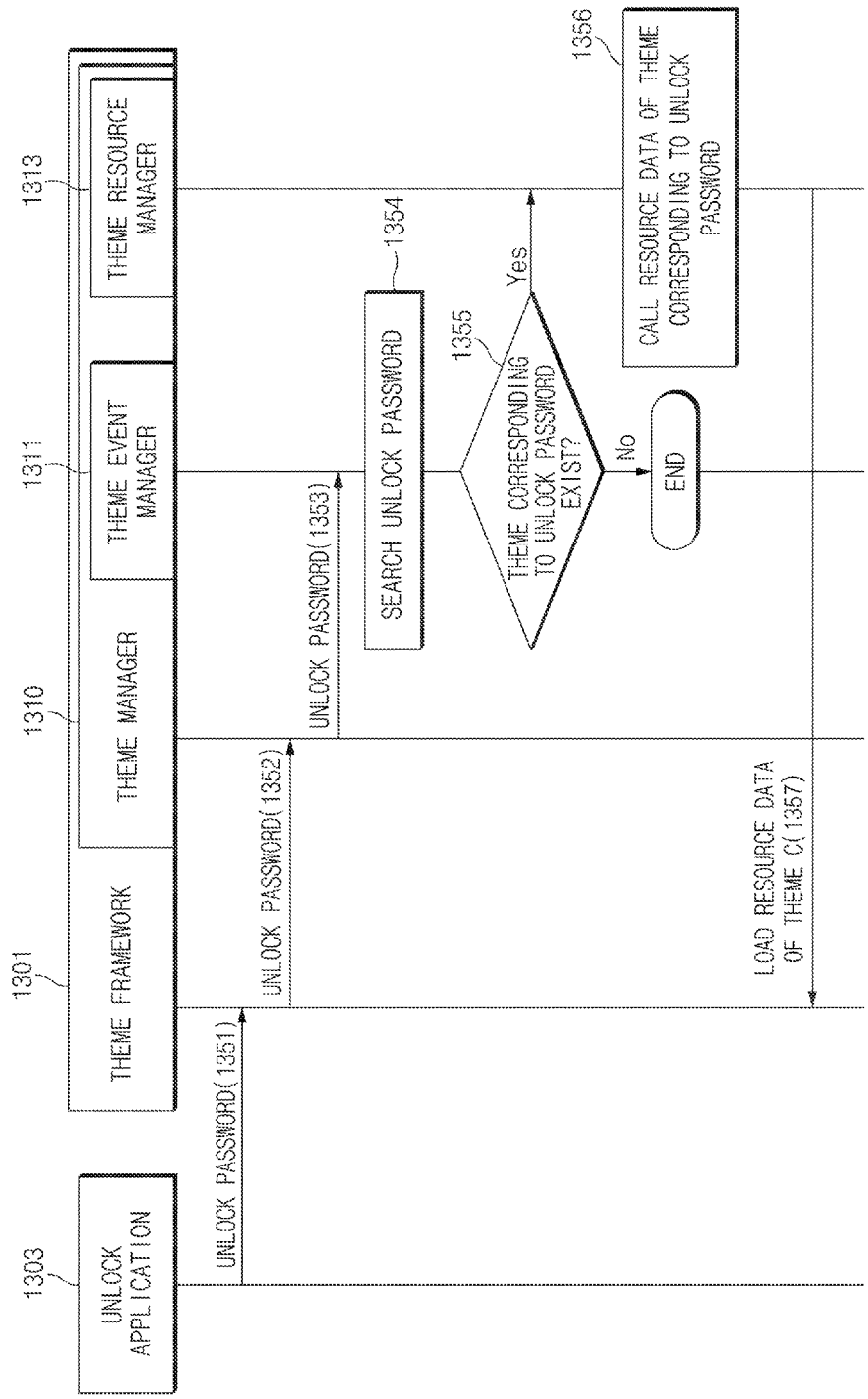
FIG. 13B is a flowchart illustrating a theme applying method according to an embodiment of the present disclosure.

FIG. 13B is a flowchart illustrating a theme applying method according to an embodiment of the present disclosure.

Referring to FIG. 13B, a theme applying method according to various embodiments of the present disclosure may include operation 1351 to operation 1357.

In operations 1351, 1352, and 1353, the unlock application 1303 may deliver an unlock password (for example, "5678") received from a user to the theme event manager 1311 through the theme framework 1301 and the theme manager 1310.

In operation 1354, the theme event manager 1311 may search for a theme corresponding to the unlock password from the theme resource database 1312.

In operation 1355, the theme event manager 1311 may determine whether there is a theme corresponding to the unlock password (for example, "5678"). If there is a theme (for example, the theme C) corresponding to the unlock password, the theme event manager 1311 may deliver identification information of the corresponding theme to the theme resource manager 1311, and if not, terminate the theme applying method.

In operation 1356, the theme resource manager 1313 may call resource data of the theme (for example, the theme C) corresponding to the unlock password, from the theme resource database 1314.

In operation 1357, the theme resource manager 1313 may load the called theme resource data (for example, resource data of the theme C) to the framework resource of the theme framework 1301.

According to various embodiments of the present disclosure, a user may receive pages having various applied themes differently according to user authentication information. Through this, even if someone else uses an electronic device, a user may receive themed pages variously while maintaining security.

Figure 14A:
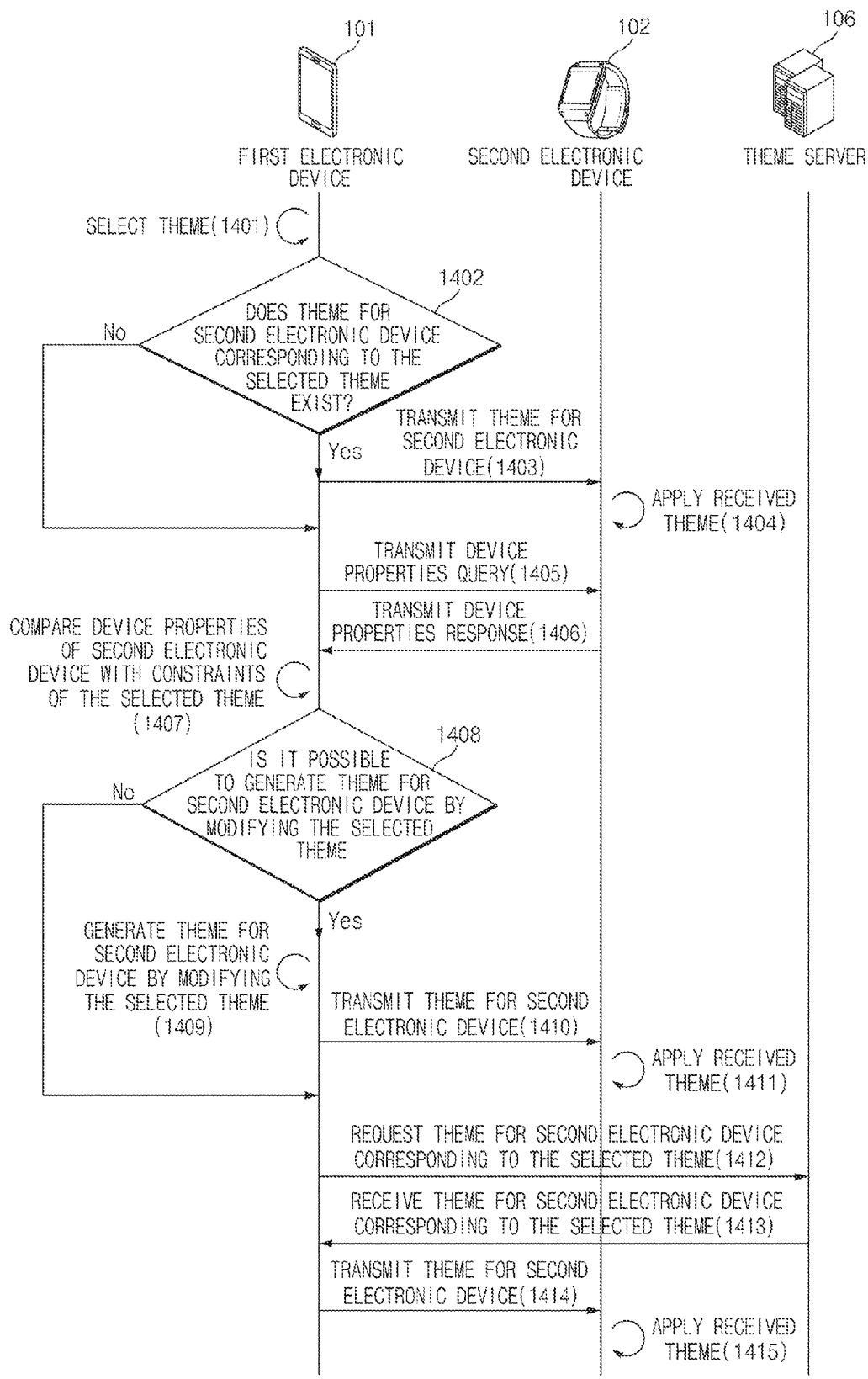
FIG. 14A is a view illustrating a theme sharing method according to an embodiment of the present disclosure.

FIG. 14A is a view illustrating a theme sharing method according to an embodiment of the present disclosure.

Referring to FIG. 14A, a theme sharing method according to an embodiment of the present disclosure may include operation 1401 to operation 1415. The theme sharing method shown in FIG. 14A, for example, may be performed by the (first) electronic device 101, the (second) electronic device 102, and the theme server 106 shown in FIG. 1.

In operation 1401, the processor 120 of the first electronic device 101 may receive a user input on a theme selection from a user through a predetermined input device and a corresponding UI. For example, the first electronic device 101 may receive a selection on at least one of at least one theme data for first electronic device stored in the built-in memory 130. The at least one theme data for first electronic device may include theme data received from the theme server 106 and theme data stored in advance while the first electronic device 101 is manufactured.

According to various embodiments of the present disclosure, in operation 1401, the processor 120 of the first electronic device 101 may parse theme data (for first electronic device) that a user selects and apply the parsed theme data to the first electronic device 101 itself.

In operation 1402, the processor 120 of the first electronic device 101 may determine whether there is a theme for second electronic device corresponding to the selected theme. For example, the processor 120 may determine whether theme data for second electronic device corresponding to the theme data for first electronic device selected in operation 1401 is stored in the memory 130. The theme data for second electronic device may correspond to theme data implemented through the concept corresponding to the theme data for first electronic device. If there is no theme data for second electronic device 102 in the first electronic device 101, the first electronic device 101 may perform operation 1403 ('Yes' in operation 1402), and if not, perform operation 1405 ('No' in operation 1402).

Moreover, according to various embodiments of the present disclosure, in operation 1402, if there is no theme data for second electronic device 102 in the first electronic device 101 (No' in operation 1402), the theme sharing method may not proceed to operation 1405 but proceed to operation 1408 or operation 1412. That is, each operation of the first electronic device 101 may not be constrained to the operation order shown in FIG. 14A.

In operation 1403, the processor 120 of the first electronic device 101 may transmit the theme data for second electronic device through the communication interface 170 ('Yes' in operation 1402). That is, the processor 120 of the first electronic device 101 may transmit the theme data for second electronic device stored in advance in the memory 130, to the second electronic device 102.

According to various embodiments of the present disclosure, the second electronic device 102 may store, in a memory, the theme data for second electronic device corresponding to the theme data for first electronic device. In this case, in operation 1403, the first electronic device 101 may transmit, to the second electronic device 102, identification information of the theme data for second electronic device corresponding to the theme data for first electronic device. The second electronic device 102 may apply a theme corresponding to the received identification information to the second electronic device 102 itself.

In operation 1404, the second electronic device 102 may apply the theme received in operation 1403 to the second electronic device 102 itself. For example, the processor of the second electronic device 102 may install and apply the theme data for second electronic device received from the first electronic device 101.

If there is no theme data for second electronic device corresponding to the theme data for first electronic device (No' in operation 1402), in operation 1405, the first electronic device 101 may transmit a device properties query to the second electronic device 102. Since the first electronic device 101 does not have the theme data for second electronic device corresponding to the theme data for first electronic device selected in operation 1401, in order to generate corresponding theme data for second electronic device, the first electronic device 101 may query device properties (for example, hardware/software specification of a device) to the second electronic device 102. For example, the device properties may include the number, form (for example, a square, rectangular, or circular form), and type (for example, AMOLED, LCD, or a projector) of a display, the resolution of a display, the number of color tones in a display, the type and version of OS, and the manufacturer of a device.

According to various embodiments of the present disclosure, the device properties query may be transmitted to the theme server 106. In this case, the first electronic device 101 may transmit device identification information of the second electronic device 102 to the theme server 106. The theme server 106 may provide the device properties of the second electronic device 102 to the first electronic device 101 based on the device identification information.

In operation 1406, the second electronic device 102 may transmit a device properties response including its hardware and/or software specification to the first electronic device 101. For example, the second electronic device 102 may include a smartphone with a rectangular AMOLED display for supporting 1920×1080 resolution, a smart watch with a circular AMOLED display for supporting 320×320 resolution, an MP3 player with a 256 color EL display, and a TV with a rectangular LCD for supporting 4096×2160 resolution.

In operation 1407, the processor 120 of the first electronic device 101 may compare the device properties of the second electronic device 102 received in operation 1406 and constraints of the theme data for first electronic device selected in operation 1401.

According to various embodiments of the present disclosure, constraints of the theme may include constraints or a modification range for modifying the theme data. For example, the constraints may include an enlargement/reduction limit range of various images (included in theme resource data), a resizing limit range, the center point of image cropping, a range of a dominant color in an image, a representative texture of an image, a sampling rate of a background sound, and a compression ratio change range. The constraints may be set when corresponding theme data is generated and may be included as part of corresponding theme data.

In operation 1408, based on the comparison result in operation 1407, the processor 120 of the first electronic device 101 may determine whether it is possible to generate the theme data for second electronic device by modifying (or adjusting) the theme data for first electronic device selected in operation 1401. If it is possible to generate the theme data for second electronic device by modifying the theme data for first electronic device, the first electronic device 101 may perform operation 1409, and if not, perform operation 1412.

In operation 1409, the processor 120 of the first electronic device 101 may generate a theme for second electronic device by modifying the theme for first electronic device selected in operation 1401. For example, the processor 120 of the first electronic device 101 may generate theme data for second electronic device based on theme data for first electronic device, constraints of the theme data for first electronic device, and the device properties of the second electronic device 102.

According to various embodiments of the present disclosure, the processor 120 of the first electronic device 101 may modify the theme data based on the properties of a display included in the second electronic device 102 (or another electronic device). For example, the processor 120 of the first electronic device 101 may generate various images to be included in second theme data by enlarging/reducing, resizing, or cropping (or trimming) various images (for example, the background image of a home screen, the background image of a lock screen, and the image of an icon/widget) included in the theme data for first electronic device. Through this, theme data may be modified. At this point, the processor 120 of the first electronic device 101 may abide by limitation of the theme data for first electronic device.

Additionally, according to various embodiments of the present disclosure, it may be difficult for the first electronic device 101 to generate theme data for second electronic device including various images. For example, since the second electronic device 102 includes only a display with limited graphic performance, this may correspond to the case that theme data for second electronic device including various images cannot be generated. The first electronic device 101 may extract dominant color information, representative pattern information, and texture code information from various images included in the theme data for first electronic device, and generate corresponding information instead of theme data for second electronic device. Through this, the second electronic device 102 may direct a similar atmosphere to a theme applied to the first electronic device 101. For example, when the theme of a bluish Samsung logo is applied to the first electronic device 101, a bluish color may be applied to the background image of the second electronic device 102. A texture or pattern relating to the Samsung logo may be applied to the background image of the second electronic device 102.

In operation 1410, the processor 120 of the first electronic device 101 may transmit the modified theme, that is, theme data for second electronic device, to the second electronic device 102 through the communication interface 170.

In operation 1411, the processor of the second electronic device 102 may apply the theme received in operation 1410 to the second electronic device 102 itself. For example, the processor of the second electronic device 102 may parse the theme data for second electronic device received from the first electronic device 101 to install or apply it to the electronic device 102 itself.

In operation 1412, since the processor 120 of the first electronic device 101 cannot generate theme data for second electronic device by modifying theme data for first electronic device, it may request the theme data for second electronic device corresponding to the theme data for first electronic device from the theme server 106.

According to various embodiments of the present disclosure, the processor 120 of the first electronic device 101 may request various resources for generating theme data for second electronic device from the theme server 106.

In operation 1413, the theme server 106 may search for theme for second electronic device corresponding to the selected theme and transmit it to the first electronic device 101. According to various embodiments of the present disclosure, the theme server 106 may transmit various resources for generating theme data for second electronic device to the first electronic device 101.

In operation 1414, the processor 120 of the first electronic device 101 may transmit a theme to the second electronic device 102 through the communication interface 170.

In operation 1415, the processor of the second electronic device 102 may install or apply the theme received in operation 1413 to the second electronic device 102 itself.

Figure 14B:
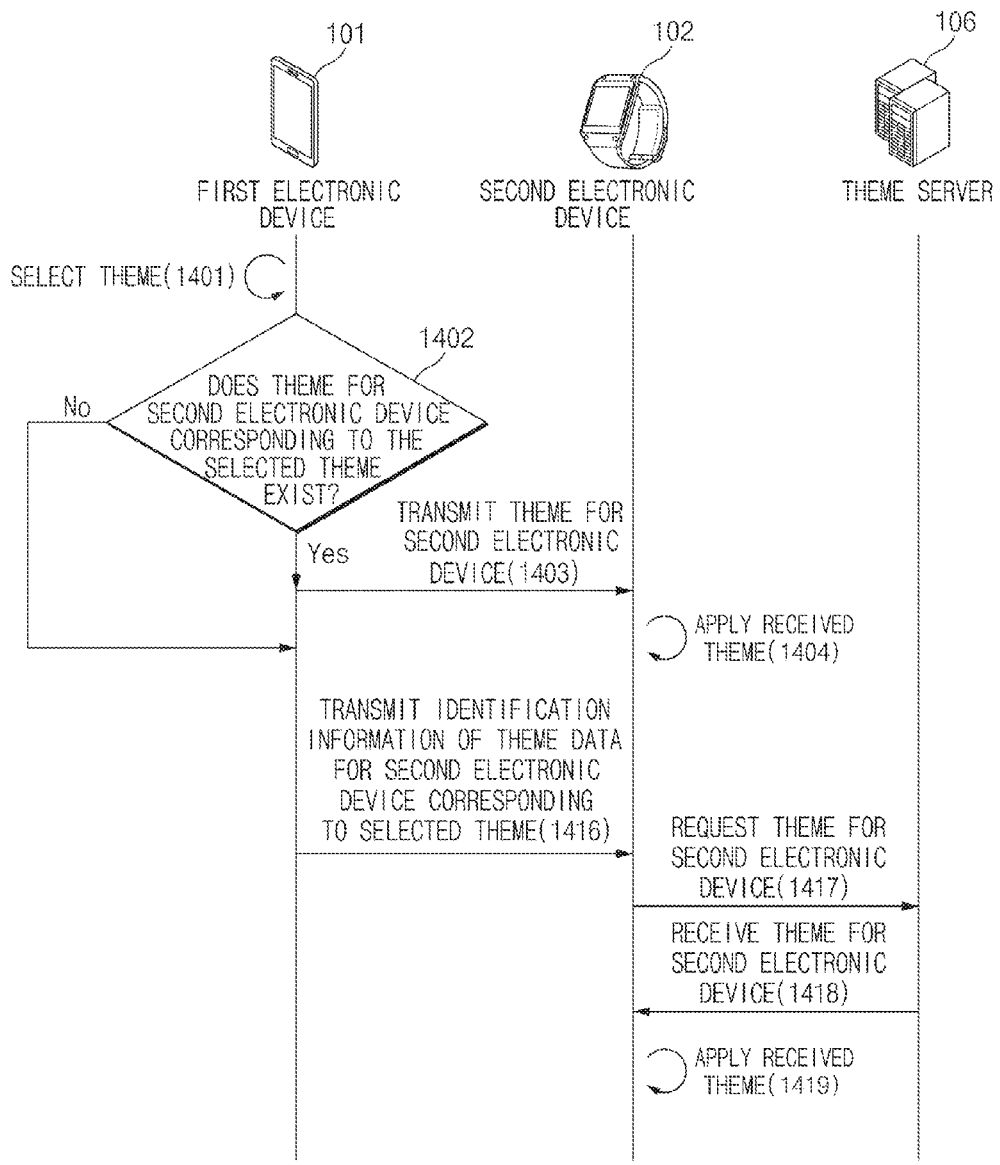
FIG. 14B is a view illustrating a theme sharing method according to an embodiment of the present disclosure.

FIG. 14B is a view illustrating a theme sharing method according to an embodiment of the present disclosure.

Referring to FIG. 14B, a theme sharing method according to an embodiment of the present disclosure may include operation 1401 to operation 1404 and operation 1416 to operation 1419. The theme sharing method shown in FIG. 14B, as shown in FIG. 14A, may be performed by the (first) electronic device 101, the (second) electronic device 102, and the theme server 106 shown in FIG. 1. At this point, the second electronic device 102 may be directly communicated with the theme server 106 (so called stand-alone). Additionally, description for operations 1401 to 1404 is made above with reference to FIG. 14A and in relation to FIG. 14B, corresponding description may be omitted.

In operation 1416, the first electronic device 101 may transmit, to the second electronic device 102, identification information of the theme data for second electronic device corresponding to the theme selected in operation 1401. For example, the identification information of the theme data for second electronic device may include identification (ID) of the theme data selected in operation 1401 and a path for downloading corresponding theme data.

In operation 1417, the second electronic device 102 may request corresponding theme data for second electronic device from the theme server 106 by using identification information of the theme data for second electronic device received from the first electronic device 101. According to an embodiment of the present disclosure, when requesting corresponding theme data from the theme server 106, the second electronic device 102 may consider the device properties and/or constraints of the second electronic device 102 itself.

In operation 1418, the theme server 106 may search for the theme for second electronic device requested from the second electronic device 102 and transmit it to the second electronic device 102.

In operation 1419, the processor of the second electronic device 102 may install or apply the theme received in operation 1418 to the second electronic device 102 itself.

Moreover, according to various embodiments of the present disclosure, the second electronic device 102 may correspond to an electronic device where the installation or application of a theme is impossible. In this case, the first electronic device 101 or the theme server 106 may provide individual resource data such as the background image of a home screen and the image of an icon/widget instead of theme data to the second electronic device 102.

In this case, each operation of the first electronic device 101, the second electronic device 102, or the theme server 106 may be performed based on resource data for individual second electronic device instead of theme data for second electronic device.

For example, in operation 1402 of FIG. 14A and FIG. 14B, the first electronic device 101 may determine whether there is resource data for second electronic device corresponding to the selected theme. Additionally, for example, in operation 1409 of FIG. 14A, the first electronic device 101 may modify theme data to generate resource data to be provided to the second electronic device 102. Additionally, in operation 1416 to operation 1418 of FIG. 14B, the second electronic device 102 may request resource data for corresponding second electronic device from the theme server 106 based on identification information of the resource data for second electronic device received from the first electronic device 101 and receive the requested resource data.

Figure 15:
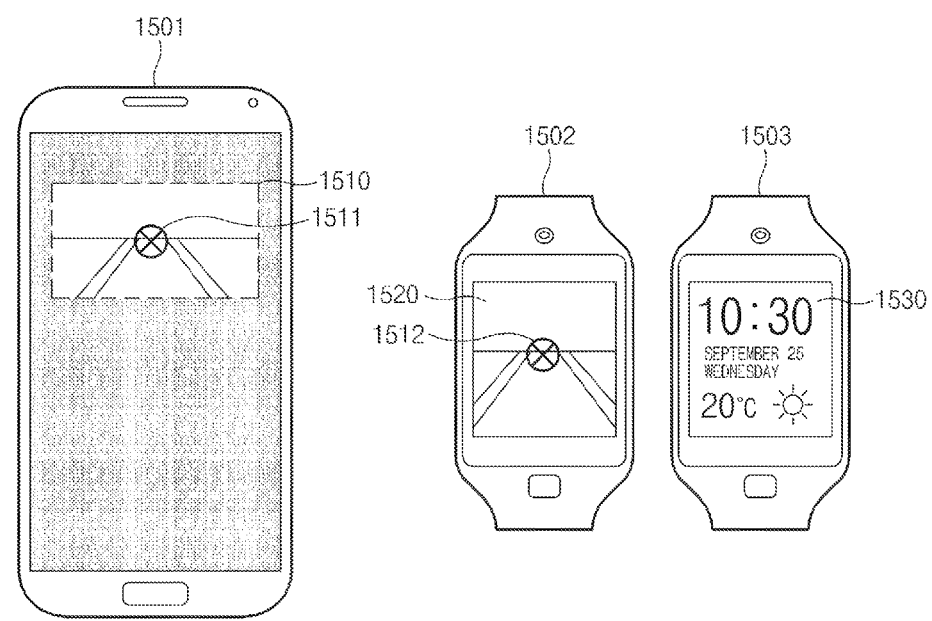
FIG. 15 is a view illustrating a theme applying method according to an embodiment of the present disclosure.

FIG. 15 is a view illustrating a theme applying method according to an embodiment of the present disclosure.

Referring to FIG. 15, a first electronic device 1501 (for example, corresponding to the electronic device 101) may transmit modified theme data to a second electronic device (for example, corresponding to the electronic device 102) or a third electronic device 1503 (for example, corresponding to the electronic device 104).

According to an embodiment of the present disclosure, the first electronic device 1501 may generate a home screen background image for second electronic device by cropping a home screen background image that is one of theme data applied to the first electronic device 1501 itself. At this point, the first electronic device 1501 may generate a home screen background image for second or third electronic device by considering a cropping center point 1511 and a cropping range 1510, that is, constraints.

The home screen background image for second or third electronic device may be transmitted to the second electronic device 1502 or the third electronic device 1503. The second electronic device 1502 or the third electronic device 1503 may apply the received home screen background image to the device 1502 or 1503 itself. Therefore, a home screen background image 1520 or 1530 of the second electronic device 1502 or the third electronic device 1503 may be configured based on the cropping center point 1512.

According to various embodiments of the present disclosure, the first electronic device 1501 may extract dominant color information, representative pattern information, and texture code information from various images included in theme data applied to the first electronic device 1501 itself. The first electronic device 1501 may transmit the color information, the pattern information, and the texture code information to the second electronic device 1502 and/or the third electronic device 1503. The second electronic device 1502 and/or the third electronic device 1503 may modify a resource of pre-applied theme data according to the color information, the pattern information, and the texture code information. Therefore, the first electronic device 1501, the second electronic device 1502 and/or the third electronic device 1503 may share similar color, pattern, and texture.

Additionally, according to various embodiments of the present disclosure, the second electronic device 1502 and/or the third electronic device 1503 may store theme data corresponding to the theme data applied to the first electronic device 1501. In this case, the second electronic device 1502 and/or the third electronic device 1503 may synchronize and apply corresponding theme data according to a predetermined control signal from the first electronic device 1501.

Figure 16:
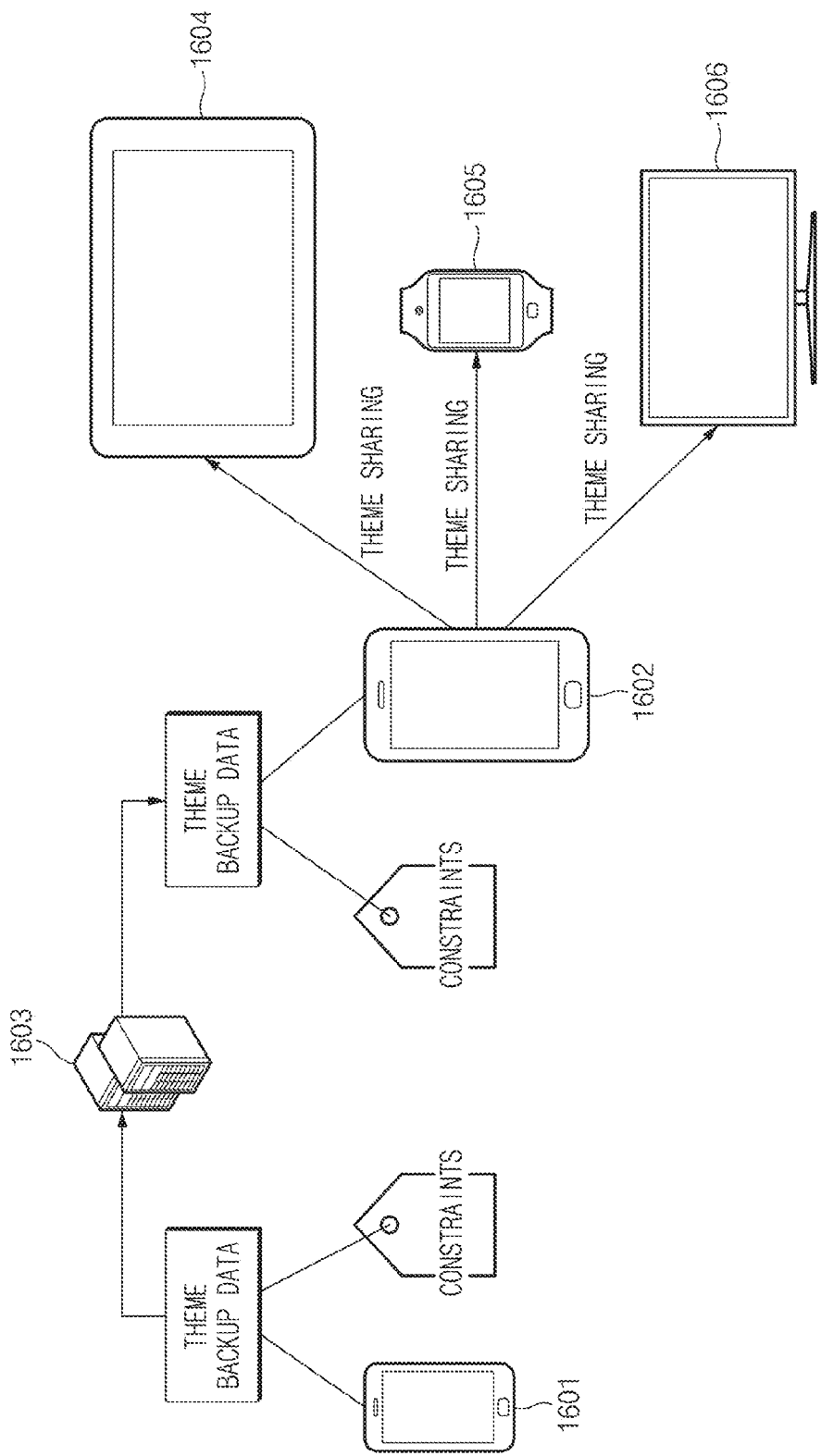
FIG. 16 is a view illustrating a theme setting method according to an embodiment of the present disclosure.

FIG. 16 is a view illustrating a theme setting method according to an embodiment of the present disclosure.

Referring to FIG. 16, a smartphone 1601 may back up theme data (for example, theme backup data) applied to the smartphone 1601 itself to the theme server 1603. The theme backup data may include constraints for theme modification. The smartphone 1602 may download the theme data that the smartphone 1601 backs up and apply it to the smartphone 1602 itself. The theme sharing method described with reference to FIG. 14A or FIG. 14B may be performed between the smartphone 1601 and the smartphone 1602. At this point, since the smartphone 1602 has different device properties from the electronic device 1601 but has something in common in terms of a smartphone, theme data modification may be performed relatively easily.

In addition to applying the theme data received from the theme server 1603, the smartphone 1602 may share the received theme with a tablet PC 1604, a smart watch 1605, and a smart TV 1606 (hereinafter referred to as a peripheral device), which are connected to the smartphone 1602. At this point, the theme sharing method described with reference to FIG. 14A or FIG. 14B may be performed between the smartphone 1601 and each peripheral device.

According to various embodiments of the present disclosure, a first electronic device may modify theme data applied thereto to correspond to a theme application ability (for example, device properties) of a second electronic device and share the modified theme data with the second electronic device. Through this, a theme corresponding to each other may be applied to a first electronic device and a second electronic device, so that consistent atmosphere or look & feel may be implemented between both devices.

Additionally, when a theme for new device is not yet released or an electronic device is replaced, an existing theme may be modified and applied to a corresponding new device and replaced electronic device.

Figure 17:
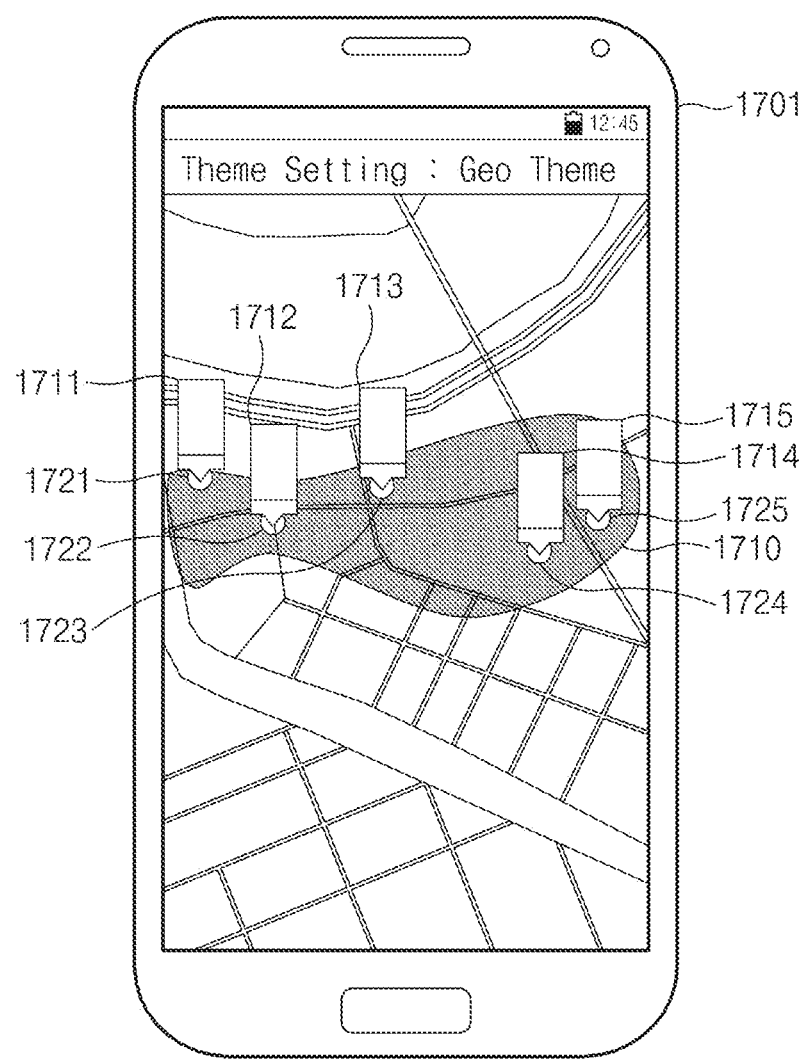
FIG. 17 is a view illustrating a theme applying method using geo-fence according to an embodiment of the present disclosure.

FIG. 17 is a view illustrating a theme applying method using geo-fence according to an embodiment of the present disclosure.

Referring to FIG. 17, a theme applying method according to an embodiment of the present disclosure may operate based on geo-fence (that is, a virtual area partitioned on an actual terrain). For example, a user of an electronic device 1701 may execute a setting menu for geo-fence based theme. By executing the setting menu for geo-fence based theme, a predetermined map may be outputted to a display.

A user may specify a predetermined area 1710 through a predetermined gesture on the map outputted to the display. When the predetermined area 1710 is specified, geo-fences 1721 to 1725 included in the area 1710 and objects 1711 to 1715 (for example, thumbnails and texts) of a theme corresponding thereto may be displayed. For example, when a user selects (for example, touches or hovers on) one of the objects 1711 to 1715 (for example, thumbnails and texts), detail information of a theme relating to the selected object may be displayed.

The detail information of a theme, for example, may include a theme name, a creator, a theme image (for example, screen shot), keyword or event information (for example, type, name, occurrence timing, application range, and so on) for determining whether a theme is applied, terrain information including at least one of latitude and longitude coordinates, radius, elevation, address, and whether it is indoor or outdoor, download related information (for example, whether it is downloaded, link, and the number of times), whether it is installed (for example, whether it is installed, a download path, the number of times), whether it is free or not, a purchase history, whether it is previewed and use restriction condition, a theme change date (creation, registration, and update), a theme popularity ranking, and the radius of a theme application area (geo-fence).

For example, the electronic device 1701 may detect that it enters the geo-fences 1721 to 1725 through a built-in location detection module (for example, a GPS module, a GNSS module, and so on) to execute a corresponding theme. Alternatively, the electronic device 1701, for example, may detect it enters the geo-fences 1721 to 1725 to download a corresponding theme from the theme server 106. The execution condition and/or download condition of the theme may be pre-set in theme data corresponding to geo-fence.

Figure 18:
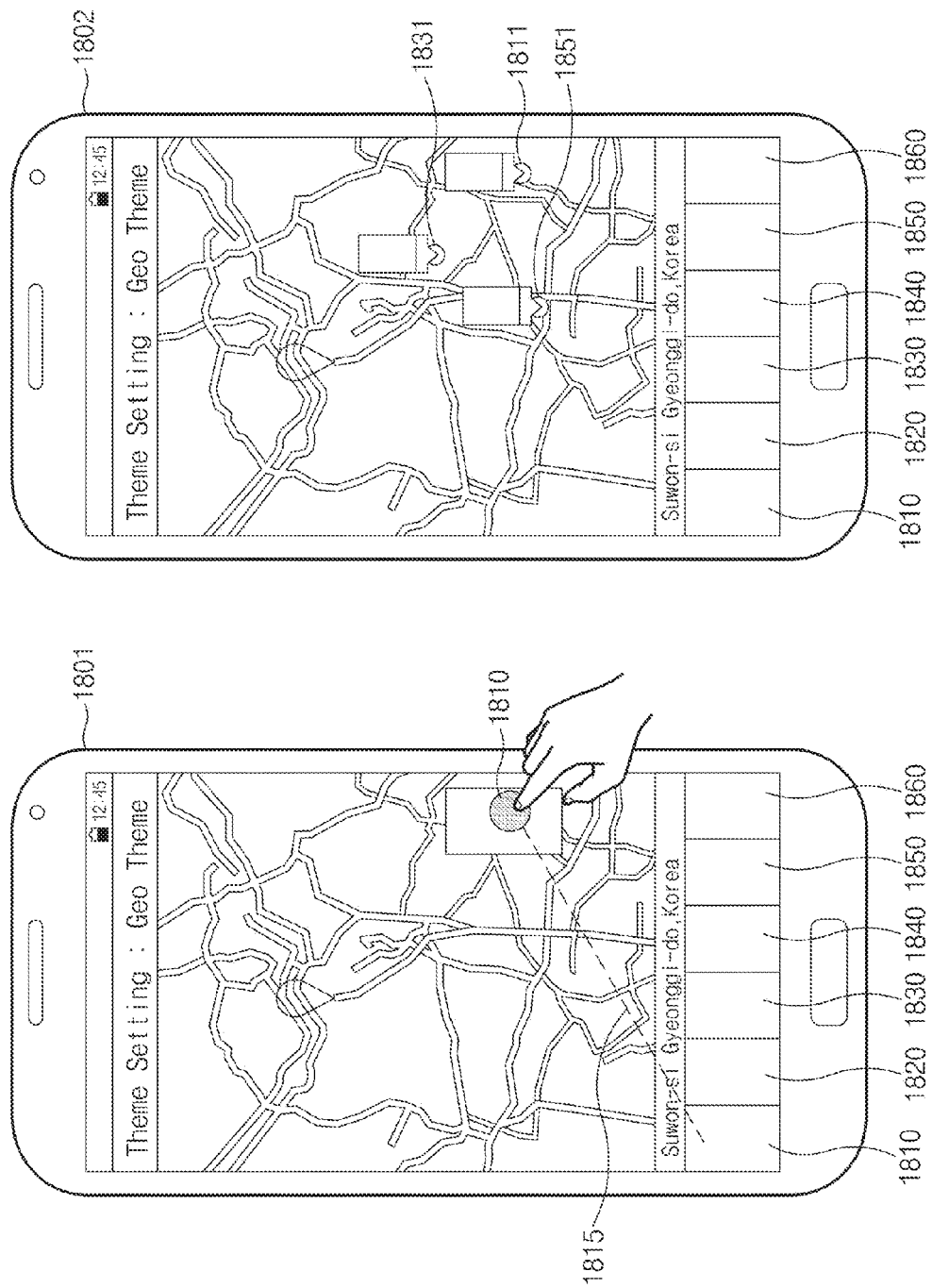
FIG. 18 is a view illustrating a theme setting method using geo-fence according to an embodiment of the present disclosure.

FIG. 18 is a view illustrating a theme setting method using geo-fence according to an embodiment of the present disclosure.

Referring to FIG. 18, a user of an electronic device 1801 may configure the geo-fence of a theme to be differently applied according to a position. For example, the electronic device 1801 may output a predetermined map according to the execution of a geo-fence based theme setting menu.

For example, a user may select one of a plurality of theme thumbnails 1810 to 1860 and map it to a specific position. For example, a user may specify a position (that is, geo-point) where the geo-fence 1811 of a corresponding theme is to be configured through a touch down-touch move-touch release 1815 (or, drag-and-drop) on the theme thumbnail 1810 among the plurality of theme thumbnails 1810 to 1860. In a similar manner, the geo-fences 1831 and 1851 may be configured (refer to the electronic device 1802). Additionally, although it is shown in FIG. 18 that the radius of each geo-fence is uniform, it may be configured differently.

Figure 19:
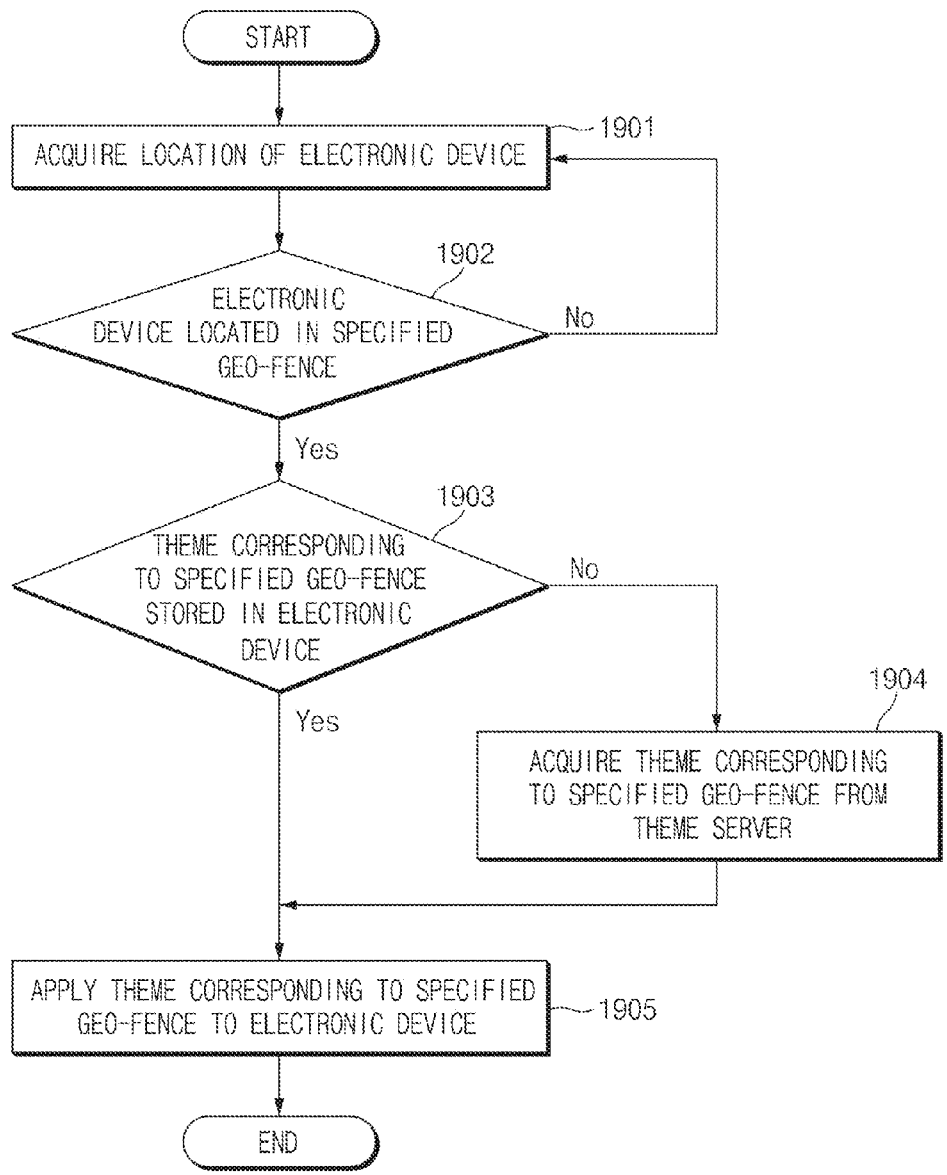
FIG. 19 is a view illustrating a theme applying method using geo-fence according to an embodiment of the present disclosure.

FIG. 19 is a flowchart illustrating a theme applying method using geo-fence according to an embodiment of the present disclosure.

Referring to FIG. 19, a theme applying method according to an embodiment of the present disclosure may include operation 1901 to operation 1905. Since operations shown in FIG. 19, for example, are performed by the electronic device 101 of FIG. 1, description is made using the reference numerals of FIG. 1.

In operation 1901, location information of the electronic device 101 may be obtained by using a location detection module of the electronic device 101.

In operation 1902, the processor 120 of the electronic device 101 may determine whether the electronic device 101 is located within a specified geo-fence based on the obtained location information of the electronic device 101. If the electronic device 101 is located within a specified geo-fence, the processor 120 of the electronic device 101 may perform operation 1903 and if not, return to operation 1901.

According to various embodiments of the present disclosure, the electronic device 101 may be located in an area where a plurality of geo-fences intersects. In this case, the processor 120 of the electronic device 101 may compare a distance between the location of the electronic device 101 and the center point (that is, geo-point) of each geo-fence. The processor 120 may select a geo-fence having a center point that is the closest to the location of the electronic device 101, and apply a theme corresponding to the selected geo-fence preferentially.

In operation 1903, the processor 120 of the electronic device 101 may determine that theme data corresponding to a specified geo-fence is not stored in the memory 130 of the electronic device 101. The memory 130 may include a table (that is, a set of event data) where information such as the center coordinates and area radius of a geo-fence and theme data correspond to each other. If theme data corresponding to a specified geo-fence is stored in the memory 130, the processor 120 may perform operation 1905 and if not, perform operation 1904.

In operation 1904, the theme data corresponding to the specified geo-fence is not stored in the memory 130 of the electronic device 101. Accordingly, the processor 120 of the electronic device 101 may request a theme corresponding to the specified geo-fence from the theme server 106 through the communication interface 170. In response to the request, the electronic device 101 may obtain the theme corresponding to the geo-fence according to a specified download path.

In operation 1905, the processor 120 of the electronic device 101 may apply the theme (data) corresponding to the specified geo-fence to the electronic device 101 itself.

According to various embodiments of the present disclosure, since a provider for providing a theme based on geo-fence provides various themes based on geographical information, it may attract a plurality of users (or customers) to a business. That is, the provider may utilize a theme as a marketing tool of attracting customers.

Figure 20:
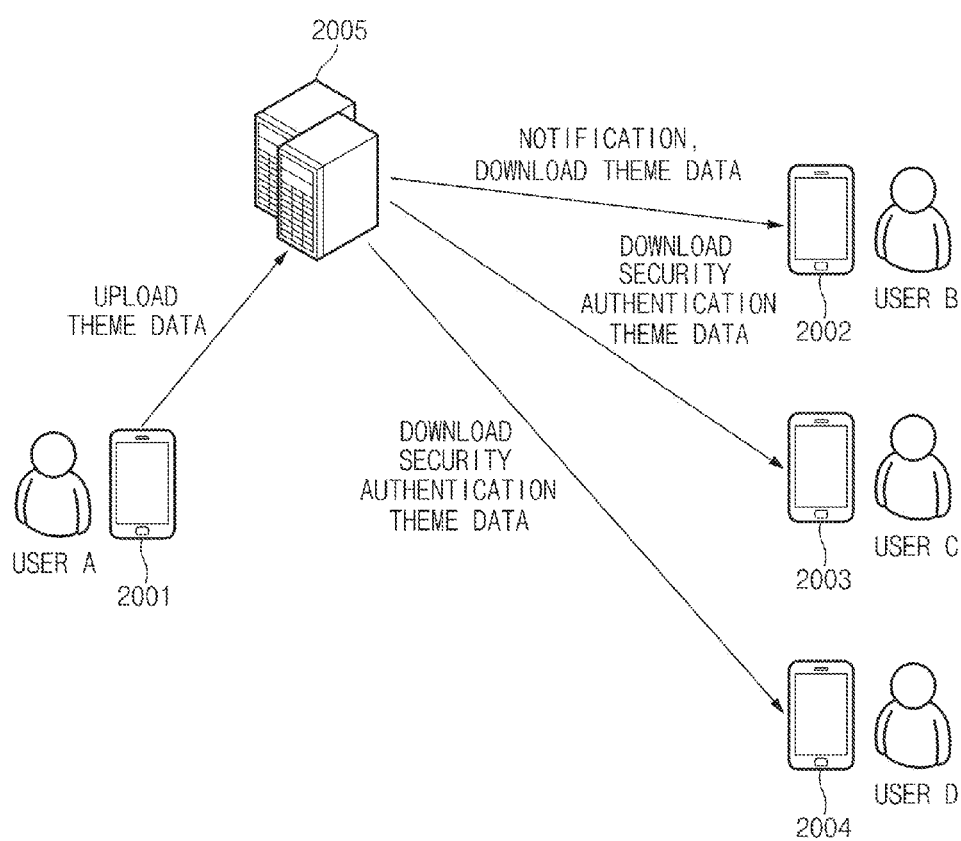
FIG. 20 is a view illustrating a theme sharing method according to an embodiment of the present disclosure.

FIG. 20 is a view illustrating a theme sharing method according to an embodiment of the present disclosure.

Referring to FIG. 20, a theme sharing method according to an embodiment of the present disclosure may be performed between an electronic device 2001, an electronic device 2002, an electronic device 2003, an electronic device 2004, and/or a theme server 2005.

The electronic device 2001 may upload theme data to the theme server 2005.

For example, the theme data may correspond to theme data pre-applied to the electronic device 2001 or theme data stored in a built-in memory of the electronic device 2001.

According to various embodiments of the present disclosure, in uploading the theme data, the electronic device 2001 may apply limitation (for example, limitation of an objective range) to theme data to be uploaded or limitation (for example, limitation of a subjective range) to an electronic device for downloading the uploaded theme data.

According to an embodiment of the present disclosure, limitation of an objective range may be applied to the theme data (including theme resource data and/or theme layout data). For example, at least part of theme resource data may be excluded and uploaded according to a security level. For example, among various objects included in a home screen, an object (for example, the image of an icon/widget) for a specified application may be configured to be excluded while uploading.

The specified application, for example, may correspond to an application (for example, a company mobile messenger application, an electronic payment application in a specific organization, and so on) having a close relationship with personal information of a user A of the electronic device 2001. Alternatively, the specified application, for example, may correspond to an application executed in a specified security mode (for example, KNOX™ mode).

Additionally, according to an embodiment of the present disclosure, in relation to theme data that the electronic device 2001 uploads, a subjective range may be limited. For example, a user or a user group, which is allowed to download the theme data, may be specified. A user or a user group, which is allowed to download the theme data, may be configured in the electronic device 2001. According to various embodiments of the present disclosure, a user or a user group, which is allowed to download the theme data, may be configured based on a preset qualification criteria (for example, what school a user is from, a user's native place, a user's company, and so on) or a security standard (for example, access authority).

For example, when uploading theme data by using the electronic device 2001, a user A may set a user B as a user who is allowed to download. For example, the user A may specify the user B by using social networking service (SNS) account information, address information, and so on. When the theme data is uploaded to the theme server 2005, the theme server 2005 may provide notification and the download path of the theme data to the electronic device 2002 of the user B. The electronic device 2002 may download the theme data that the user A uploads through the download path.

Additionally, for example, when uploading theme data by using the electronic device 2001, the user A may set a user or a user group, which is allowed to download, based on a predetermined eligibility criteria and security level. Accordingly, the electronic device 2002 and the electronic device 2003 are required to be certified to the predetermined eligibility criteria and security level, so that they may download theme data uploaded from the electronic device 2001.

Figure 21A:
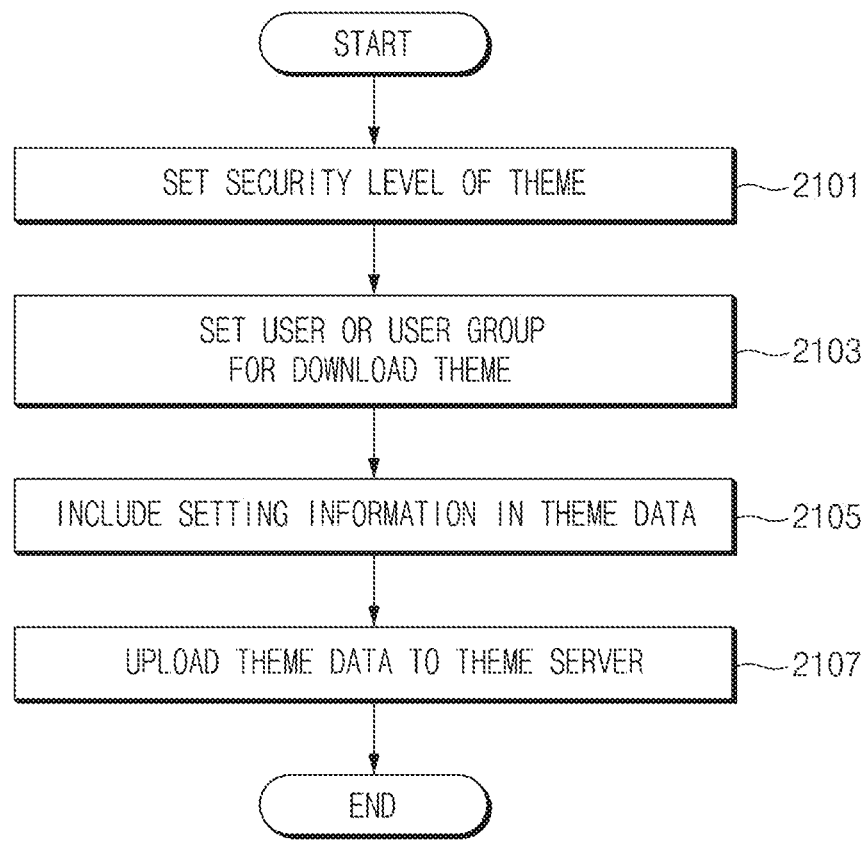
FIG. 21A is a flowchart illustrating a theme sharing method of a sharer-side electronic device according to an embodiment of the present disclosure.

FIG. 21A is a flowchart illustrating a theme sharing method of a sharer-side electronic device according to an embodiment of the present disclosure.

Referring to FIG. 21A, a theme sharing method of a sharer-side electronic device according to an embodiment of the present disclosure may include operation 2101 to operation 2107. For example, each operation of FIG. 12A may be performed by the electronic device 2001 of FIG. 20.

In operation 2101, the electronic device 2001 may set a security level of theme data (including theme resource data and theme layout data). For example, at least part of theme resource data may be excluded and uploaded according to the security level. For example, among various objects included in a home screen, an object (for example, the image of an icon/widget) for a specified application may be excluded while uploading.

In operation 2103, the electronic device 2001 may configure a user or a user group, which is allowed to download theme data. For example, the electronic device 2001 may configure a user or a user group, which is allowed to download the theme data, by using phone numbers and accounts of social network service. Alternatively, for example, the electronic device 2001 may configure a user or a user group, which is allowed to download the theme data, by using a preset qualification criteria (for example, what school a user is from, a user's native place, a user's company, and so on) or a security standard (for example, access authority). According to various embodiments of the present disclosure, the user or the user group may receive notification that corresponding theme data is downloadable and a download path from the theme server 2005.

In operation 2105, the electronic device 2001 may include limitation setting information set in operation 2101 and/or operation 2103 in theme data to be uploaded. According to an embodiment of the present disclosure, the limitation setting information may not be included in the theme data and may be configured separately. Additionally, according to an embodiment of the present disclosure, limitation setting information by at least one of operation 2101 and operation 2103 may be omitted.

In operation 2107, the electronic device 2001 may upload theme data to the theme server 2005. According to various embodiments of the present disclosure, the limitation setting information may be separately transmitted to the theme server 2005 and configured in the theme server 2005.

Figure 21B:
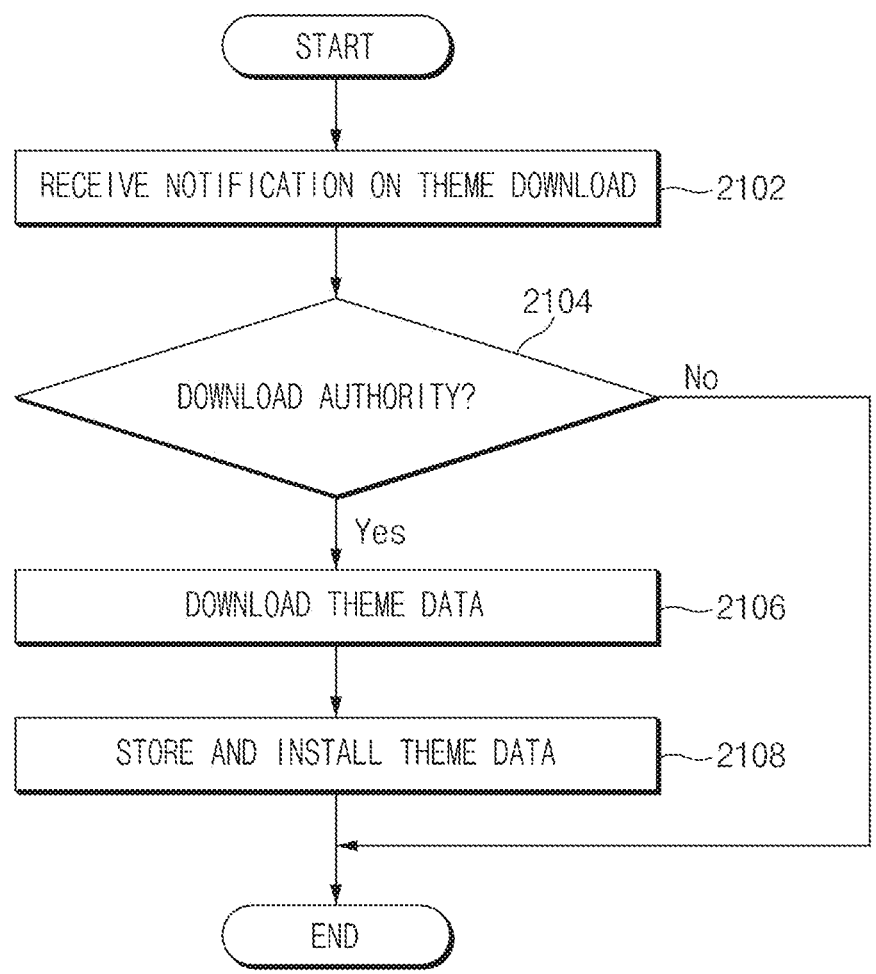
FIG. 21B is a flowchart illustrating a theme sharing method of a receiver-side electronic device according to an embodiment of the present disclosure.

FIG. 21B is a flowchart illustrating a theme sharing method of a receiver-side electronic device according to an embodiment of the present disclosure.

Referring to FIG. 21B, a theme sharing method of a receiver-side electronic device according to an embodiment of the present disclosure may include operation 2102 to operation 2108. For example, each operation of FIG. 12B may be performed by the electronic device 2002, the electronic device 2003, or the electronic device 2004 of FIG. 20. However, an operation below is mainly described based on the electronic device 2002.

In operation 2102, the electronic device 2002 may receive a notification on the download of theme data from the theme server 2005. According to various embodiments of the present disclosure, the electronic device 2002 may receive the download path of the theme data in addition to the notification. For example, when the electronic device 2001 that uploads theme data specifies a user B as a user who is allowed to download corresponding theme data, operation 2102 may be performed. Accordingly, when a user of the electronic device 2001 does not specify a user B as a user who is allowed to download corresponding theme data, operation 2102 may be omitted.

In operation 2104, the electronic device 2002 may transmit information on the authentication authority of the user B to the theme server 2005. Based on the information on the authentication authority, the theme server 2005 may determine whether a user of the electronic device 2002 is a pre-specified user or matches a preset qualification criteria (for example, what school a user is from, a user's native place, a user's company, and so on) or a security level (for example, access authority). When the electronic device 2002 has an authority for downloading the theme data, it may proceed to operation 2106 and if not, terminate the process.

In operation 2106, the electronic device 2002 may download theme data that the electronic device 2001 uploads from the theme server 2005.

In operation 2108, the electronic device 2002 may parse the downloaded theme data to install it to the electronic device 2002 itself.

According to various embodiments of the present disclosure, an electronic device may exclude information that is difficult to be shared in theme data for upload or backup and additionally, limit a user who shares theme data, so that security may be considered during theme sharing.

Figure 22A:
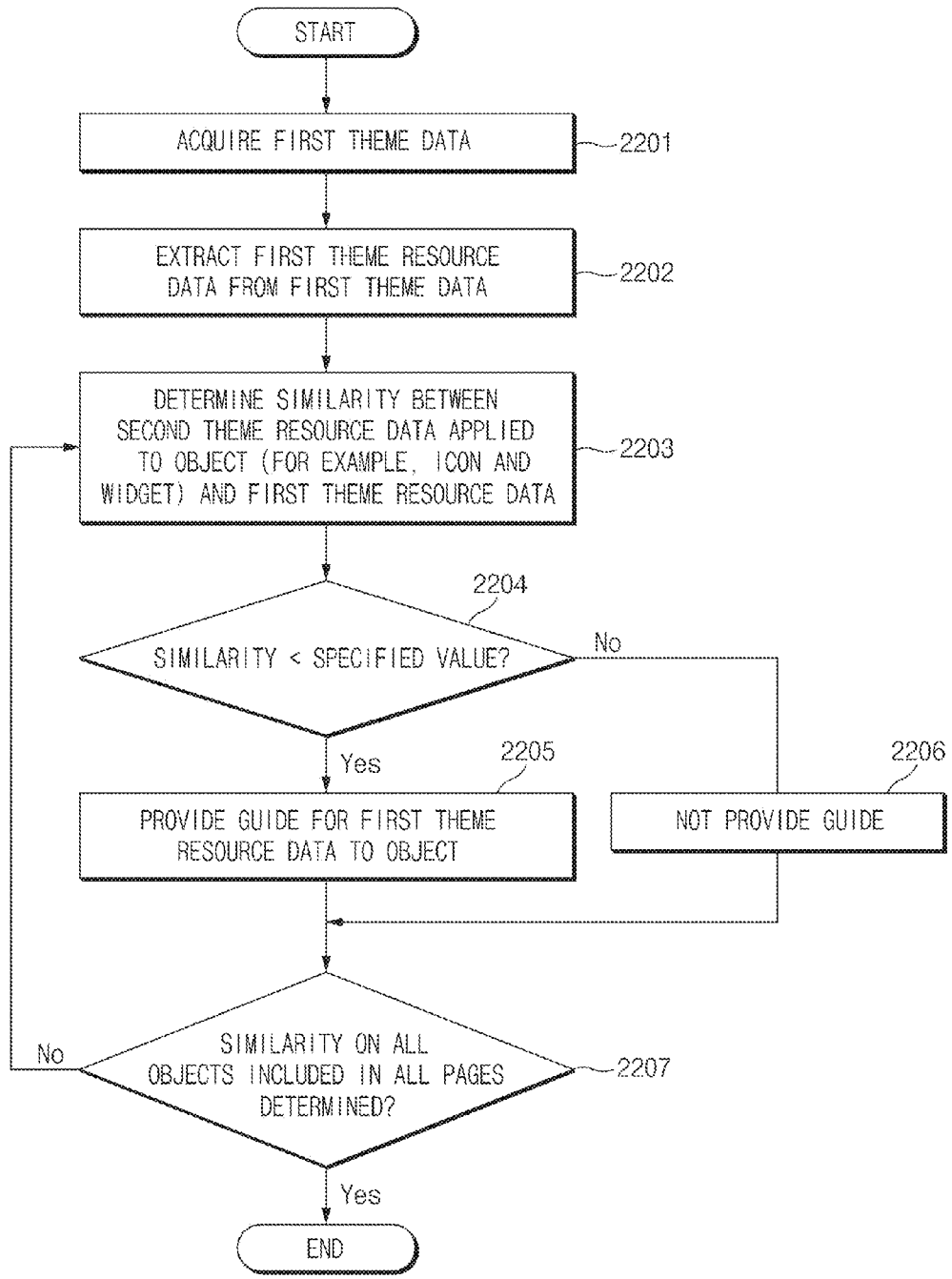
FIG. 22A is a flowchart illustrating a theme applying method according to an embodiment of the present disclosure.

FIG. 22A is a flowchart illustrating a theme applying method according to an embodiment of the present disclosure.

Referring to FIG. 22A, a theme applying method according to an embodiment of the present disclosure may include operation 2201 to operation 2207. In relation to the description of FIG. 22A, the reference numerals of FIG. 1 are used. In FIG. 22A, it is assumed that second theme data is already applied to the electronic device 101 and first theme data instead of the second theme data is to be applied.

In operation 2201, the electronic device 101 may obtain the first theme data from the electronic device 102 through the communication interface 170. The first theme data may include first theme resource data and/or theme layout data.

In operation 2202, the processor 120 of the electronic device 101 may extract first theme resource data from first theme data. For example, the first theme resource data may include image data of an object (for example, an icon and a widget) included in a home screen and a lock screen.

In operation 2203, the processor 120 of the electronic device 101 may determine a similarity of second theme resource data applied to an object (for example, an icon and a widget) and first theme resource data. For example, the processor 120 may determine a similarity between image data of the second theme resource data applied to the object and image data of the first theme resource data.

According to an embodiment of the present disclosure, the processor 120 may determine a similarity by comparing pixel RGB values of both images. Alternatively, the processor 120 may measure a similarity between two images by comparing histogram frequencies of both images. Alternatively, the processor 120 may determine a similarity of both images by using a Near Duplicate Image Detector (NDID). The processor 120 may determine a similarity by detecting an edge of both images. A similarity determination method of the processor 120 is not limited to the above. For example, a processor may determine a similarity between both images through the comparison of color property such as the color, brightness, and saturation of an image and filter application.

In operation 2204, the processor 120 of the electronic device 101 may determine whether the similarity determined in operation 2203 is greater than a specified value. If the similarity is greater than the specified value, the processor 120 may perform operation 2205 and if not, perform operation 2206.

In operation 2205, if the similarity is greater than the specified value, the processor 120 of the electronic device 101 may provide a guide for first theme resource data to an object. The guide may be outputted to the display 160 in various forms. The output form of the guide is described with reference to FIGS. 22B and 22C.

According to various embodiments of the present disclosure, if the similarity is greater than the specified value, the processor 120 of the electronic device 101 may synthesize image data of second theme resource data and image data of first theme resource data to generate third image data. The third image data in addition to first theme resource data may be applied to the electronic device 101.

The processor 120 of the electronic device 101 may synthesize image data of the first theme resource data and image data of the first theme resource data through various methods. For example, the processor 120 may extract and synthesize feature points of both image data. The feature point, as a point for representing the feature of an image, may mean a point or a set of points for well describing the feature of an image regardless of a change in the scale, rotation, and distortion of an image. For example, the processor 120 may extract a feature point by using the maximum/minimum on a scale space of a Laplacian of Gaussian (LoG) filter or a Difference of Gaussians (DoG) filter. In addition to the above, the processor 120 may extract a feature point by using the determinant of Hessian Matrix. The processor 120 may extract a feature point through the above method, and perform enlargement/reduction and cropping to synthesize image data.

Additionally, according to various embodiments of the present disclosure, the processor 120 of the electronic device 101 may provide a guide for first theme resource data to an object at various time points. For example, the guide may be provided based on a user input history (or context). For example, when a user makes a cancellation right after selecting a predetermined object or switches a page including a plurality of objects repeatedly, or a user's gaze stays for more than a specified time, a guide may be provided temporarily. Additionally, for example, the guide may be provided when a user input such as hovering and user touch is received. Additionally, for example, the guide may be provided only for a specified time after first theme data is applied.

In operation 2206, the processor 120 of the electronic device 101 may not provide a guide. Since an image similarity is high, it is less likely for a user to confuse the both object images.

In operation 2207, the processor 120 of the electronic device 101 may determine whether a similarity is determined with respect to all objects included in all pages.

Figure 22B:
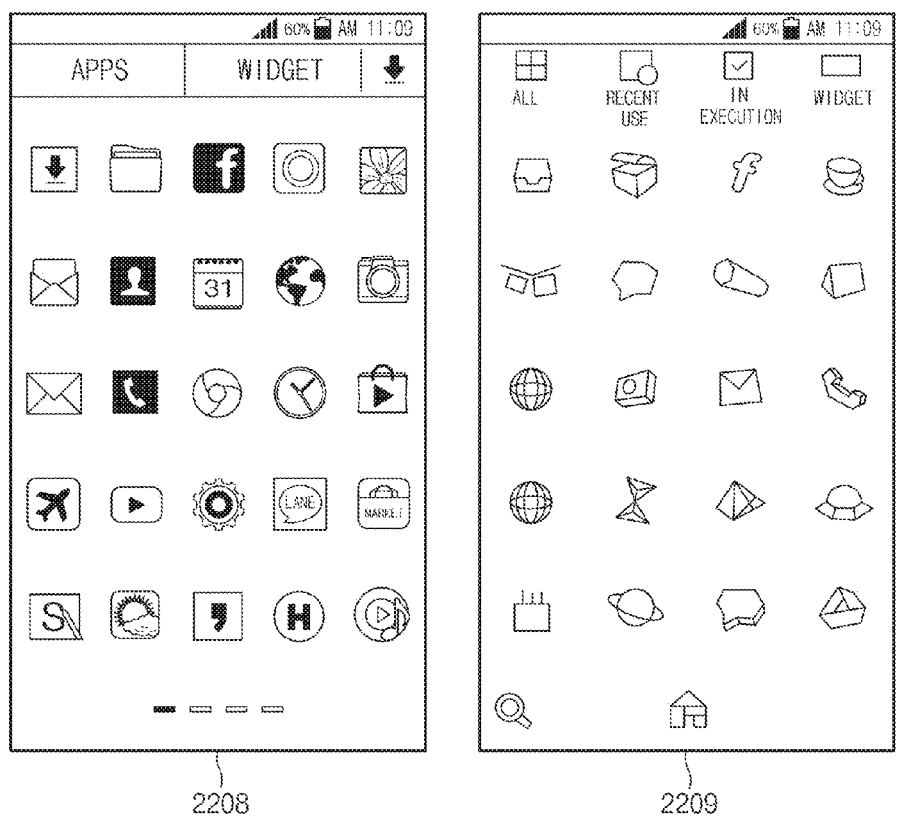
FIG. 22B is a view illustrating a page before a theme applying method is applied and a page after it is applied according to an embodiment of the present disclosure.

FIG. 22B is a view illustrating a page before a theme applying method is applied and a page after it is applied according to an embodiment of the present disclosure.

Referring to FIG. 22B, a page 2208 represents a page where second theme data is applied, that is, a page before theme data is switched, and a page 2209 represents a page where first theme data is applied.

Figure 22C:
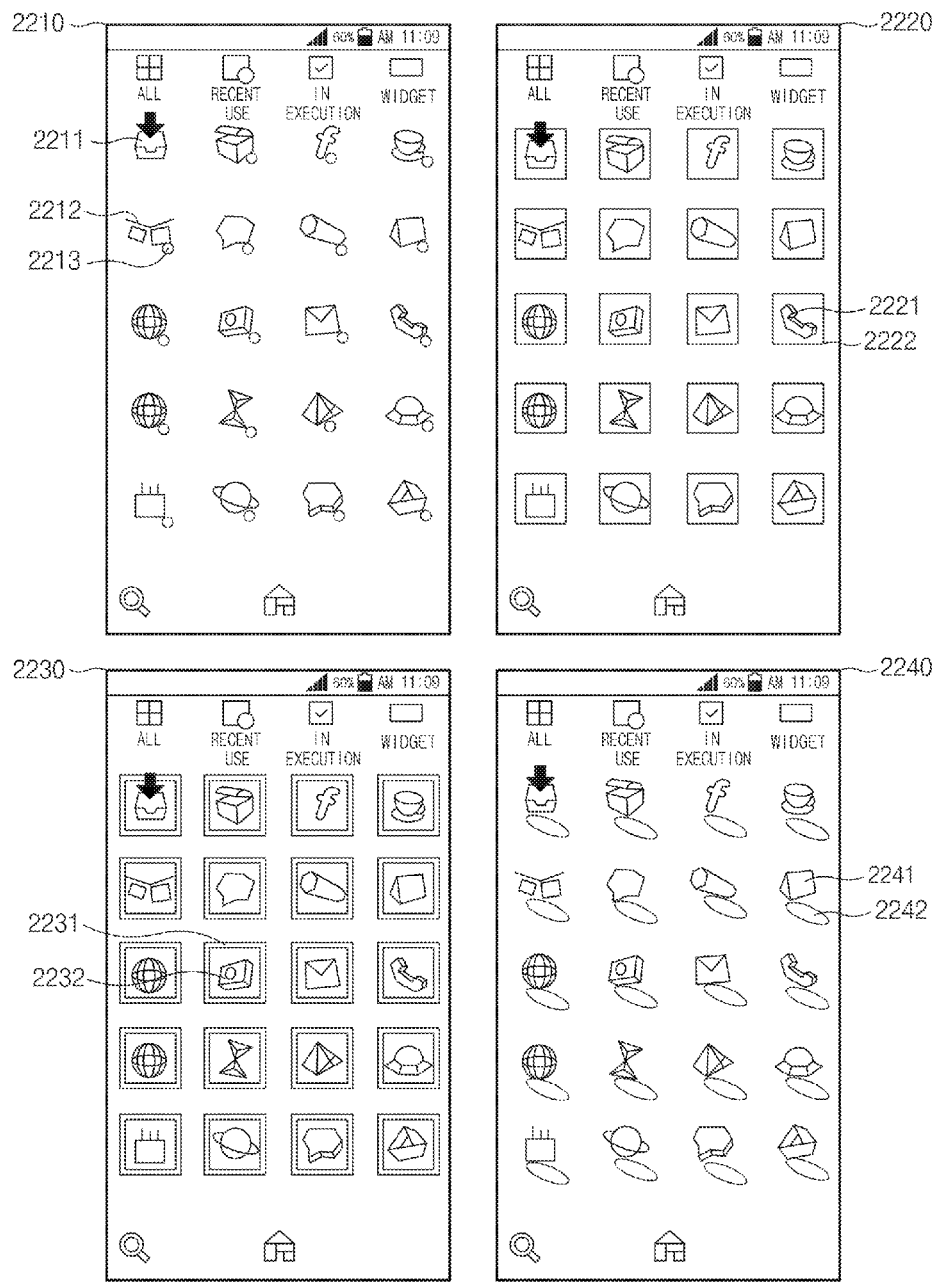
FIG. 22C is a view illustrating a page where guide is provided according to an embodiment of the present disclosure.

FIG. 22C is a view illustrating a page where guide is provided according to an embodiment of the present disclosure.

Referring to FIG. 22C, pages 2210 to 2240 represent pages where a guide for first theme resource data is provided according to an embodiment of the present disclosure. Referring to the page 2210, since a similarity is higher than a specified value as the image of an object 2211 is compared to an object image according to second theme resource data, guide may not be provided. On the other hand, since a similarity is lower than a specified value as the image of an object 2212 is compared to an object image according to second theme resource data, a guide 2213 may be provided. Although not shown in detail, the guide 2213 may correspond to the reduction icon of an object image according to second theme resource data.

Additionally, referring to the page 2220, the image of the object 2221 may be shown inside the guide 2222. In the page 2220, guides are provided to all object images. Although not shown in detail, the guide 2222 in a rectangular border form may be implemented with a representative color (for example, dominant color) of an object image according to second theme resource data. For example, if an object image according to second theme resource is greenish before switching to the object 2221, the guide 2222 may correspond to a green square border.

Additionally, referring to the page 2230, the image of the object 2232 may be shown inside the guide 2231. In the page 2230, guides are provided to all object images. Although not shown in detail, the guide 2231 in a rectangular border form may be implemented with an object image according to second theme resource data. For example, an object image according to second theme resource before switching to an object 2232 may be disposed behind the object 2232. Accordingly, only a portion of an object image according to the second theme resource data may be provided in a border form.

Additionally, referring to the page 2240, a guide 2242 for the image of an object 2241 may be provided in a shadow form. In the page 2240, guides are provided to all object images. Although not shown in detail, the guide 2231 in a shadow form may be implemented with an object image according to second theme resource data. For example, an object image according to second theme resource before switching to an object 2241 may be included in the shadow part of the object 2241 to configure the guide 2242.

In addition to the pages 2210 to 2240, various guides may be provided to an object. For example, an object image by first theme resource data and an object image by second theme resource data may overlapped or overlaid to each other and may be provided simultaneously. Additionally, an object capable of providing a guide according to various embodiments of the present disclosure is not limited to the application icon. For example, the object may include a widget and a folder icon. Furthermore, a guide according to various embodiments of the present disclosure may be provided to the background image of a page.

According to various embodiments of the present disclosure, when a theme is applied, a predetermined guide may be provided through a resource (for example, image) comparison between an object to be changed and an object before the change. Through this, even if a theme is changed, a user may easily check which application a specific object is linked to and reduce sense of difference according to the theme change.

Figure 23:
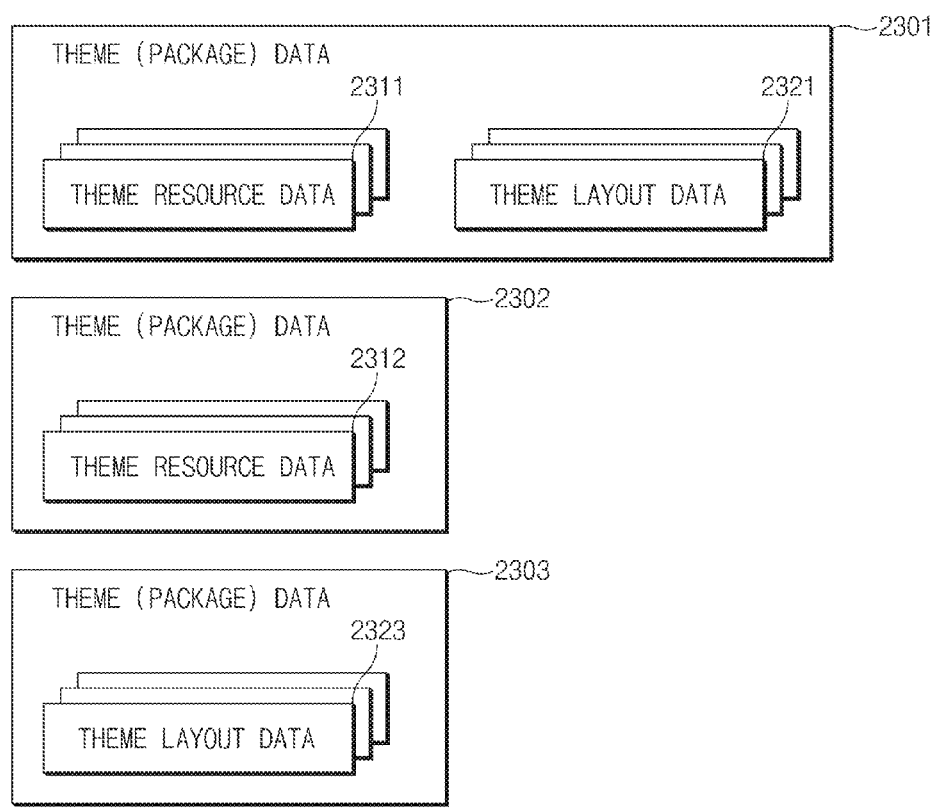
FIG. 23 is a view illustrating theme data according to an embodiment of the present disclosure.

FIG. 23 is a view illustrating theme data according to an embodiment of the present disclosure.

Referring to FIG. 23, theme data, as data covering overall information of a theme, may be referenced as theme package data. According to an embodiment of the present disclosure, theme data 2301 may include theme resource data 2311 and theme layout data 2321. According to an embodiment of the present disclosure, theme data 2302 may include only the theme resource data 2312. Additionally, according to an embodiment of the present disclosure, theme data 2303 may include only theme layout data 2323. That is, theme layout data and theme resource data may configure theme data independently and also may be transmitted to or received from other devices independently.

Figure 24:
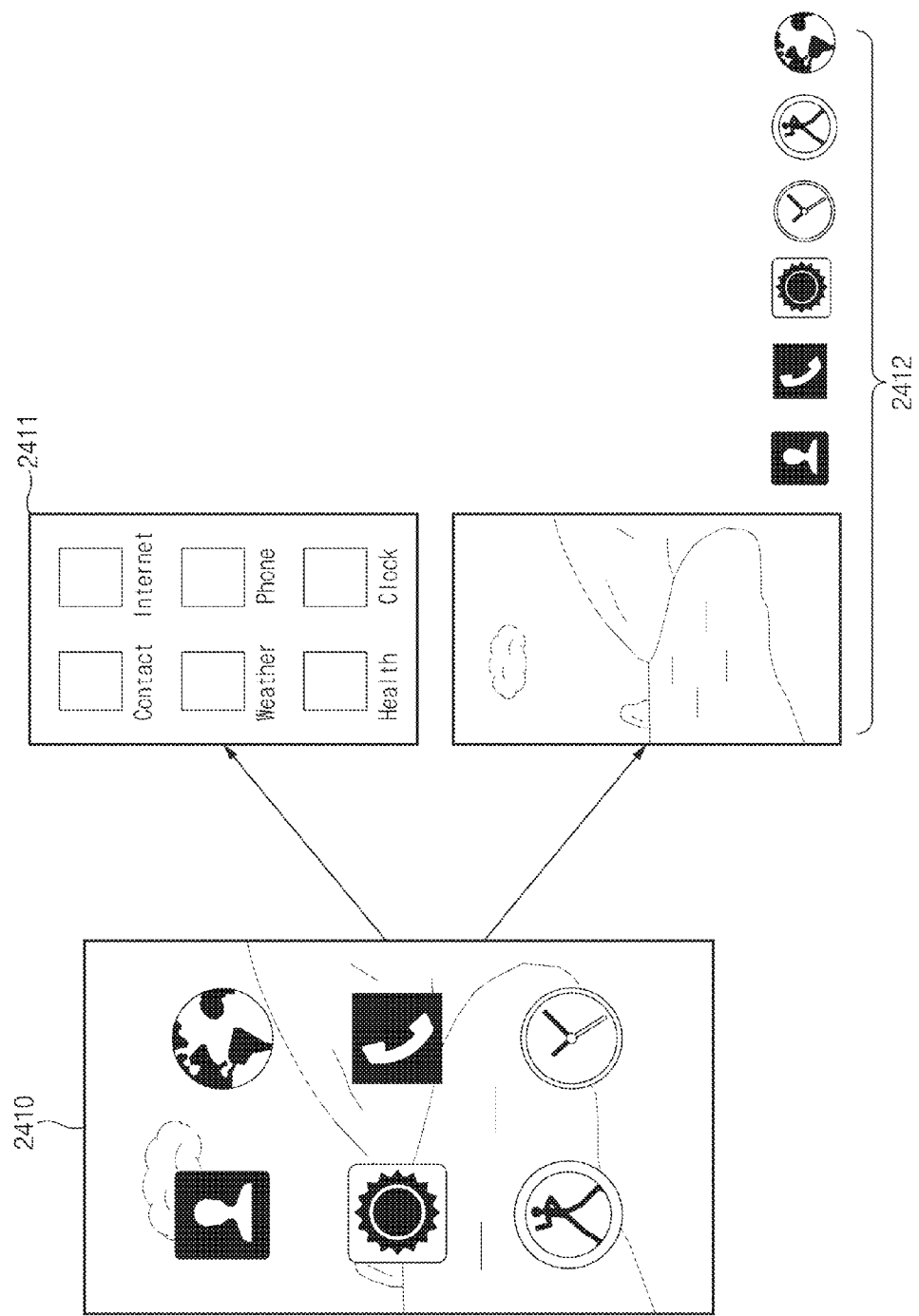
FIG. 24 is a view illustrating theme data according to an embodiment of the present disclosure.

FIG. 24 is a view illustrating theme data according to an embodiment of the present disclosure.

Referring to FIG. 24, theme data 2410 may include theme layout data 2411 and theme resource data 2412. The theme layout data 2411, for example, may include the layout of objects included in a home screen. The theme resource data 2412, for example, may include the background image of a home screen, and the image of an object included in the home screen.

In order to help understanding, it is described with reference to FIG. 24 that the theme layout data 2411 and the theme resource data 2412 include only a limited configuration. However, the theme layout data 2411 may include data on a page, and the arrangement positions, sizes, or number of execution windows of an application in addition to an object. Additionally, the theme resource data 2412 may include data on entire images relating to OS, the execution window of an application, and function buttons in addition to a background image and an object image.

Figure 25:
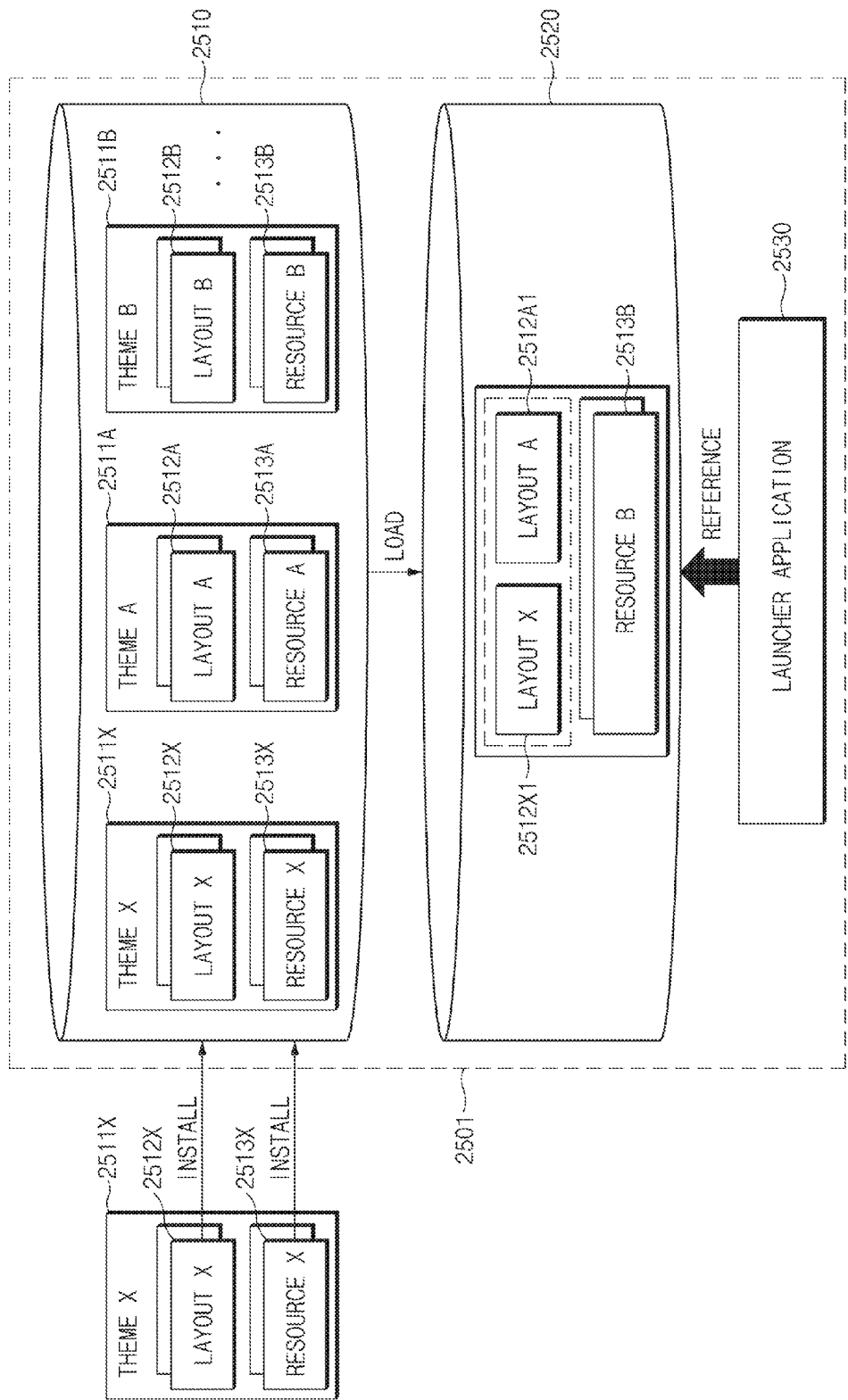
FIG. 25 is a view illustrating that a theme is applied to an electronic device according to an embodiment of the present disclosure.

FIG. 25 is a view illustrating that a theme is applied to an electronic device according to an embodiment of the present disclosure.

Referring to FIG. 25, an electronic device 2501 according to an embodiment of the present disclosure may include a theme manager 2510, a framework resource 2520, and a launcher application 2530. The theme manager 2510, the framework resource 2520, and the launcher application 2530 may correspond to software modules generated by the interaction of a processor and a memory. The description of FIG. 25 illustrates a process that a plurality of theme data is integrated by the processor. Moreover, overlapping description relating to FIG. 5 is omitted.

The theme manager 2510 may store a plurality of theme data 2511X, 2511A, and 2511B. According to an embodiment of the present disclosure, the theme data 2511X may correspond to theme data received through a communication interface of the electronic device 2501 from the outside (for example, a theme server). According to various embodiments of the present disclosure, as described with reference to FIG. 23, since the theme data 2511X includes only one of theme layout data 2512X and theme resource data 2513X, the theme manager 2510 may store and install only one of the theme layout data 2512X and the theme resource data 2513X.

The theme manager 2510 may load theme data to the framework resource 2520 in order for the theme application of the electronic device 2501. According to an embodiment of the present disclosure, the theme manager 2510 may load any one theme data among a plurality of theme data to the framework resource 2520 as it is. Additionally, according to an embodiment of the present disclosure, theme manager 2510 may combine at least part of the received theme data and at least part of theme data stored in a memory. For example, at least one of theme layout data and theme resource data, each included in a plurality of theme data, is combined and loaded to the framework resource 2520

For example, the theme manager 2510 may combine at least part 2512X1 of the theme layout data 2512X and at least part 2512A1 of the theme layout data 2512A and load the combined one to the framework resource 2520. Additionally, the theme manager 2510 may load the theme layout data 2512X1 and 2512A1 and the theme resource data 2513B configuring a different theme package to the framework resource 2520.

Additionally, according to various embodiments of the present disclosure, the theme manager 2510 may combine at least part 2513A1 (not shown) of the theme resource data 2513A and at least part 2513B1 (not shown) of the theme layout data 2512B and load the combined one to the framework resource 2520.

The launcher application 2530 may apply various UX/UI to a theme by referring to the theme layout data 2512X1 and 2512A1 and the theme resource data 2513B loaded to the framework resource 2520.

According to various embodiments of the present disclosure, theme layout data and theme resource data may be loaded to a framework independently. In relation to the framework, since theme layout data and theme resource data of different types of themes are combined partly or entirely, very various types of themes may be implemented based on limited theme data.

Figure 26A:
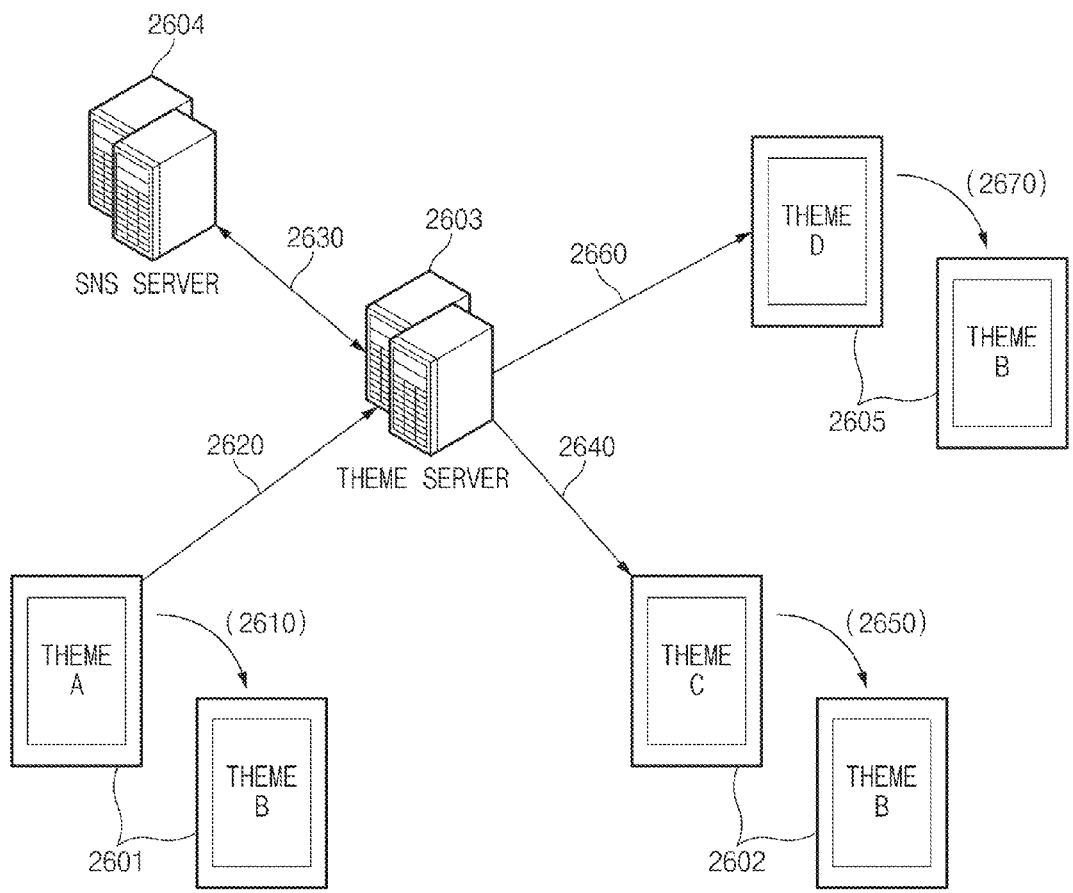
FIGS. 26A and 26B are views illustrating a theme sharing method according to various embodiments of the present disclosure.

FIG. 26A is a view illustrating a theme sharing method according to an embodiment of the present disclosure.

Referring to FIG. 26A, a theme sharing method according to an embodiment of the present disclosure may be performed between a first user device (or electronic device) 2601, a second user device 2602, a third user device 2605, a theme server 2603, and an SNS server 2604.

When a theme A switches to a theme B in the first user device (2610), the first user device 2601 may transmit a theme change notification signal for notifying that the theme A switches to the theme B to the theme server 2603 (2620). When receiving the theme change notification signal, the theme server 2603 may obtain user account information (for example, user account information of the second user device 2602 and the third user device 2605) where theme synchronization is applied, through the interaction with the SNS server 2604 (2630).

The theme server 2603, for example, may transmit a theme synchronization notification signal to the second user device 2602 and the third user device 2605 based on the obtained user account information (2640 and 2660). For example, the theme synchronization notification signal may include identification information of a synchronized theme (for example, a theme B) and a download link of the synchronized theme. The second user device 2602 and the third user device 2605, which receive the theme synchronization notification signal, may change a previously applied theme (for example, a theme C and a theme D) to a theme B (2650 and 2670).

Figure 26B:
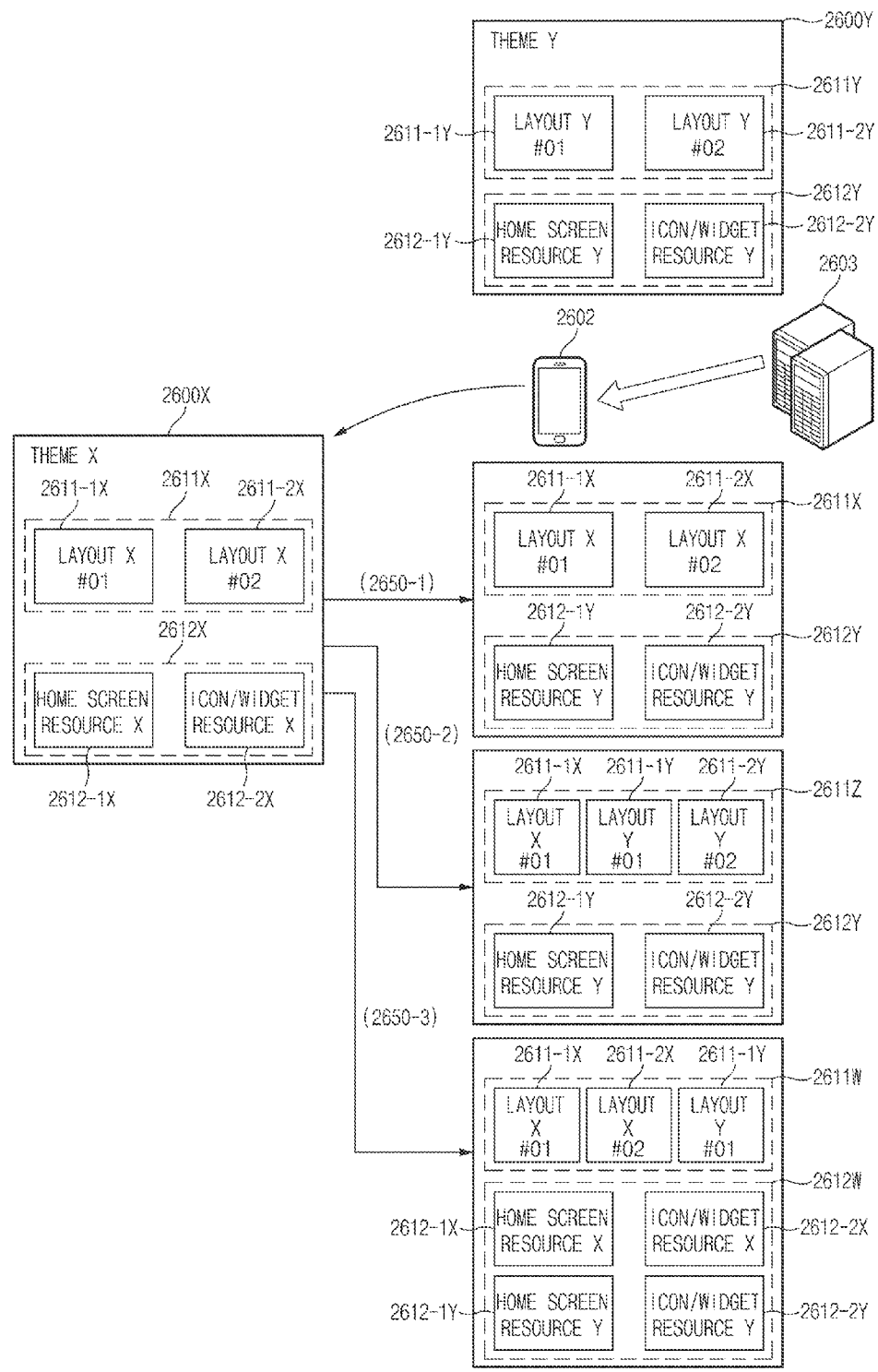

FIG. 26B is a view illustrating a theme sharing method according to an embodiment of the present disclosure.

Referring to FIG. 26B, an electronic device 2602 having theme data 2600X (or, a theme X) applied may receive theme data 2600Y (or, a theme Y) from a theme server 2603. For example, the electronic device 2602 may receive the theme data 2600Y from the theme server 2603 by the theme synchronization described with reference to FIG. 26A. Alternatively, as entering the geo-fence described with reference to FIGS. 17 to 19, the electronic device 2602 may receive the theme data 2600Y from the theme server 2603.

According to an embodiment of the present disclosure, the theme data 2600X may include theme layout data 2611X and theme resource data 2612X. Additionally, the theme data 2600Y may include theme layout data 2611Y and theme resource data 2612Y. Since it is possible that a configuration of the theme data 2600Y corresponds to a configuration of the theme data 2600X, overlapping description may be omitted.

The theme layout data 2611X, for example, may include first home screen layout data 2611-1X and second home screen layout data 2611-2X. For convenience of description, although it is shown that the theme layout data 2611X includes two home screen layout data, the present disclosure is not limited thereto. For example, a type of data included in the theme layout data 2611X is not limited to a home screen, and its number may be more than three.

The theme resource data 2612X, for example, may include a home screen resource 2612-1X of the theme X and an icon/widget resource 2612-2X of the theme X. For example, the home screen resource 2612-1X may include a background image relating to the theme X that is possible to be included in a home screen. Additionally, for example, the icon/widget resource 2612-2X of the theme X may include data of image and text for an icon or a widget that is possible to be outputted to a home screen.

As above, when the theme data 2600Y is received from an external device (for example, the theme server 2603), the electronic device 2602 may combine at least part of the theme data 2600X that is pre-applied (or stored in a memory) and at least part of the received theme data 2600Y through various methods (for example, 2650-1, 2650-2, and 2650-3) and apply the combined one to the electronic device 2602 itself.

For example (in the case of 2650-1), while maintaining the pre-applied layout data 2611X as it is, the electronic device 2602 may apply only the theme resource data 2612Y in the theme data 2600Y received from the theme server 2603. That is, the electronic device 2602 may limit a change of a layout due to the received theme data 2600Y. For example, while maintaining a home screen, the number of icons/widgets, a size, and a layout, which exist currently, the background image or the image of an icon/widget may be changed to the theme Y.

In the case of 2650-1, while maintaining a pre-applied theme layout, the electronic device 2602 may apply a theme resource received from the outside, so that inconvenience relating to the application of a new theme, for example, inconvenience accompanied as a theme layout is changed, may be minimized. Additionally, when theme data for the purpose of advertisement or commercial is received, only a theme resource for the purpose of advertisement or commercial may be applied and a change for theme layout may be limited.

Additionally, for example (in the case of 2650-2), in relation to the electronic device 1620, the first home screen layout data 2611-1X of the theme X may be limited to the deletion or replacement by a user setting. Accordingly, while maintaining the first home screen layout data 2611-1X of the theme X, the electronic device 2602 may configure new theme layout data 2611Z by adding the first home screen layout data 2611-1Y of the theme Y and the second home screen layout data 2611-2Y of the theme Y. At this point, the second home screen layout data 2611-2X of the theme X, which is not limited to the deletion or replacement, may not be included in the new theme layout data 2611Z.

In the above case (that is, the case of 2650-2), instead of the pre-applied theme resource data 2612X of the theme X, the theme resource data 2612Y of the theme Y received from the theme server 2603 may be applied. That is, the electronic device 2602 may apply the theme resource data 2612Y of the theme Y to each of home screen layout data 2611-1X, 2611-1Y, and 2611-2Y included in the theme layout data 2611Z. Through this, the electronic device 2602 may apply a resource for the theme Y to the first home screen layout data 2611-1X of the theme X, the first home screen layout data 2611-1Y of the theme Y, and the second home screen layout data 2611-2Y of the theme Y, which are limited to the deletion or replacement.

In the case of 2650-2, while maintaining at least part (for example, the first home screen layout 2611-1X) of a pre-applied theme layout, the electronic device 2602 may add a theme layout (for example, the first home screen layout 2611-1Y and the second home screen layout 2611-2Y)

received from the outside. Additionally, a theme resource received from the outside may be all applied to the theme layouts, so that inconvenience relating to the application of a new theme, for example, usage drop accompanied as a theme layout is changed entirely, may be minimized.

Additionally, for example (in the case of 2650-3), in relation to the electronic device 2620, the first home screen layout data 2611-1X and the second home screen layout data 2611-2X of the theme X may be limited to the deletion or replacement by a user setting. Accordingly, while maintaining the first home screen layout data 2611-1X and the second home screen layout data 2611-2X of the theme X, the electronic device 2602 may configure new theme layout data by adding the entire or part of the layout data of the theme Y. For example, the electronic device 2602 may configure new theme layout data 2611W including the first home screen layout data 2611-1X, the second home screen layout data 2611-2X, and the first home screen layout data 2611-1Y.

In the above case (that is, the case of 2650-3), the electronic device 2602 may configure theme resource data 2612W including the theme resource data 2612X of the pre-applied theme X and the theme resource data 2612Y of the theme Y received from the theme server 2603. For example, the electronic device 2602 may apply at least one of the two theme resource data to each of the home screen layout data 2611-1X, 2611-1Y, and 2611-2Y included in the theme layout data 2611W. In more detail, the home screen resource 2612-1X and the icon/widget resource 2612-2X of the theme X may be applied to the first home screen layout data 2611-1X. Additionally, the home screen resource 2612-1Y and the icon/widget resource 2612-2Y of the theme Y may be applied to the first home screen layout data 2611-1Y and the second home screen layout data 2611-2Y.

In the case of 2650-3, while maintaining a pre-applied theme layout, the electronic device 2602 may add at least part of the theme layout received from the outside. Additionally, since a theme resource received from the outside in addition to a pre-applied theme resource is applied to each of the theme layouts, the electronic device 2602 may implement a plurality of themes.

Figure 27:
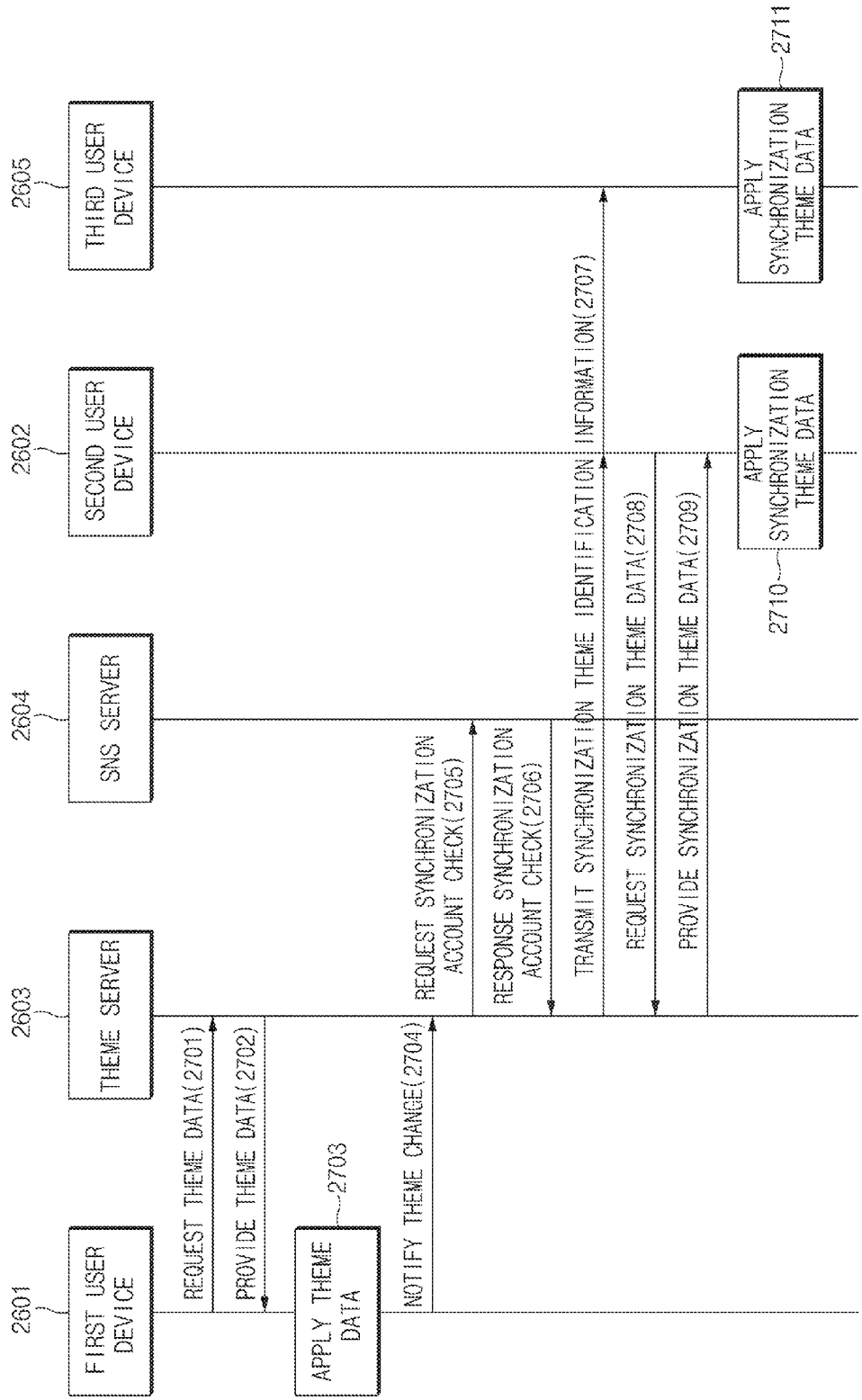
FIG. 27 is a view illustrating a theme sharing method according to an embodiment of the present disclosure.

FIG. 27 is a view illustrating a theme sharing method according to an embodiment of the present disclosure.

Referring to FIG. 27, a theme sharing method according to an embodiment of the present disclosure may include operation 2701 to operation 2711. In describing each operation of FIG. 27, the reference numerals of FIG. 26A are used.

In operation 2701, the first user device 2601 may request the theme B from the theme server 2603.

In operation 2702, the first user device 2601 may receive the theme B from the theme server 2603.

In operation 2703, the first user device 2601 may apply the theme B received from the theme server 2603 to the first user device 2601 itself.

In operation 2704, the first user device 2601 may transmit a theme change notification signal that the theme B is applied, to the theme server 2603.

In operation 2705, when receiving the theme change notification signal, the theme server 2603 may request a user account where synchronization setting is made, from the SNS server 2604.

In operation 2706, the theme server 2603 may obtain the user account where synchronization setting is made, from the SNS server 2604. For example, the user account where synchronization setting is made may correspond to user accounts of the second user device 2602 and the third user device 2605.

In operation 2707, the theme server 2603 may transmit theme identification information of a synchronized theme (for example, the theme B) to the second user device 2602 and the third user device 2605.

In operation 2708, when it is determined that the theme data B is not stored based on the theme identification information, the second user device 2602 may request the theme data B from the theme server 2603.

In operation 2709, the theme server 2603 may provide the theme data B in response to a request of the second user device 2602.

In operation 2710, the second user device 2602 may apply the theme data B received from the theme server 2603 to the second user device 2602 itself.

In operation 2711, when it is determined that the theme data B is stored based on the theme identification information received in operation 2707, the third user device 2605 may apply the theme data B to the third user device 2605 itself.

According to various embodiments of the present disclosure, a plurality of user devices may make synchronization and change themes identically. That is, since a common theme is applied to the plurality of user devices in real time, a user emotion change according to a theme change may be shared.

Additionally, according to various embodiments of the present disclosure, if a theme is changed in any one user device, themes in the remaining user devices are changed. Accordingly, when useful information is loaded to a theme (for example, a home screen, a lock screen, or a background image of an execution screen of an instant message application), the useful information may be shared very effectively.

Figure 28:
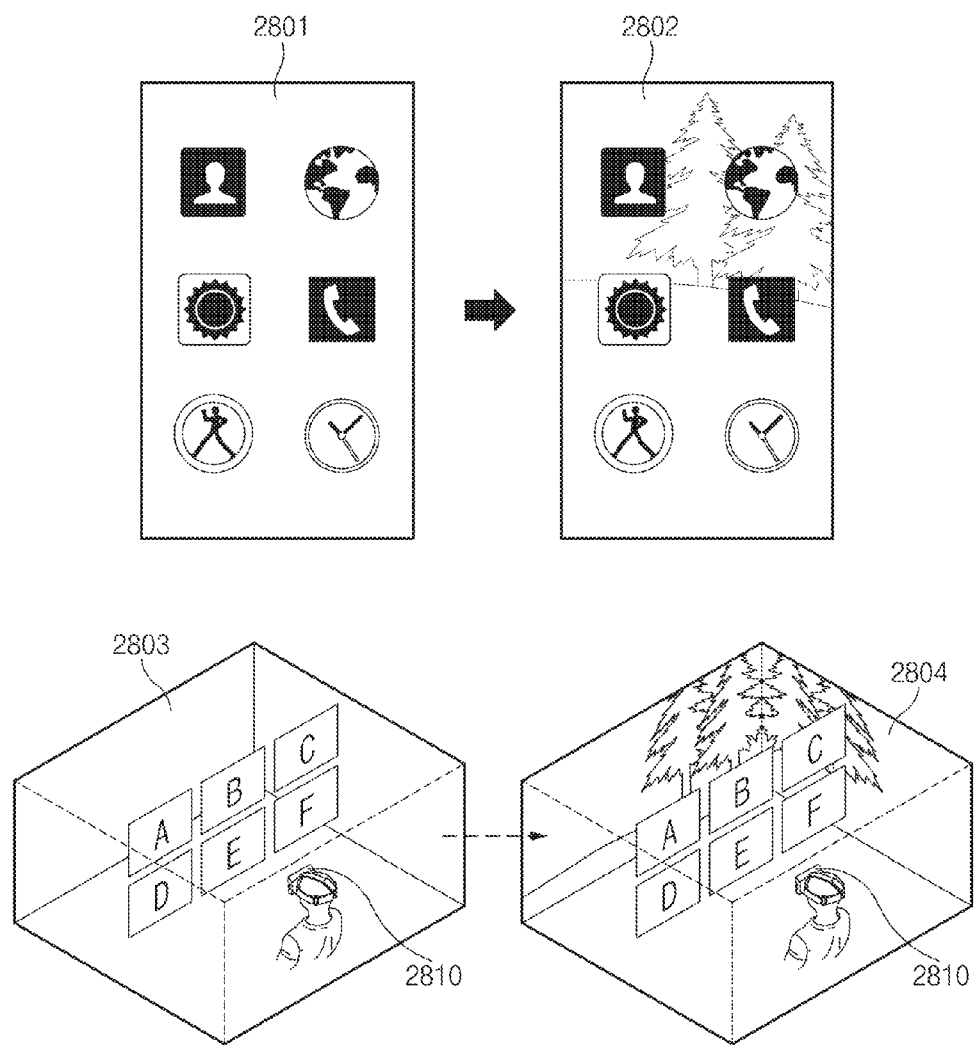
FIG. 28 is a view illustrating a theme applying method according to an embodiment of the present disclosure.

FIG. 28 is a view illustrating a theme applying method according to an embodiment of the present disclosure.

Referring to FIG. 28, a page 2801, a page 2802, a virtual space background 2803, and a virtual space background 2804 are shown. In relation to FIG. 28, the reference numerals of FIG. 1 are used.

According to various embodiments of the present disclosure, the electronic device 101 may include a biometric sensor. The biometric sensor may detect a biometric change in human body and covert it to electrical signals. The electrical signals may be provided to the processor 120 as biometric information.

The biometric sensor, for example, may include at least one of a glucose sensor, a heart rate sensor, an ECG sensor, an EMG sensor, an oxygen saturation sensor, a temperature sensor, a pressure sensor, an EEG sensor, a skin conductivity sensor, and a pupil tracking sensor. A biometric sensor is not limited to the above-mentioned example, and may include various types of biometric sensors. Additionally, according to various embodiments of the present disclosure, at least one of biometric sensors may be loaded to another electronic device 102 (for example, a wearable device) functionally connected to the electronic device 101. The electronic device 101 may receive biometric information from the another electronic device 102.

The processor 120 of the electronic device 101 may determine a user's emotion state by applying biometric information collected from the biometric sensor to a specified algorithm. The electronic device 101 may transmit information on the emotion state to the theme server 106 through the communication interface 170. The theme server 106 may determine theme data based on the emotion state information and provide or recommend the determined theme data to the electronic device 101. The electronic device 101 may apply the theme data provided from the theme server 106.

According to an embodiment of the present disclosure, the electronic device 101 may change a user's emotion state by applying the theme data provided from the theme server 106. For example, as applying the theme data provided or recommended from the theme server 106, the electronic device 101 may change the page of a home screen from the page 2801 to the page 2802. For example, a user in an excited state may be restored to a stable emotion state through the page 2802.

Additionally, according to an embodiment of the present disclosure, the electronic device 101 may correspond to an HMD for providing a stereoscopic image. For example, as applying the theme data provided from the theme server 106, the HMD 2810 may change the page of a home screen from the virtual space background 2803 to the virtual space background 2804. Through this, a user in an excited state may be restored to a stable emotion state more effectively through the virtual space background 2804.

Figure 29A:
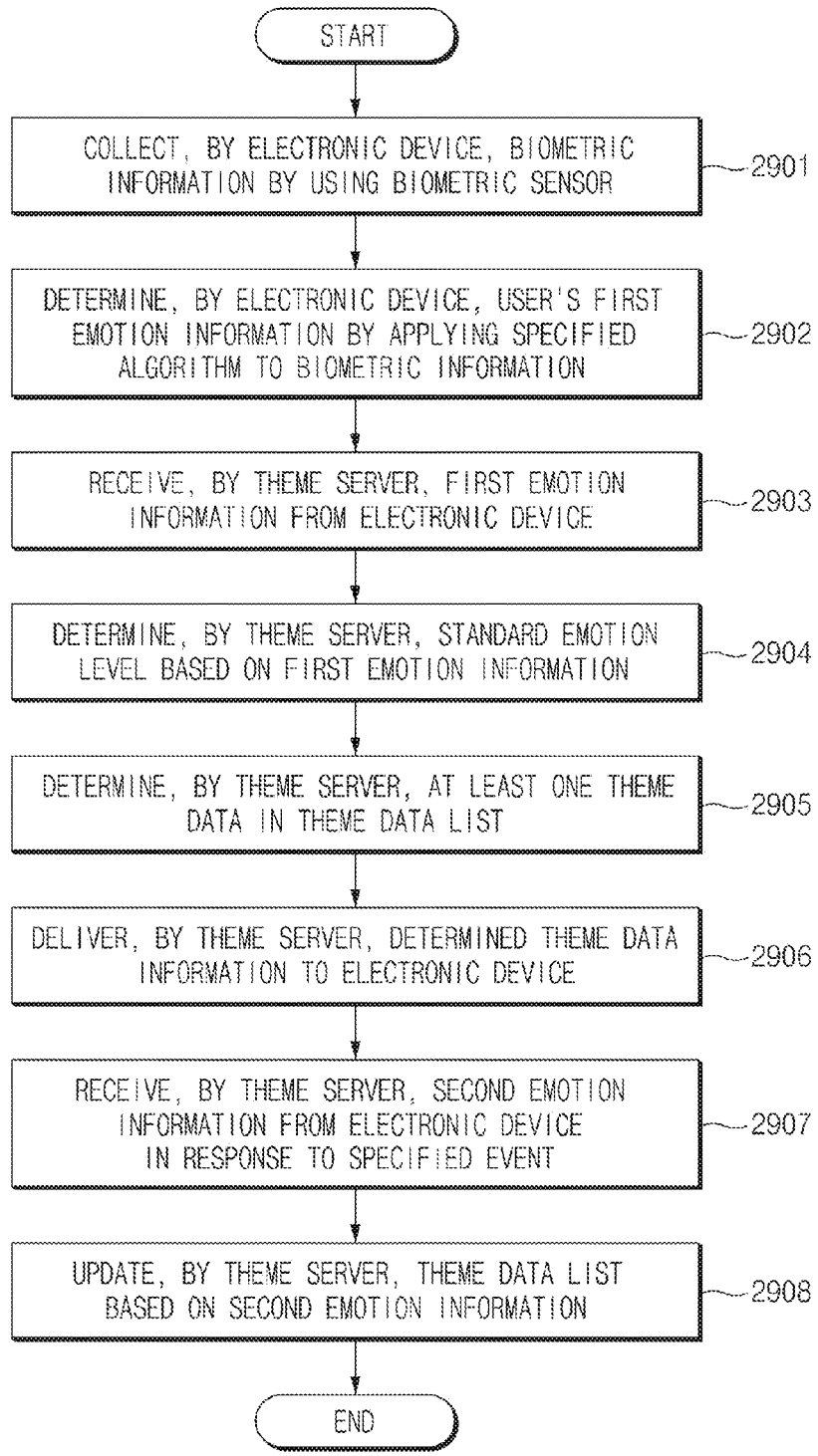
FIGS. 29A and 29B are views illustrating a theme applying method according to various embodiments of the present disclosure.

FIG. 29A is a flowchart illustrating a theme applying method according to an embodiment of the present disclosure.

Referring to FIG. 29A, a theme applying method according to an embodiment of the present disclosure may include operation 2901 to operation 2908. In relation to FIG. 29A, the reference numerals of FIG. 1 are used. Additionally, in order to help the understanding of description, FIGS. 30A to 30D are referenced together.

In operation 2901, the processor 120 of the electronic device 101 may collect biometric information by using a biometric sensor. According to various embodiments of the present disclosure, the processor 120 may receive biometric information from the external electronic device 102 (for example, a wearable device) through the communication interface 170.

In operation 2902, the processor 120 of the electronic device 101 may determine user's first emotion information by applying a specified algorithm to the collected biometric information. For example, the processor 120 may determine user's first emotion information based on at least one of an average heart rate, a heart rate distribution, a heart rate variability, a blood pressure, an ECG, a respiratory rate, an oxygen saturation, a body temperature, an EMG, and a skin resistance. According to various embodiments of the present disclosure, the processor 120 of the electronic device 101 may transmit the biometric information to the theme server 106, and receive an emotion state derived from the theme server 106. For example, the user's emotion state may complexly include at least part of eight emotion stages such as tension, excitement, happiness, relaxation, stability, boredom, anger, and stress. If a user's emotion state is out of a preset target emotion area, the necessity of changing a theme may be suggested in order to move the emotion state to the inside of the target emotion area.

In operation 2903, the processor 120 of the electronic device 101 may transmit the user's first emotion information determined in operation 2902 to the theme server 106 through the communication interface 170. Accordingly, the theme server 106 may receive the first emotion information from the electronic device 101.

In operation 2904, the theme server 106 may determine a standard emotion level based on the first emotion information received in operation 2903. According to an embodiment of the present disclosure, the theme server 106 may have standard data based on a user's emotion. The standard data may be classified into a plurality of levels, and theme data corresponding to each level may be grouped and managed as a list.

FIGS. 30A to 30F are views illustrating standard data for representing a user's emotion level according to various embodiments of the present disclosure.

Figure 30A:
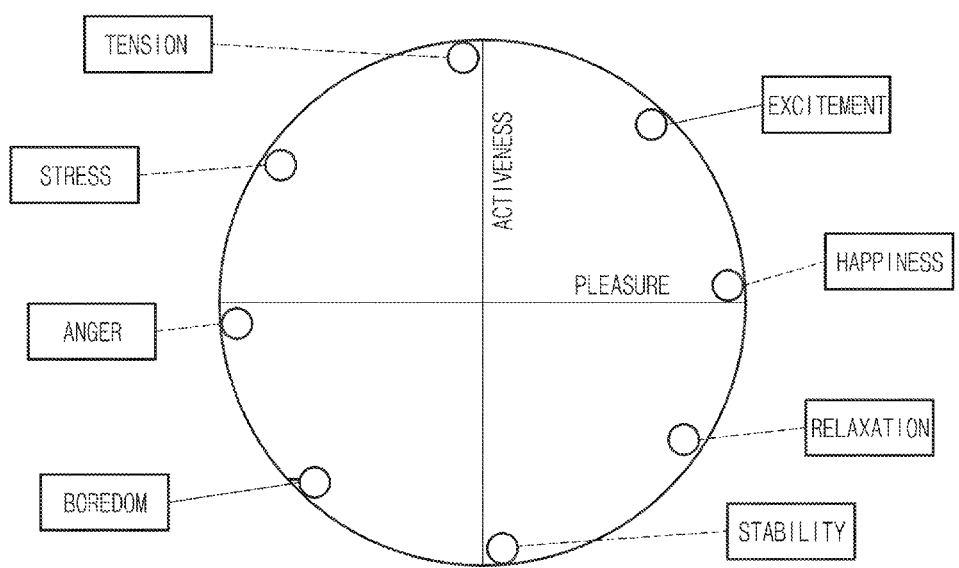
FIGS. 30A to 30F are views illustrating standard data for representing a user's emotion level according to various embodiments of the present disclosure.
Figure 30B:
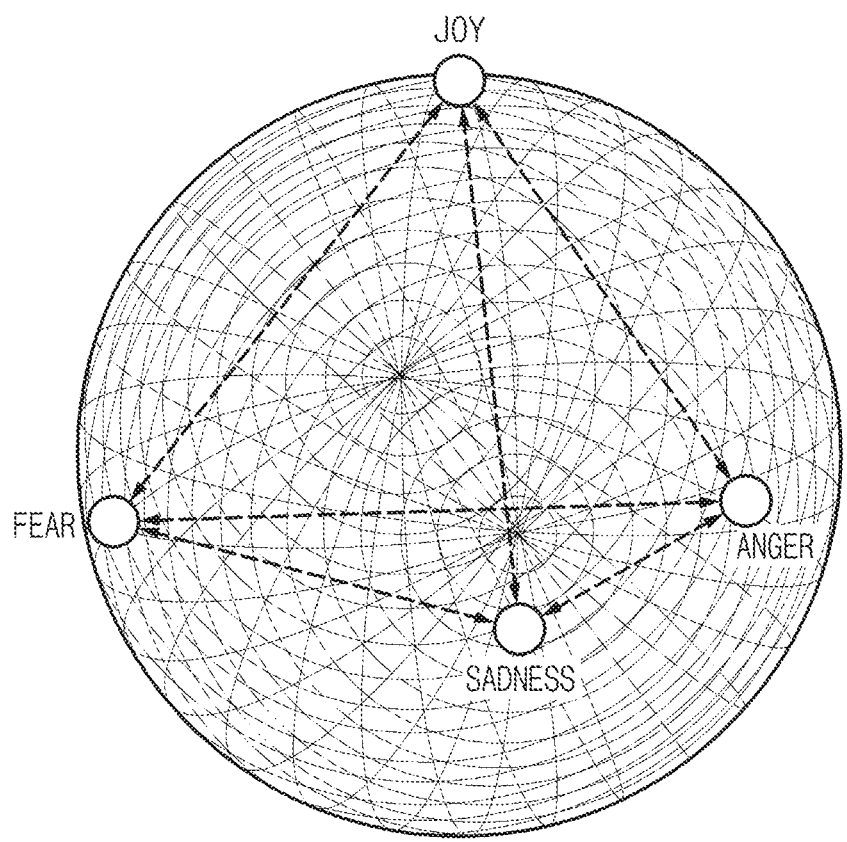

Referring now to FIGS. 30A to 30F, the theme server 106 may have standard data information defined by digitizing an emotion state based on several parameters for determining a user's emotion. For example, referring to FIG. 30A, the standard data information may include standard data on each of emotions (for example, tension, excitement, happiness, relaxation, stability, boredom, anger, and stress), which are convertible to numerical values, based on parameters such as activeness and pleasure. According to various embodiments of the present disclosure, in addition, for example, as shown in FIG. 30B, standard data on each emotion may be defined with more detailed numerical values based on more parameters.

Figure 30C:
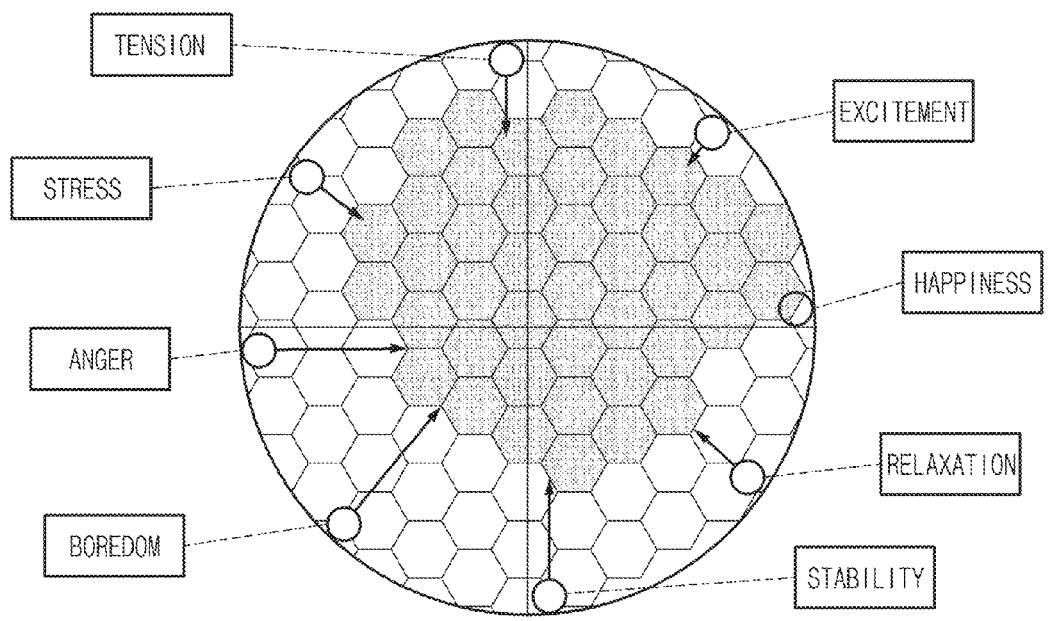

Additionally, the theme server 106 may classify the standard data into a plurality of levels, and group theme data (or a theme package) corresponding to each level and manage it as a list. For example, as shown in FIG. 30C, the theme server 106 may divide standard data into a plurality of levels (or emotion areas) according to a digitized value for the property of an emotion and manage the standard data.

Figure 30D:
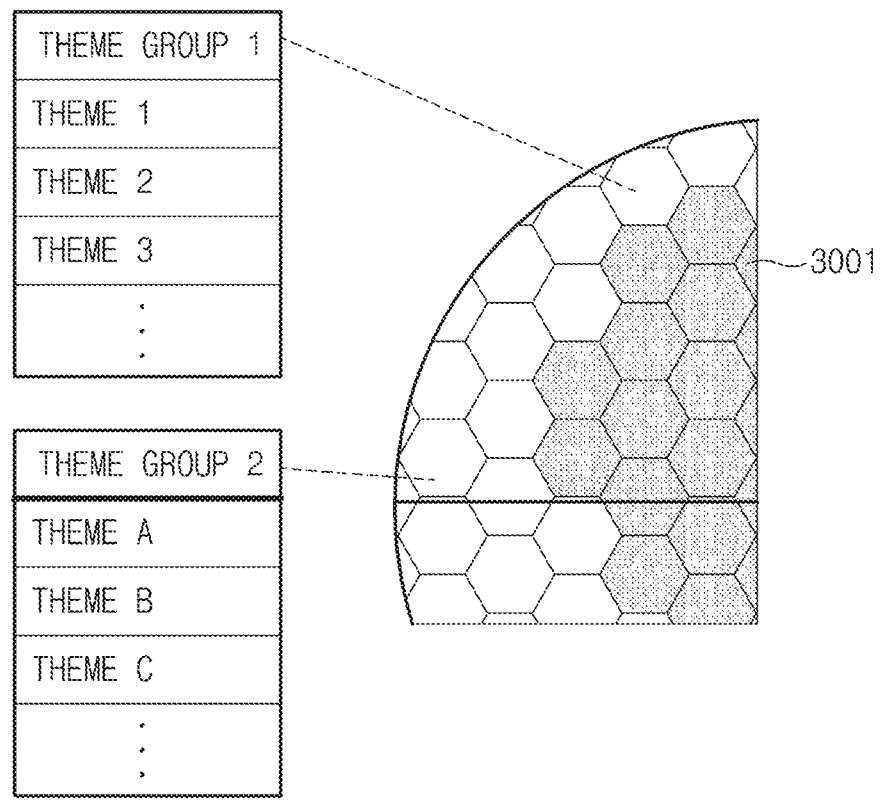

Referring to FIG. 30D, in relation to the theme server 106, a level (or, an emotion area) of at least part may have at least one theme data corresponding to each level. For example, the level of at least part may have a level having a value that exceeds a pre-specified numeral value range for the property of an emotion. That is, the level of at least part may mean the degree of a level, which requires an adjustment because a numerical value for a specific emotion property is greater than a concern range. The at least one theme data may be theme data including content that is effective to induce an emotion numerical value corresponding to a corresponding level to the pre-specified numerical value range 3001, that is, within a general concern range. Through this, the theme server 106 may determine or recommend theme data for inducing a user's emotion state to a target emotion area.

In operation 2905, the theme server 106 may determine at least one theme data in a theme data list corresponding to a standard emotion level.

In operation 2906, the theme server 106 may deliver the theme data determined in operation 2905 to the electronic device 101. That is, the theme server 106 may recommend the theme data information determined in operation 2905 to the electronic device 101.

In operation 2907, the theme server 106 may receive second emotion information from the electronic device 101 in response to a specified event. The specified event is described later with reference to FIG. 29B.

In operation 2908, the theme server 106 may update a theme data list based on the second emotion information received in operation 2907. In updating the theme data list, the theme server 106 may consider an existing theme data determination history.

Figure 29B:
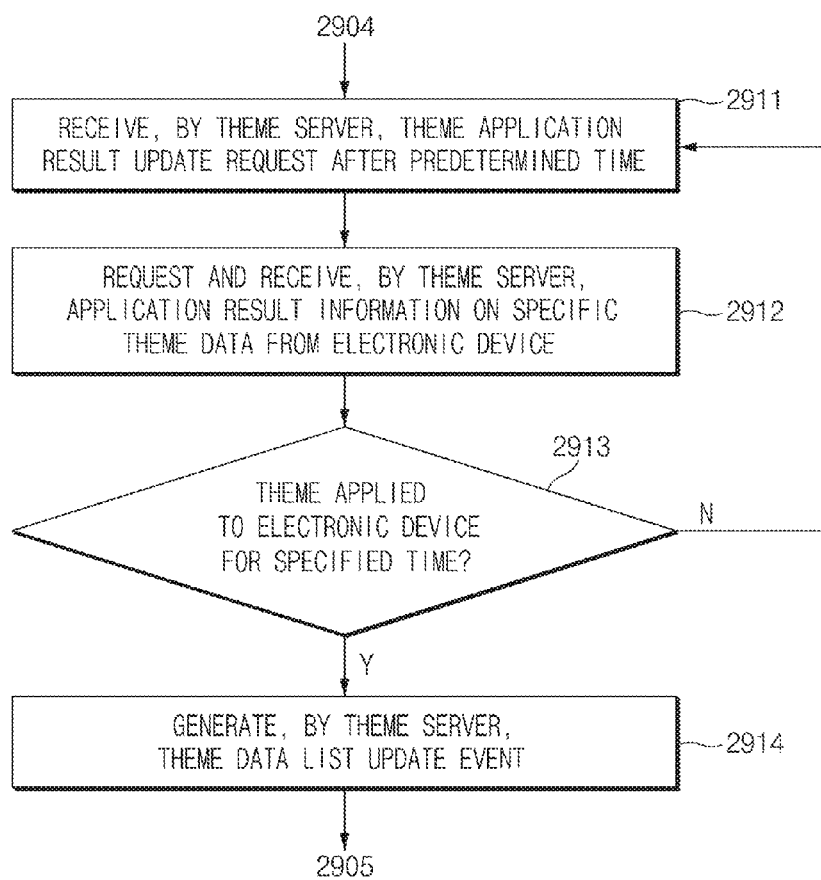

FIG. 29B is a view illustrating a specified event for receiving second emotion information according to an embodiment of the present disclosure.

Figure 30E:
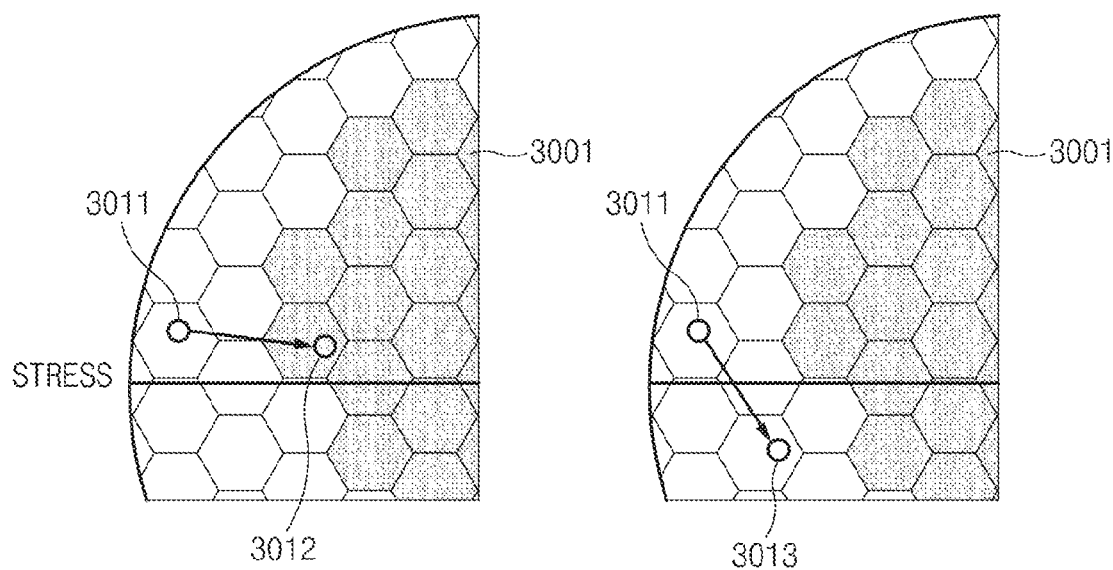
Figure 30F:
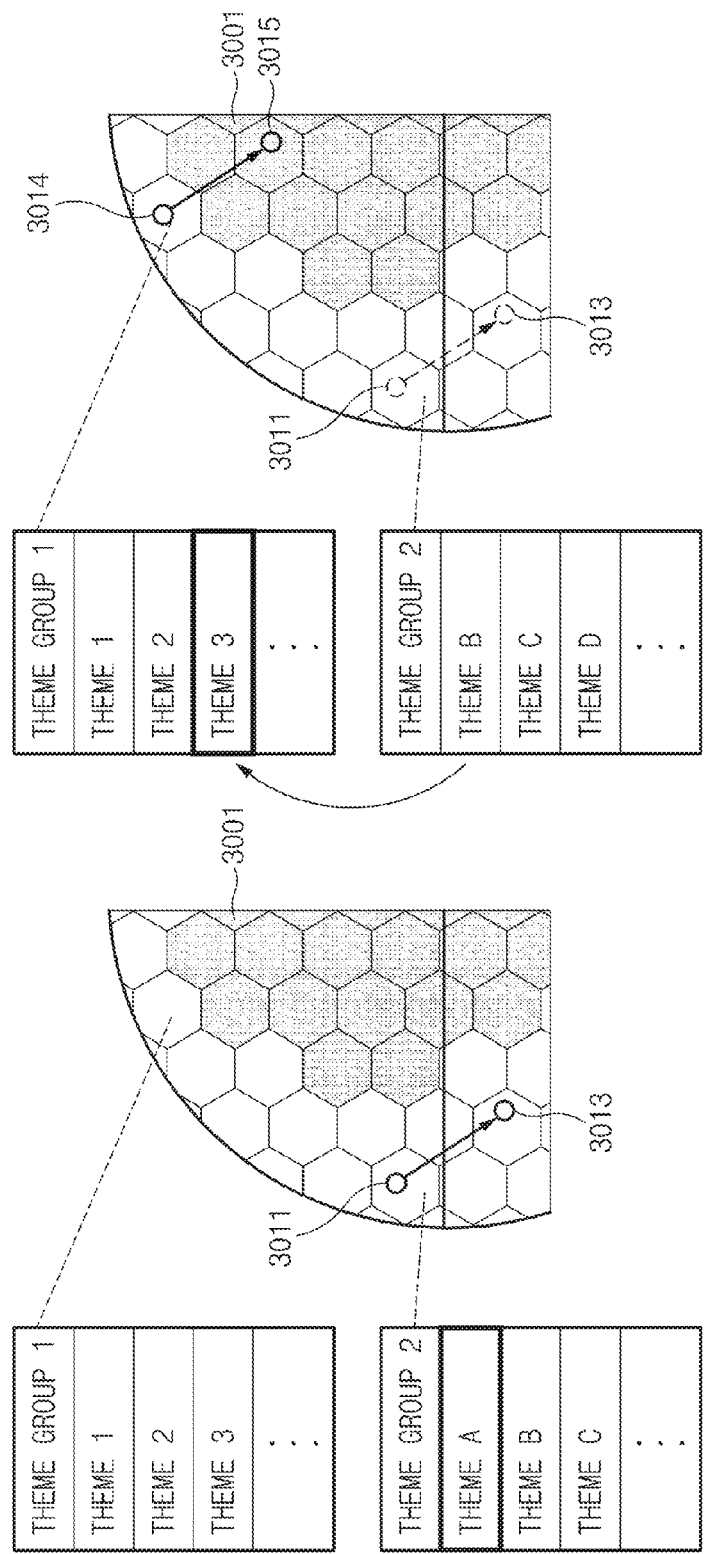

For example, each operation of FIG. 29A may proceed after operation 2904 of FIG. 29A. In relation to FIG. 29B, the reference numerals of FIG. 1 are used. Additionally, in order to help the understanding of description, FIGS. 30E and 30F are referenced together.

In operation 2911, the theme server 106 may receive a request relating to a theme application result update after a predetermined time elapses. The predetermined time may be a pre-specified time at which a user's emotion change occurs due to the application of a theme.

In operation 2912, the theme server 106 may request and receive application result information on specific theme data from the electronic device 101. The theme server 106 may request application result information on a specific theme data package from the electronic device 101 and receive corresponding information. The application result information may include information on a time that a theme relating to the theme data is applied to the electronic device 101 continuously.

In operation 2913, the theme server 106 may determine whether a theme is applied to the electronic device 101 for a specified time. For example, the theme server 160 may determine whether a theme relating to the theme data package is applied to the electronic device 101 for a specified period based on the information received from the electronic device 101. If the theme is applied to the electronic device 101 for a specified period, the theme server 106 may perform operation 2914 and if not, return to operation 2911.

In operation 2914, since the theme is applied to the electronic device 101 for a specified period, the theme server 106 may generate a theme data list update event. Then, the theme server 106 may perform operation 2905 of FIG. 29A.

According to various embodiments of the present disclosure, operation 2914 may include an operation described below. For example, the theme server 106 may identify pattern information that a user's emotion is changed for a specified time by analyzing emotion information received from the electronic device 101. The theme server 106 may determine a degree that a specific theme affects a user emotion based on the changed pattern information. The theme server 106 may update a theme data package list through a method of adjusting a priority in a list that theme data belongs or changing a standard emotion level that the theme data belongs, based on the determination.

Referring to FIG. 30E, for example, the theme server 106 may recommend theme data of the theme A to the electronic device 101, and after a specified period elapses, generate emotion change pattern information based on the information received from the electronic device 101.

The generated emotion change pattern information, for example, as shown in the left of FIG. 30E, may be in a form that a stress emotion level 3011 exceeding a pre-specified numerical value range 3001 changes to an emotion level 3012 within the pre-specified numerical value range 3001. In this case, since an emotion change pattern enters within the pre-specified numerical value range 3001, theme data of the theme A may maintain a currently belonging level. On the other hand, when the pattern information, as shown in the right drawing of FIG. 30E, does not enter the pre-specified numerical value range 3001 or a change direction of a pattern does not face the inside of the pre-specified numerical value range 3001 (that is, when the emotion level 3011 changes to the emotion level 3013), it may be checked that an emotion change effect of the theme data of the theme A is away from an expected effect. In this case, the theme data of the theme A may be necessary to change a belonging level. Accordingly, the theme server 106 may update theme data of the current theme A to be removed from a theme data list or moved to another level of theme data list.

Moreover, in updating a theme data list, the theme server 106 may refer to the emotion change pattern through a method of determining another level to which theme data is to be moved. For example, referring to the left drawing of FIG. 30F, the theme server 106 may allow the emotion level 3011 to be shifted to the emotion level 3013 by the data package of the theme A. At this point, the theme server 106, as shown in the right drawing of FIG. 30F, may allow the emotion change pattern by the theme data of the theme A to be included in the pre-specified numerical value range 3001. That is, the theme server 106 may change a start point of the emotion change pattern, that is, a start position of the emotion level 3011, to an emotion level 3014. Through this, the theme server 106 may allow the emotion level 3011 to be shifted to the emotion level 3015 by the data package of the theme A. As a result, the theme server 106 may move theme data of the theme A included in a theme group 2 to a list position of a theme 3 of a theme group 1 and through this, update a theme data list.

In addition, according to various embodiments of the present disclosure, emotion change pattern information may be generated based on theme application result information received from a plurality of electronic devices, with respect to a specific theme data package. Through this, errors may be reduced and reliability may be improved in generating emotion change pattern information.

According to the above-mentioned various embodiments, the theme server 106 may receive user's emotion information again from the electronic device in response to a specified event. Additionally, the theme server 106 may update a theme data list relating to the standard emotion level based on the emotion information that is received again. Through this, the electronic device 101 may improve the accuracy of theme content for improving a user's emotion, and receive the most appropriate theme data according to a user's emotion state.

Figure 31:
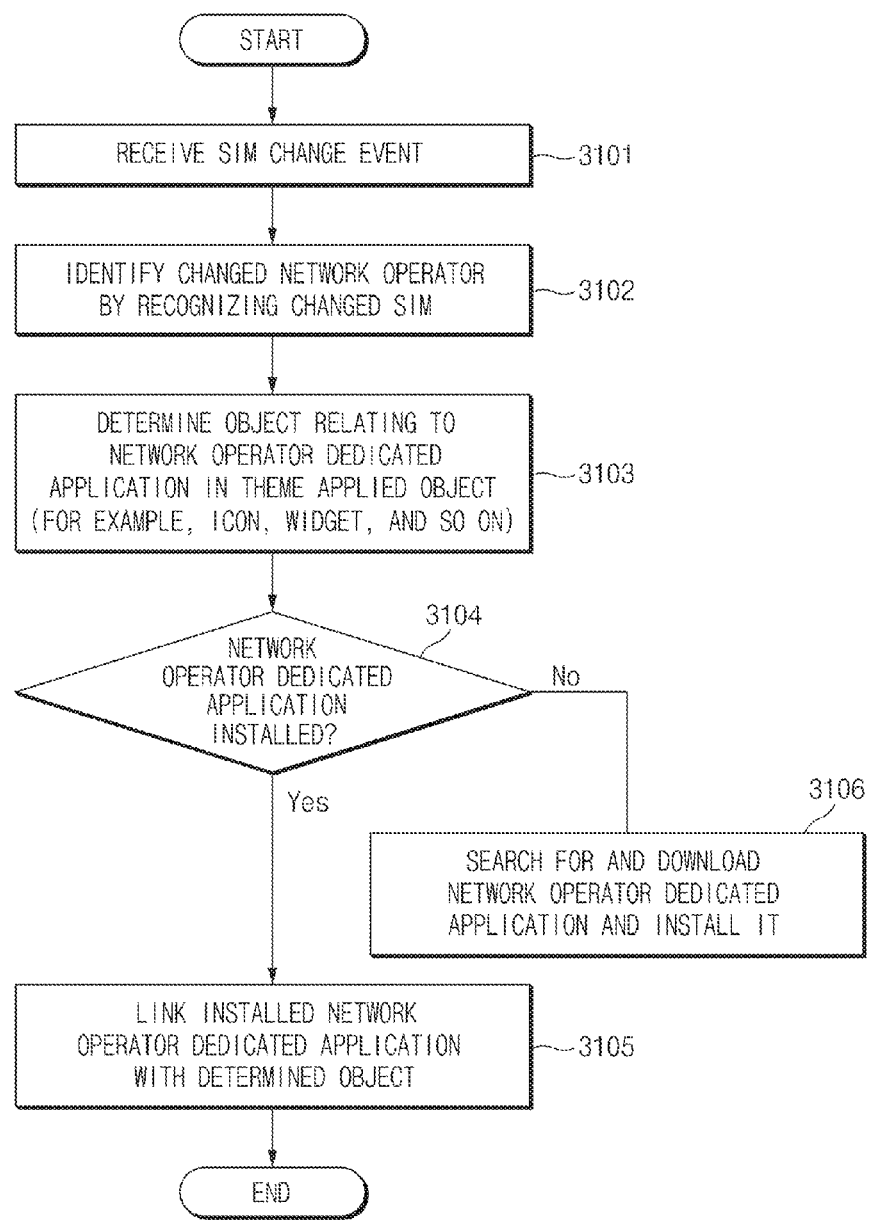
FIG. 31 is a flowchart illustrating a theme applying method according to an embodiment of the present disclosure.

FIG. 31 is a flowchart illustrating a theme applying method according to an embodiment of the present disclosure.

Referring to FIG. 31, a theme applying method according to an embodiment of the present disclosure may include operation 3101 to operation 3106. In describing each operation of FIG. 31, the reference numerals of FIG. 1 are used.

In operation 3101, the processor 120 of the electronic device 101 may receive a SIM change event from a SIM (or, Universal IC Card (UICC)) slot and an embedded SIM (eSIM) (or, embedded UICC (eUICC)). The SIM change event, for example, may correspond to an event that a mobile network operator (MNO), to which the electronic device 101 subscribes, is changed.

In operation 3102, the processor 120 of the electronic device 101 may identify a mobile network operator before/after a change based on the SIM change event. For example, the processor 120 may recognize that a mobile network operator that the electronic device 101 subscribes is changed from a company A to a company B based on the SIM change event.

In operation 3103, the processor 120 of the electronic device 101 may determine an object relating to an application dedicated to a specific network operator among objects (for example, icon, widget, and so on) of an application where theme data is applied. For example, the processor 120 may determine an object linked to an application dedicated to the specific network operator by referring to property information of an application where the theme data is applied. For example, the processor 120 may determine an object X linked to a navigation application dedicated to a company A.

In operation 3104, the processor 120 of the electronic device 101 may determine whether an application dedicated to the changed network operator (for example, a company B) is installed. For example, the processor 120 may determine whether a navigation application that the company B provides, which relates to the object X determined in operation 3103, is installed. If the navigation application that the company B provides is installed, the processor 120 may perform operation 3105 and if not, perform operation 3106.

In operation 3105, the processor 120 of the electronic device 101 may link an installed network operator (for example, the company B) dedicated application and the object X determined in operation 3103. For example, since it is determined that a navigation application that the company B provides is installed, the processor 120 may link the object X determined in operation 3103 and the navigation application that the company B provides (that is, the execution path is matched to each other). Matching information of a network operator dedicated application and a specific object for linking an object and an application may be established in advance as a database.

In operation 3106, the processor 120 of the electronic device 101 may search for, download, and install an application dedicated to the changed network operator (for example, the company B) in an application market. For example, since it is determined that a navigation application that the company B provides is not installed, the processor 120 may search for the navigation application that the company B provides from an application providing server (for example, an application market server, an app store server, and so on), and download and install it. Then, the electronic device 101 may perform operation 3105.

According to various embodiments of the present disclosure, even if a user identification module is changed in an electronic device having a theme applied, a network operator dedicated application may be configured to an immediately available state without additional operation.

Figure 32:
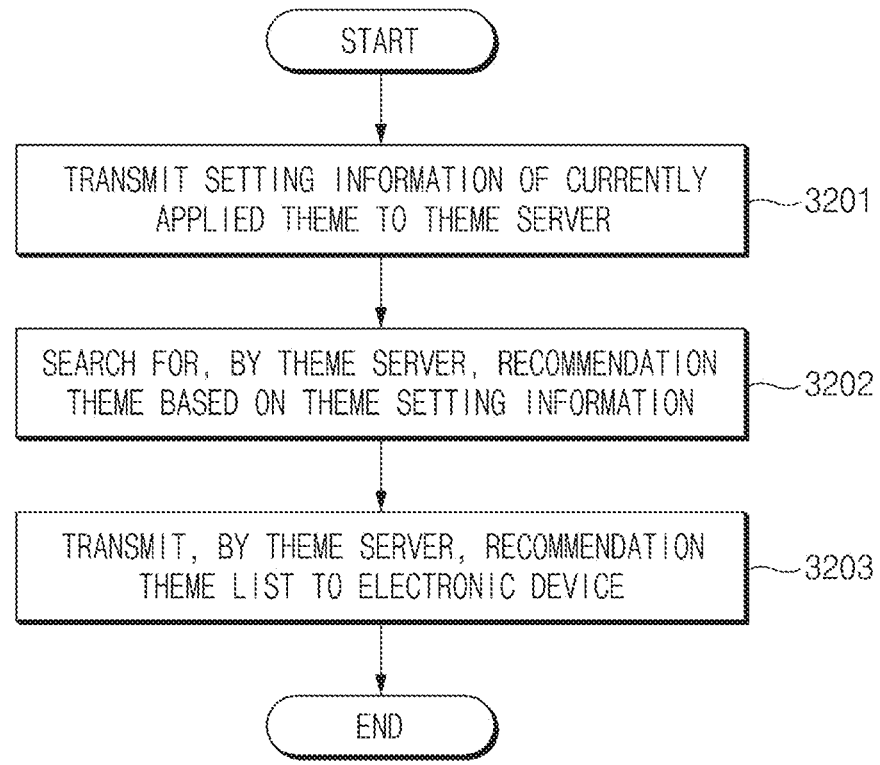
FIG. 32 is a view illustrating a theme recommendation method according to an embodiment of the present disclosure.

FIG. 32 is a view illustrating a theme recommendation method according to an embodiment of the present disclosure.

Referring to FIG. 32, a theme recommendation method according to an embodiment of the present disclosure may include operation 3201 to operation 3203. In describing each operation of FIG. 32, the reference numerals of FIG. 1 are used.

In operation 3201, the processor 120 of the electronic device 101 may transmit setting information of the currently applied theme to the theme server 106 through the communication interface 170. The setting information, for example, may include at least one of theme identification information, capture image information of a theme applied page, theme layout data, theme resource data, and a theme package itself.

In operation 3202, the theme server 106 may search for a recommendation theme from the database of the theme server 106 based on the theme setting information received in operation 3201. The found recommendation theme may be configured with a recommendation theme list.

According to an embodiment of the present disclosure, the theme server 106 may obtain theme data applied to the electronic device 101 based on the theme setting information. The theme server 106 may search for a commendation theme by analyzing theme layout data and/or theme resource data of the obtained theme data.

For example, the theme server 106 may search for a recommendation theme through an image analysis of theme resource data applied to the electronic device 101. At this point, the theme server 106 may extract a feature point from an image of the theme resource data or use "Bag of Words" technique. Also, in addition, the theme server 106 may use various similarity determination techniques described with reference to FIG. 22A.

FIG. 33 is a view illustrating a theme recommendation list setting factor according to an embodiment of the present disclosure.

According to an embodiment of the present disclosure, the theme server 106 may prioritize recommendation theme data and make a list. For example, referring to FIG. 33, the theme server 106 may assign a priority based on one of various setting factors configuring theme layout data and/or theme resource data. Alternatively, the theme server 106 may set a priority by assigning a weight to at least one of the various setting factors.

For example, a setting factor configuring theme layout data may include a theme page configuration (for example, the number of pages, a main page, and so on), and an object (for example, an icon/widget) included in each page. Additionally, for example, a setting factor configuring theme resource data may include the format (for example, shape, color, and size) of each object, the background image (including video) of pages (for example, a lock screen and a home screen), and the background sound of each page.

In operation 3203, the theme server 106 may transmit a recommendation theme list to an electronic device.

According to various embodiments of the present disclosure, a theme server may automatically search for a theme that is similar to a theme applied to a user's electronic device and recommend the theme. Thereby, the theme server may recommend a theme fit for a user's preference without keyword search.

According to embodiments disclosed in this specification, new user experience may be provided in linkage with other techniques such as location based service (LSB), security technique, image processing technique, and biometric recognition technique in addition to a theme changing method in an electronic device. Besides that, various effects identified directly or indirectly through this specification may be provided.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 120) executes an instruction, it may perform a function corresponding to the instruction. The non-transitory computer-readable storage media may include the memory 130, for example.

The non-transitory computer-readable storage media may include hard disks, floppy disks, magnetic media (for example, magnetic tape), optical media (for example, CD-ROM, and DVD), magneto-optical media (for example, floptical disk), and hardware devices (for example, ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a user authentication module;
   a display;
   a memory configured to store at least one theme data applicable to a page and instructions; and
   a processor, the processor being configured to execute the stored instructions to:
   control the display to display the page which first theme data is applied to, wherein the first theme data comprises first theme resource data,
   control the user authentication module to obtain user authentication information,
   determine second theme data corresponding to the obtained user authentication information,
   extract second theme resource data from the second theme data,
   determine a similarity of the first theme resource data and the second theme resource data,
   apply the second theme data to the page, and
   when the similarity is greater than a specified value, provide a guide for the first theme resource data to an object.

2. The electronic device of claim 1,
   wherein the page displayed at the display comprises a plurality of pages, and
   wherein the second theme data applied to the plurality of pages is based on a combination of a plurality of theme data.

3. The electronic device of claim 1, wherein the page displayed at the display comprises a page associated with a home screen, a lock screen, or a cover screen of the electronic device.

4. The electronic device of claim 1, wherein the second theme data comprises at least one of theme resource data and theme layout data.

5. The electronic device of claim 4, wherein the theme resource data comprises background image data of the page displayed at the display or image data of an object included in the page displayed at the display.

6. The electronic device of claim 4, wherein the theme layout data comprises data on an arrangement order, a size, or a number of the page displayed at the display and an arrangement position, a size or a number of an object included in the page displayed at the display.

7. The electronic device of claim 1, wherein the user authentication information comprises at least one of face recognition information, password information, touch pattern information, and biometric information.

8. The electronic device of claim 1, further comprising:
   a communication module configured to establish communication with another electronic device,
   wherein the processor is further configured to modify the second theme data based on properties of a display included in the other electronic device and transmit the modified second theme data to the other electronic device.

9. The electronic device of claim 8, wherein the processor is further configured to modify the second theme data by resizing or cropping an image included in the second theme data according to a resolution of the display.

10. The electronic device of claim 1, further comprising:
    a communication module configured to establish communication with another electronic device and receive theme data from the other electronic device,
    wherein the processor is further configured to combine at least part of the received theme data and at least part of theme data stored in the memory.

11. A theme applying method of an electronic device, the method comprising:
    displaying a page which first theme data is applied to, wherein the first theme data comprises first theme resource data;
    obtaining user authentication information;
    determining second theme data corresponding to the obtained user authentication information;
    extracting second theme resource data from the second theme data;
    determining a similarity of the first theme resource data and the second theme resource data;
    applying the second theme data to the page; and
    when the similarity is greater than a specified value, providing a guide for the first theme resource data to an object.

12. The method of claim 11,
    wherein the displayed page comprises a plurality of pages, and
    wherein the second theme data applied to the plurality of pages is based on a combination of a plurality of theme data.

13. The method of claim 11, wherein the displayed page comprises a page associated with a home screen, a lock screen, or a cover screen of the electronic device.

14. The method of claim 11, wherein the second theme data comprises at least one of theme resource data and theme layout data.

15. The method of claim 14, wherein the theme resource data comprises background image data of the displayed page or image data of an object included in the displayed page.

16. The method of claim 14, wherein the theme layout data comprises data on an arrangement order, a size, or a number of the displayed page and an arrangement position, a size, or a number of an object included in the displayed page.

17. The method of claim 11, wherein the user authentication information comprises at least one of face recognition information, password information, touch pattern information, and biometric information.

18. The method of claim 11, further comprising:
- establishing communication with another electronic device;
- modifying the second theme data based on a specification of a display included in the other electronic device; and
- transmitting the modified second theme data to the other electronic device.

19. The method of claim 18, wherein the modifying of the second theme data comprises resizing or cropping an image included in the second theme data according to a resolution of the display.

20. The method of claim 11, further comprising:
- establishing communication with another electronic device;
- receiving theme data from the other electronic device; and
- combining at least part of the received theme data and at least part of theme data stored in the memory.

* * * * *